United States Patent
Auty et al.

[11] Patent Number: 5,809,161
[45] Date of Patent: Sep. 15, 1998

[54] VEHICLE MONITORING SYSTEM

[75] Inventors: Glen William Auty, Montmorency; Peter Ian Corke, Northcote; Paul Alexander Dunn, North Balwyn; Ian Barry MacIntyre, Rosanna; Dennis Charles Mills, Forest Hill; Benjamin Francis Simons, Balmain; Murray John Jensen, Fairfield; Rodney Lavis Knight, Gwynneville; David Stuart Pierce, Wollongong, all of Australia; Ponnampalam Balakumar, Corrimal, Wales

[73] Assignees: Commonwealth Scientific and Industrial Research Organisation, Australian Capital Territory; Telstra Corporation Limited, Melbourne, both of Australia

[21] Appl. No.: 35,987

[22] Filed: Mar. 22, 1993

[30] Foreign Application Priority Data

Mar. 20, 1992 [AU] Australia .............................. PL1464/92
Mar. 20, 1992 [AU] Australia .............................. PL1465/92

[51] Int. Cl.$^6$ ...................................................... G06K 9/00
[52] U.S. Cl. .......................... 382/104; 382/103; 340/937; 348/149
[58] Field of Search ........................ 382/1, 48, 103–105, 382/107; 348/148, 149, 143, 159, 161, 169–172; 364/436–438; 340/937–939

[56] References Cited

U.S. PATENT DOCUMENTS

| | | | |
|---|---|---|---|
| 3,058,109 | 10/1962 | Hans-Heinrich et al. | 346/1 |
| 3,685,012 | 8/1972 | Case et al. | 340/38 P |
| 3,788,201 | 1/1974 | Abell | 95/1.1 |
| 3,890,462 | 6/1975 | Limb et al. | 178/6.8 |
| 4,122,521 | 10/1978 | Rick et al. | 364/424 |
| 4,214,265 | 7/1980 | Olesen | 358/93 |

(List continued on next page.)

FOREIGN PATENT DOCUMENTS

| | | |
|---|---|---|
| 0 339 988 | 11/1989 | European Pat. Off. . |
| 0 347 090 | 12/1989 | European Pat. Off. . |
| 0 494 815 | 7/1992 | European Pat. Off. . |
| 0 501 784 | 9/1992 | European Pat. Off. . |
| 2315730 | 1/1977 | France . |
| 2583882 | 12/1986 | France . |
| 2 672 144 | 7/1992 | France . |

(List continued on next page.)

OTHER PUBLICATIONS

International Search Report received Dec. 6, 1993.
New Zealand Search Report for Patent Application No. 249799 mailed May 29, 1996.

*Primary Examiner*—Leo Boudreau
*Assistant Examiner*—Bhavesh Mehta
*Attorney, Agent, or Firm*—Thomas J. Engellenner; Anthony A. Laurentano; Lahive & Cockfield, LLP

[57] ABSTRACT

An object monitoring system includes a camera node (2) for monitoring movement of an object (18) to determine an acquisition time when an image of the object (18) is to be acquired and acquiring the image at the predetermined time. The system includes a camera (6) which is able to monitor moving objects (18), and image processing circuitry (10), responsive to the camera (6), which is able to detect a predetermined moving object (18) from other moving and static objects. From the image acquired, information identifying the object (18) can be automatically extracted. The system is particularly suited to monitoring and discriminating large vehicles (18) from other vehicles over a multi-lane roadway, and acquiring high resolution images of the large vehicles (18) at a predetermined acquisition point (22). Image data acquired by a plurality of camera nodes (2) can be sent over a digital telecommunications network (45) to a central image processing system (42) which can extract vehicle identifying data, such as licence plate details, and obtain information on vehicle travel between nodes(2).

91 Claims, 32 Drawing Sheets

Microfiche Appendix Included
(6 Microfiche, 518 Pages)

U.S. PATENT DOCUMENTS

| | | | |
|---|---|---|---|
| 4,433,325 | 2/1984 | Tanaka et al. | 340/937 |
| 4,555,618 | 11/1985 | Riskin | 235/384 |
| 4,567,609 | 1/1986 | Metcalf | 382/9 |
| 4,603,390 | 7/1986 | Mehdipour et al. | 364/467 |
| 4,817,166 | 3/1989 | Gonzalez et al. | 382/1 |
| 4,839,648 | 6/1989 | Beucher et al. | 340/933 |
| 4,847,772 | 7/1989 | Michalopoulos et al. | 364/436 |
| 4,855,770 | 8/1989 | Mauchan et al. | 354/75 |
| 4,878,248 | 10/1989 | Shyu et al. | 382/9 |
| 4,908,500 | 3/1990 | Baumberger | 235/384 |
| 4,958,064 | 9/1990 | Kirkpatrick | 235/384 |
| 4,963,723 | 10/1990 | Masada | 235/384 |
| 5,005,083 | 4/1991 | Grage et al. | 348/169 |
| 5,046,111 | 9/1991 | Cox et al. | 382/8 |
| 5,161,107 | 11/1992 | Mayeaux | 340/937 |
| 5,243,418 | 9/1993 | Kuno et al. | 348/170 |
| 5,243,663 | 9/1993 | Kudoh | 382/1 |
| 5,262,871 | 11/1993 | Wilder et al. | 348/307 |
| 5,283,573 | 2/1994 | Takatou et al. | 340/937 |
| 5,296,852 | 3/1994 | Rathi | 348/149 |
| 5,301,239 | 4/1994 | Toyama et al. | 382/1 |

FOREIGN PATENT DOCUMENTS

| | | |
|---|---|---|
| 249 783 | 9/1987 | German Dem. Rep. . |
| 39 37 603 | 6/1991 | Germany . |
| 58-140900 | 2/1982 | Japan . |
| 61-61573 | 3/1986 | Japan . |
| 62-87947 | 4/1987 | Japan . |
| 1-319644 | 12/1989 | Japan . |
| 3-011500 | 1/1991 | Japan . |
| 3-22099 | 1/1991 | Japan . |
| 3-179598 | 8/1991 | Japan . |
| 1193-716 | 5/1984 | U.S.S.R. . |
| 1234-957 | 5/1984 | U.S.S.R. . |
| 1235-002 | 12/1984 | U.S.S.R. . |
| 2 227 589 | 8/1990 | United Kingdom . |
| 2 227 866 | 8/1990 | United Kingdom . |
| 2 231 753 | 11/1990 | United Kingdom . |
| WO 92/08215 | 5/1992 | WIPO . |
| WO 93/19429 | 9/1993 | WIPO . |

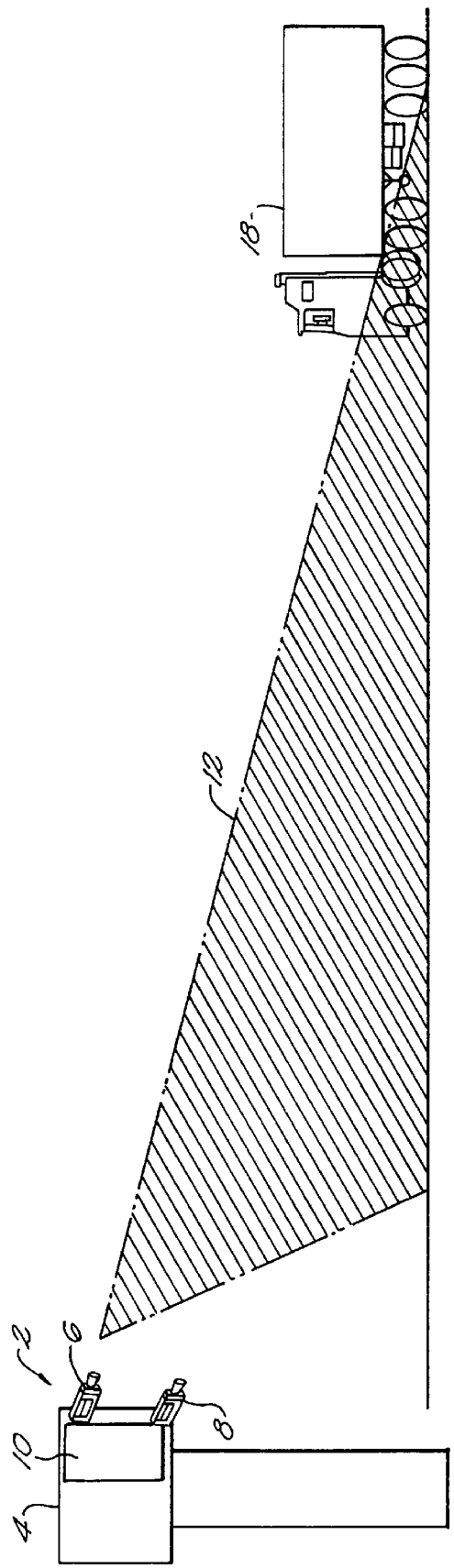
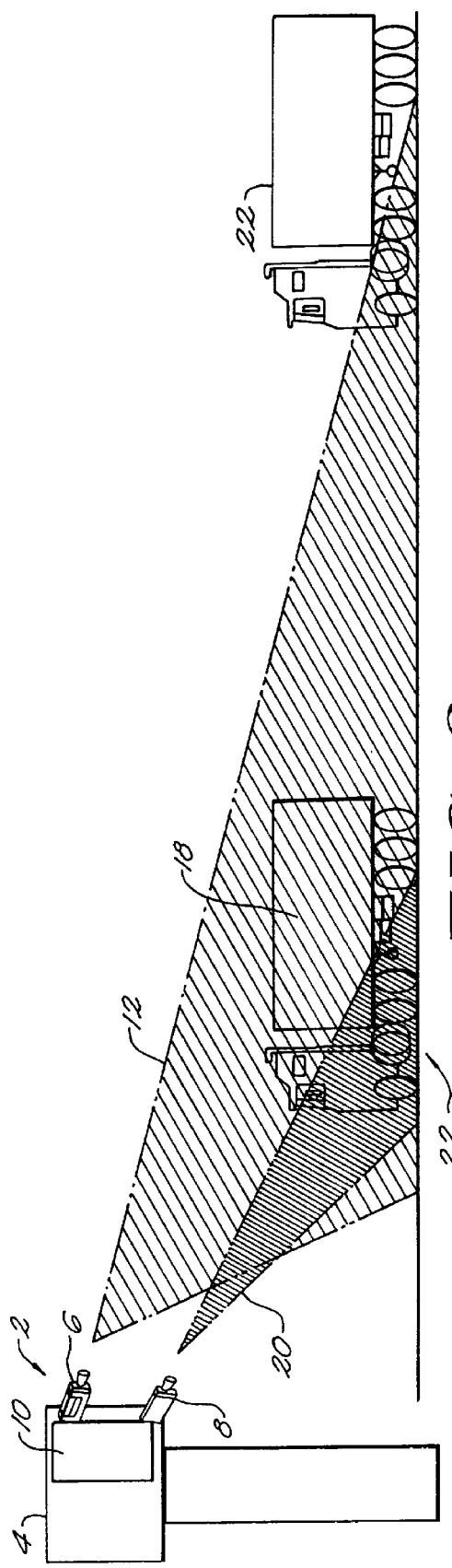

■ = New cluster
□ = Old cluster
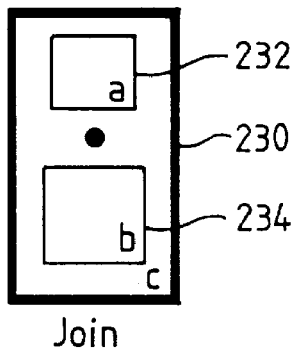
Join
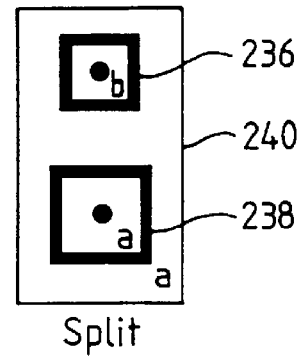
Split
*FIG. 24A*
□ = New cluster
□ = Old cluster
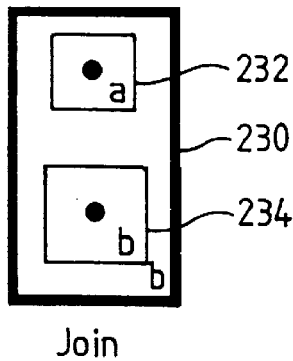
Join
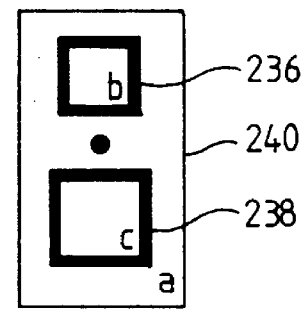
Split
*FIG. 24B*

VEHICLE MONITORING SYSTEM

FIELD OF INVENTION

The present invention relates to an object monitoring system and, in particular, to a system for monitoring vehicles.

REFERENCE TO MICROFICHE APPENDIX

The disclosure of the present invention includes a microfiche appendix. The total number of microfiche included in the appendix is 6. The total number of microfiche frames included in the appendix is 518.

BACKGROUND OF INVENTION

Authorities responsible for traffic management and the laws which govern the use of vehicles require systems which can monitor traffic continuously and detect breaches of the law, without requiring the expense of having personnel present at the scene of the infringement. Systems which are able to monitor a large number of locations, detect infringements and issue infringement notices are particularly advantageous as they relieve personnel, such as police, from the task of traffic management and allow them to pursue other tasks. By continuously monitoring a location the systems also act as a deterrent to infringers and may assist in reducing accidents which cause road fatalities and casualties. It would also be advantageous to be able to monitor road usage in order to make decisions on road damage caused by heavy vehicles.

A number of traffic management systems are presently in use, such as speed cameras and red light cameras for road traffic. The known systems employ cameras which are triggered when an infringement is detected. Optical sensors placed on the side of the road, pressure sensors placed underneath the road and radar signals reflected from vehicles are used to detect the presence of a vehicle and determine infringement. The sensors and radar signals are used to generate a trigger signal to activate a camera to take a picture of vehicle which includes details from which the vehicle can be identified, such as a car licence plate. Use of road based sensors is disadvantageous as they require the road to be altered or excavated for installation or, when placed on the side of the road, can be easily detected and damaged. Also electrical cabling needs to be installed and connected between the sensors and the camera. The use of electromagnetic signals which are transmitted to and reflected from a vehicle, such as radar signals, to detect presence and infringement is also disadvantageous as these signals can be detected by detection units placed in a vehicle to alert the driver as to their presence.

It is advantageous therefore to provide a system which can detect vehicle presence and infringement without transmitting any electromagnetic signals or using road based sensors.

The cameras presently in use also use photographic film which has the disadvantage that it needs to be continually replaced at the location of the camera. Accordingly, a number of red light cameras in metropolitan areas do not always include film and do not continuously monitor the corresponding intersection.

Speed detection systems which use only cameras are described in a number of publications. The systems are able to monitor traffic flow and detect instantaneous speed infringements but the systems are relatively limited with respect to the information they can obtain on a vehicle whilst it is being monitored, and the systems are also unable to selectively acquire information on specified vehicle types.

The pictures or images acquired by the camera also normally need to be examined by personnel to extract the information to identify the vehicle and determine the person responsible for it, which is a time consuming process. If the image could be processed within a relatively short time of acquisition then it could be used as a basis for alerting authorities in the region to seek and hold the vehicle, for example, if the information identifies it as being stolen. Accordingly, it would be advantageous to provide a system which can process images in real time to obtain detailed information on a vehicle and issue alert information and infringement notices without acquiring human intervention.

When travelling a long distance, vehicle users, in particular truck drivers, tend to transgress speed limits so as to shorten the time in travelling to the destination and during the journey their speed may vary from a range which is under the limit to one which exceeds the limit. The known systems for detecting speed infringement concentrate on detecting the instantaneous speed of a vehicle at a particular location and therefore depending on the location at which the detection unit is placed, it may not detect user's who infringe sporadically over a long distance. Also truck and bus drivers who exceed a recommended time of travel by avoiding rest stops and inaccurately complete log books may not be detected. Hence, it would be advantageous to provide a system which can detect the average speed of a vehicle over a relatively long distance. It is also advantageous to provide a system which can monitor vehicles in more than one lane of a multi-lane carriageway.

SUMMARY OF THE INVENTION

The present invention provides an object monitoring system comprising camera means for monitoring movement of an object to determine an acquisition time when an image of said object is to be acquired and acquiring said image at said predetermined time.

The present invention also provides an object monitoring system comprising camera means for monitoring moving objects, and image processing means, responsive to said camera means, for detecting a predetermined moving object from other moving and static objects.

The present invention further provides an object monitoring system comprising camera means for tracking and acquiring an image of a moving object from which information identifying said object can be automatically extracted.

Preferably said system includes means for transmitting said image over a digital telecommunications network.

The present invention also provides a vehicle monitoring system, comprising camera means for continuously detecting and tracking moving vehicles over a multi-lane carriageway, and acquiring images of predetermined vehicles at an acquisition area on said carriageway from which identifying information on said vehicles can be extracted.

The present invention further provides a vehicle monitoring system comprising a plurality of camera means for tracking and acquiring images of predetermined moving vehicles for a respective area, and means for processing the image data obtained from said areas to identify said vehicles and obtain information on the travel of said vehicles between said areas.

The present invention also provides a vehicle monitoring system comprising camera means for monitoring moving vehicles to determine if said vehicle is of a predetermined type and, in response thereto, capturing respective images of vehicles of said predetermined type.

The present invention further provides a vehicle monitoring system comprising camera means for monitoring a vehicle to detect a law infringement and determine a predetermined time to acquire an image of said vehicle, and for capturing an image of said vehicle at said predetermined time in response to detecting said infringement.

The present invention also provides a vehicle monitoring system comprising camera means for monitoring vehicles on a roadway, discriminating between large vehicles, such as trucks and buses, and small vehicles, such as cars, on said roadway so as to acquire images of only the large vehicles from which vehicle information can be obtained.

BRIEF DESCRIPTION OF DRAWINGS

A preferred embodiment of the present invention is hereinafter described, by way of example only, with reference to the accompanying drawings wherein:

FIGS. 1, 2, and 3 are side views illustrating use of a preferred system for monitoring vehicles;

FIG. 24 is a diagram illustrating a labelling method performed by the system;

DETAILED DESCRIPTION OF PREFERRED EMBODIMENTS

Figure 1:
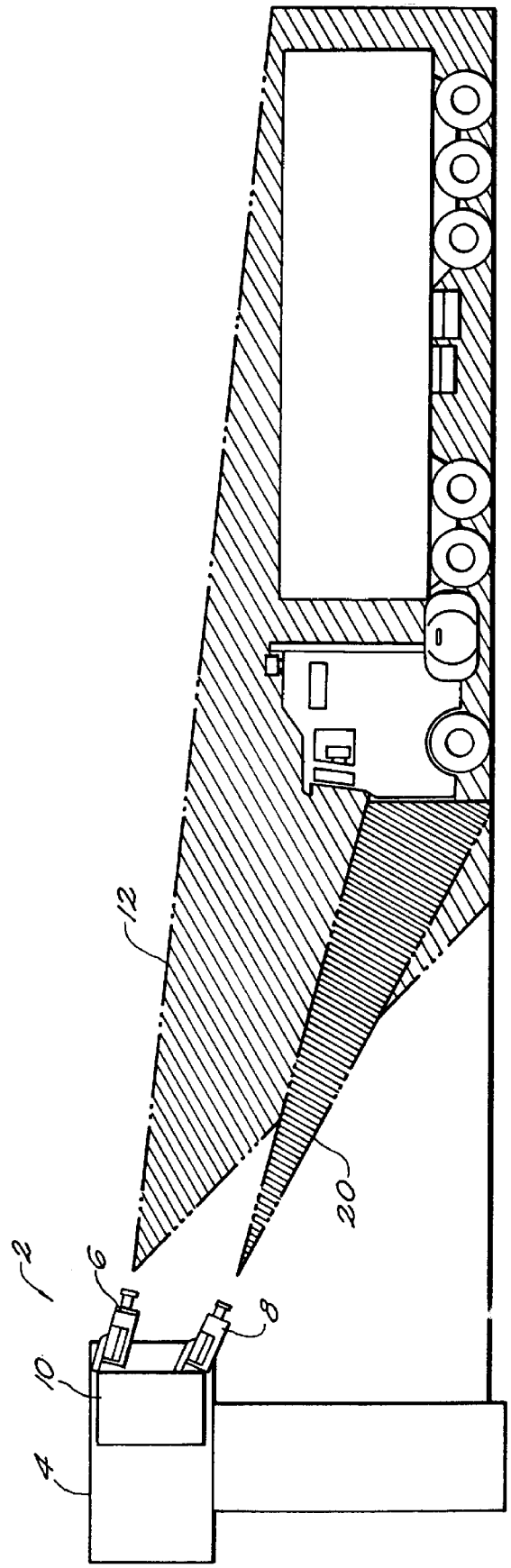

A vehicle monitoring system, as shown in FIGS. 1 to 7, includes a camera node 2 which is mounted on a bridge or pylon 4 above vehicle traffic, as shown in FIGS. 1 to 3. The camera node 2 includes a vehicle detection camera 6, an image acquisition camera 8 and a node control unit 10. Both cameras 6 and 8 are monochrome CCD cameras, with the vehicle detection camera 6 being a wide angle video camera of medium resolution, and the image acquisition camera being a high resolution camera.

The detection camera 6 has a wide field of view 12 of part of a vehicle carriageway 16 which is to be monitored by the node 2. The detection camera 6 monitors vehicles in the field of view 12 and the control unit 10 processes the images acquired by the detection camera 10 to detect and discriminate vehicles from other objects in the field of view 12. As a vehicle 18 enters the field of view 12 and moves towards the node 2, the node 2 analyses the images produced by the detection camera 6 to first detect the vehicle 18 as being a moving object, which is different from other moving objects or the still background in the view 12, and determines whether the vehicle 18 constitutes an object for which a high resolution image thereof should be obtained by the image acquisition camera 8. The image acquisition camera 8 is mounted on the bridge or pylon 4 so as to have a limited field of view 20 which will include the front of a vehicle 18 when it reaches a predetermined location 22 on a carriageway 16. The location 22 and the field of view 20 are chosen to be near the point where moving vehicles will leave the field of view 12 of the detection camera 6, as shown in FIG. 3. On determining that the vehicle 18 represents an object for which an image is to be acquired, the node 2 estimates the time when the vehicle 8 will enter the field of view 20 of the acquisition camera 8, on the basis of the movement of the vehicle which has been monitored by the detection camera 6. The node 2 provides trigger information to control circuitry associated with the acquisition camera 8 so as to trigger the camera 8 at the estimated time. A high resolution image of the front of the vehicle 18 is obtained from which considerable identifying information can be derived, such as vehicle type and licence plate details, by subsequent digital electronic processing of the image.

In addition to identifying the vehicle 18 and estimating the time for triggering the acquisition camera 8 the node 2 is able to use the images from the detection camera 6 to discriminate between vehicles on a number of characteristics, such as size, to determine those for which high resolution images are to be acquired. For example, the system is able to distinguish between large vehicles such as trucks and coaches, and other moving objects within the field of view 12, such as cars and motor bicycles. The node 2 is also able to determine from the images obtained by the detection camera 6 the current speed of the vehicle 18 and whether the driver is committing any traffic or other offenses, such as tailgating or illegal lane changing. The system can also be used to detect stolen vehicles.

Figure 4:
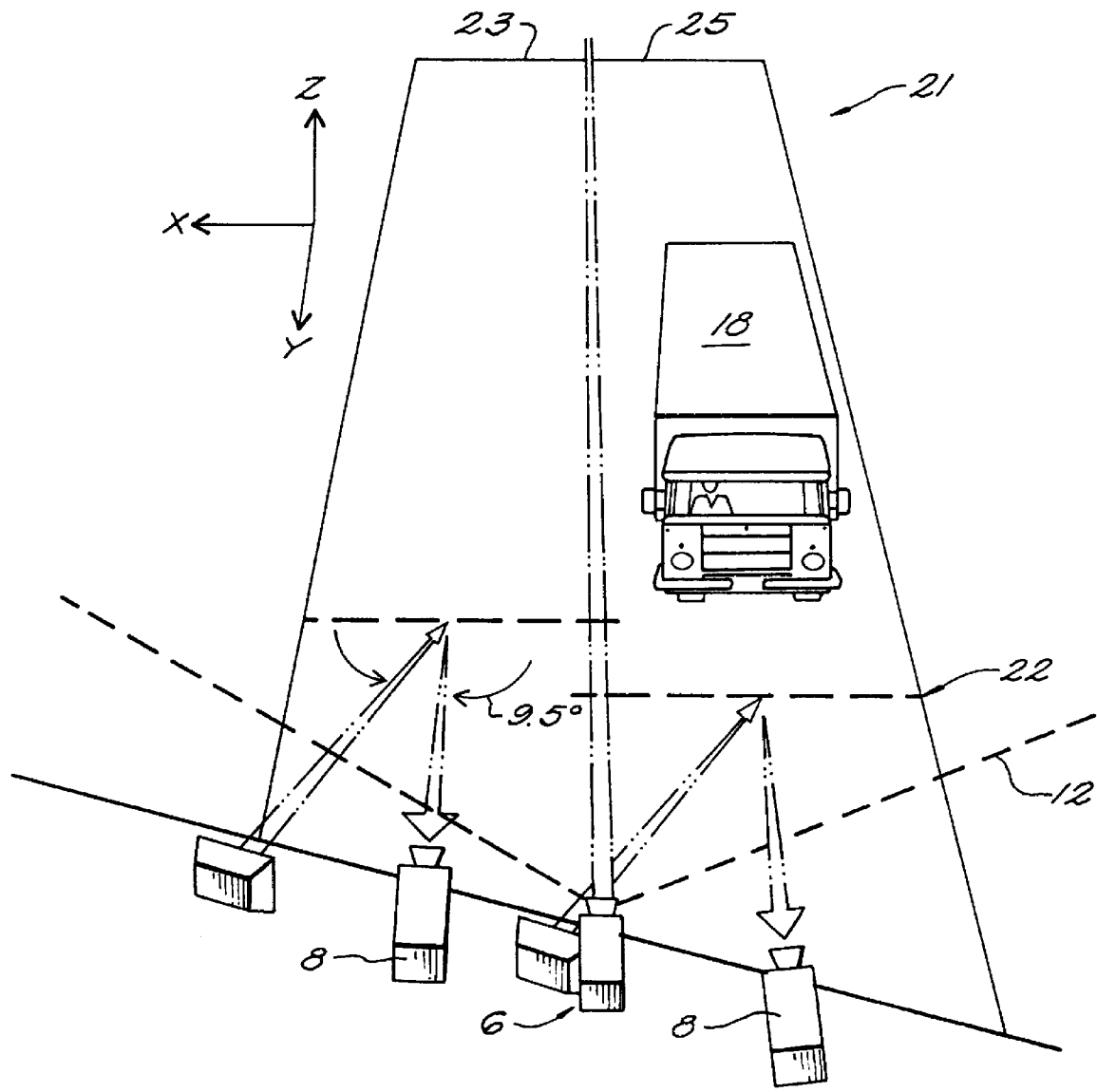
FIG. 4 is a front perspective view illustrating use of a preferred system for monitoring vehicles.

The detection camera 6 and the control unit 10 are able to monitor all of the moving vehicles 18 and 22 within the field of view 12 whilst acquiring the images of selected vehicles at the location 22. For a multi-lane carriageway 21, as shown in FIG. 4, the field of view 12 of the detection camera 6 extends over all of the lanes 23 and 25 of the carriageway and an image acquisition camera 8 is provided for each lane 23 and 25. The node 2 is therefore able to monitor the moving vehicle 18 to determine in which lane it will be when it reaches the image capture location 22 and activates, as required, the acquisition camera 8 corresponding to that lane 23 or 25.

Figure 5:
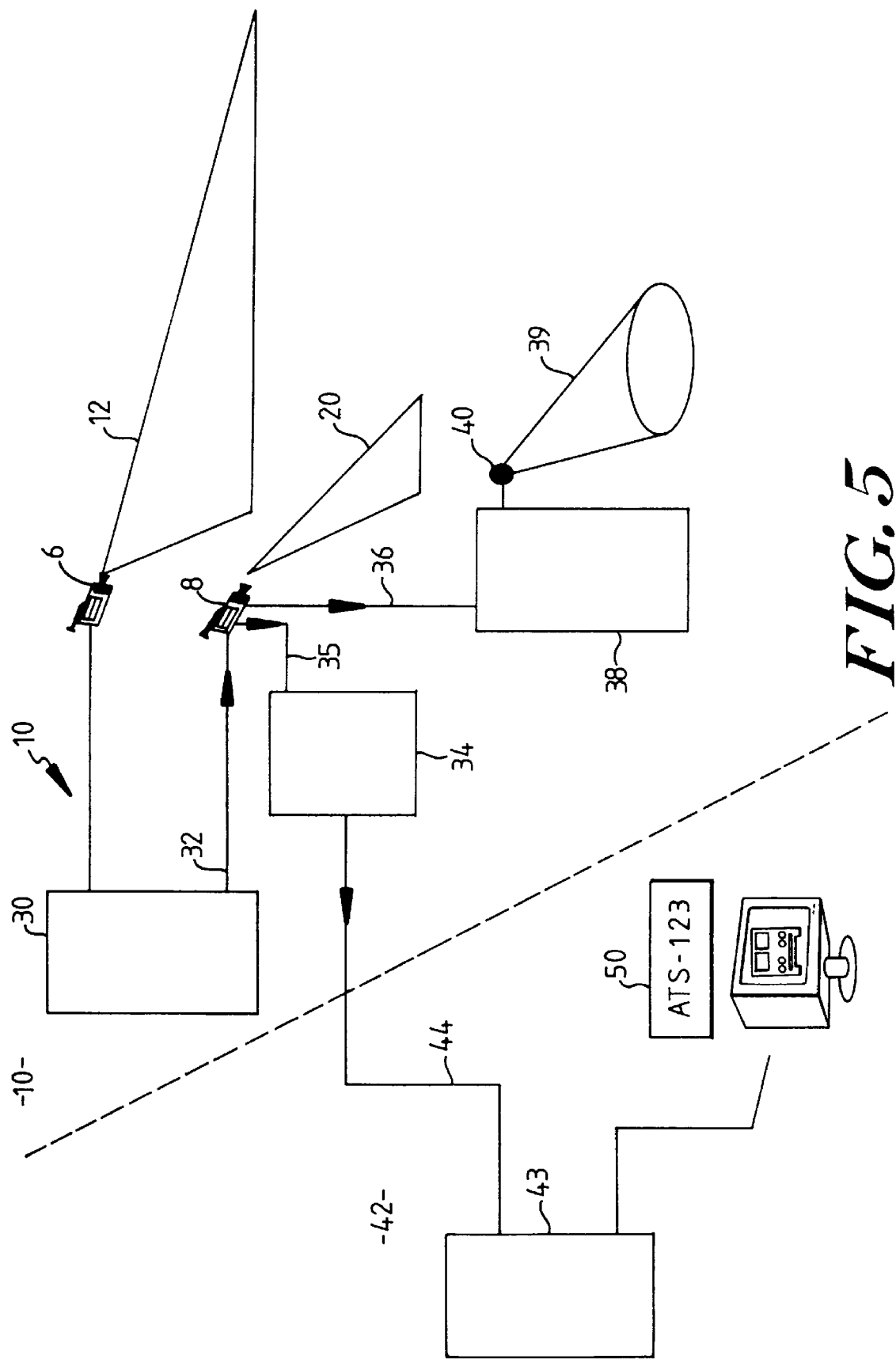
FIG. 5 is a block diagram of a preferred embodiment of the vehicle monitoring system.

The control unit 10, as shown in FIG. 5, includes vehicle detection circuitry 30 for processing the images generated by the detection camera 6 so as to provide trigger signals on a bus 32 to the image acquisition camera 8. A selected camera 8 is triggered to acquire an image in accordance with the timing information determined by the detection circuitry 30, and the camera 8 provides a trigger signal on a line 36 to a flash triggering circuit 38, of a corresponding infrared flash 40 mounted adjacent the selected acquisition camera 8. The image obtained by the trigger acquisition camera 8 is received by an image acquisition circuit 34. The detection circuit 30 determines the light intensity within the field of view 12 of the detection camera 6 so as to determine the correct level of exposure for the acquisition camera 8, and in turn the correct level of energy to be discharged by the flash 40 to achieve the desired level of exposure. The use of an IR flash is advantageous as activation is difficult to detect visually. Visible wavelengths produced by the flash are removed by IR band pass filters.

The vehicle monitoring system includes an acquisition image processing system 42 connected to the control unit 10 for receiving and processing the images acquired by the camera 8 to extract vehicle information therefrom. The acquisition image processing system 42 may form part of the node 2 or be positioned remote from the node and connected to the control unit by a telecommunications line 44 from the acquisition circuit 34. The system 42 comprises a processing station 43 configured to automatically extract the required information from the image, such as licence plate details 50.

Figure 6:
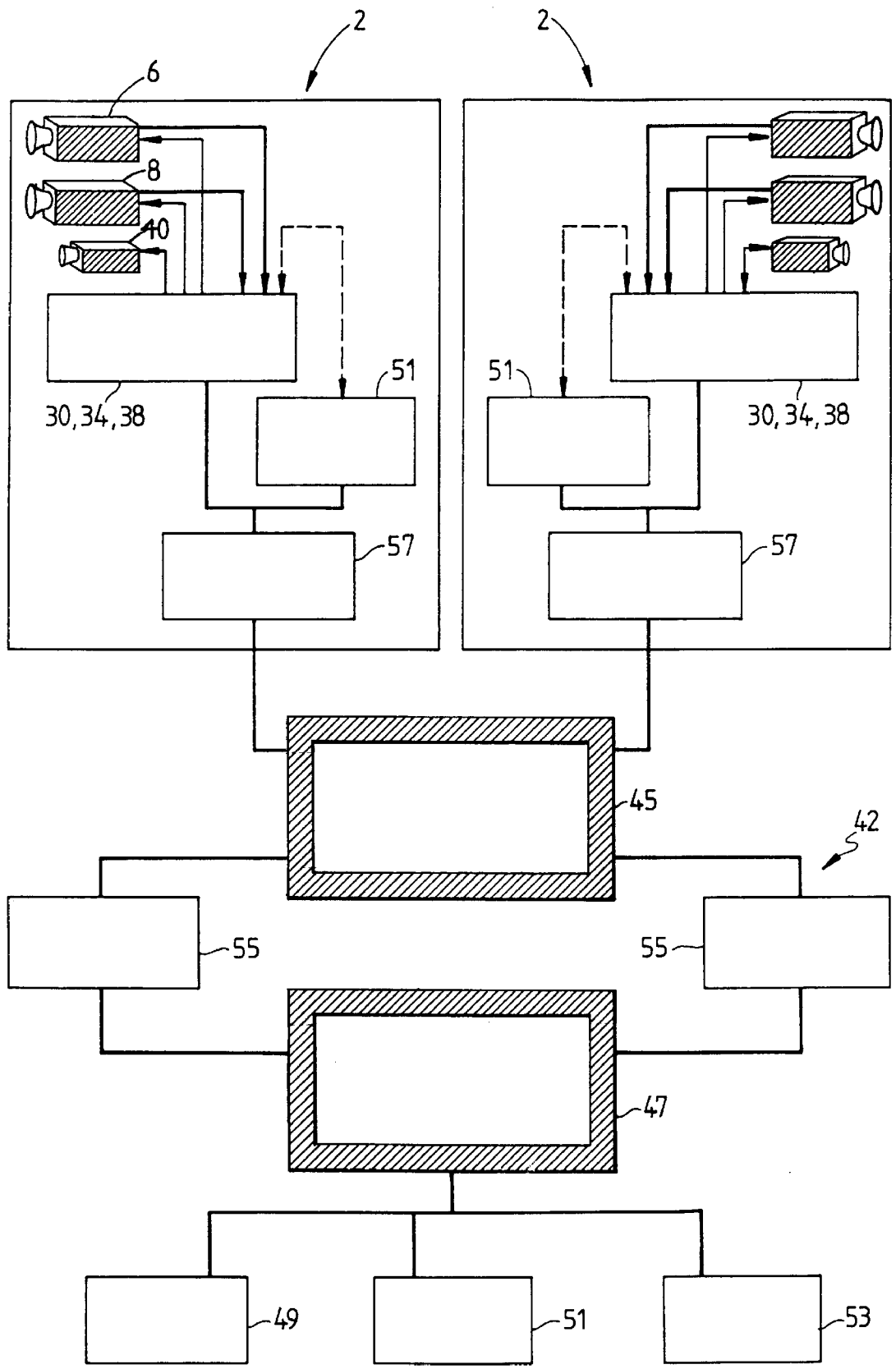
FIG. 6 is a block diagram of connection across a digital telecommunications network of two nodes and a central server of the vehicle monitoring system.

The acquisition image processing system 42 when implemented at a remote central site, as shown in FIG. 6, includes communications controllers 55 connected to a public digital telecommunications network 45, and a central computer server 47 which serves a local area network (LAN) connecting computers which implement an acquisition image database 49, a licence plate recognition system 51 and a remote site user interface 53. The communication controllers 55 are provided for each node 2 which sends images to the processing system 42. The nodes 2 each include an image buffer and communications controller 57 for storing images obtained by the acquisition circuit and communicating with the communications controllers 55 of the central image processing system 42 to send the images over the integrated services digital network (ISDN) 45 to the central server 47. The communications controllers 55 manage the high speed image transfers over the ISDN 45, and handle housekeeping, error detection and correction for image transfers between the nodes 2 and the central server 47. The central server 47 communicates with the controllers 55 so the nodes 2 act as extensions of the LAN maintained by the server 47. Image processing can also be performed at each of the nodes 2, for example, the nodes 2 may each include a licence plate recognition system 51 which performs optical character recognition (OCR) on the acquired images to extract vehicle information, such as licence plate details.

Figure 7:
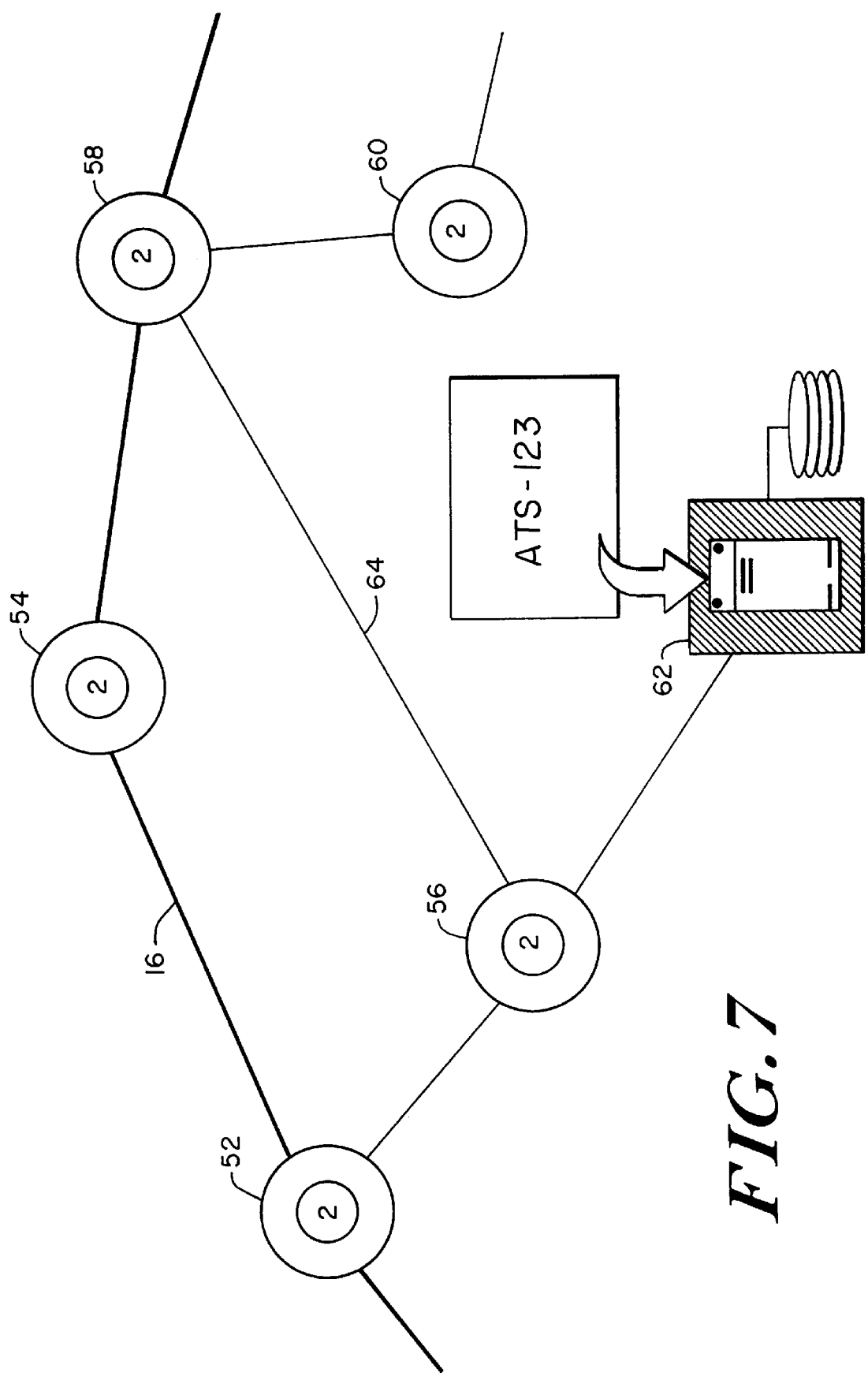
FIG. 7 is a view illustrating connection of a large number of nodes of the vehicle monitoring system.

The vehicle monitoring system, as shown in FIG. 7, comprises a plurality of camera nodes 2 mounted as a number of locations 52 to 60 on vehicle carriageways. The nodes 2 may be connected by telecommunications lines of the ISDN 45 to communicate with another and/or connected to a central control station 62, so as to compare information collected at each of the nodes 2. The control station 62 includes the acquisition image processing system 42. The nodes 2 and the control station 62 are able to monitor a vehicle's progress along the carriageways 16, 64 using information collected by the nodes 2, which includes, in addition to vehicle identifying information, the date, time and location at which an image is acquired. This is particularly advantageous as the information can be used to determine the average speed at which a vehicle has travelled between two nodes 2. If the average speed indicates that the vehicle has exceeded the speed limit in travelling between the nodes, then authorities can be contacted so as to intercept the vehicle. Alternatively, the central station 62 issues an infringement notice to the registered owner of the vehicle. The station 62 and/or the nodes 2 may also contain information on stolen vehicles and the authorities are contacted when a stolen vehicle is detected. Vehicle drivers negotiating long distances would be reluctant to instantaneously exceed the speed limit at chosen locations, if they are aware that they will be intercepted or issued with an infringement notice by travelling between two locations 52 and 54 of two nodes, too quickly. The distance between the nodes would be relatively large and an allowable time for travel between the nodes would be established corresponding to a permitted average speed. The ability to monitor average speeds by the system represents a significant development which can be used to deter excessive speeding by large vehicles, such as trucks and buses, on major roads, and further enables detection of drivers who fail to take scheduled rest stops.

The detection camera 6 produces video fields of 312 and 313 horizontal scan lines respectively which are each duplicated to produce a complete 625 line video frame. The fields are converted into 512×512 pixel 8 bit quantized digital images which occur at a video field period of 20 ms. The vertical resolution of the detection camera 6 is dependent on the vertical field line resolution which is approximately 300 elements, digitized into 512 pixels, for a maximum distance which the camera 6 can view on a horizontal roadway. The maximum distance D is given by:

$$D = h \tan[\arctan(D_{min}/h) + \Phi] \quad (1)$$

where

D=distance along road covered by camera view h=height of camera above road $D_{min}$=distance of closest position of camera view along roadway $\Phi$=lens field of view angle The field of view across the roadway is given by:

$$W = \left(\frac{w}{f}\right) L \quad (2)$$

where

W=field of view across the roadway w=width of the sensor f=lens focal length

L=object distance from camera

The camera 6 includes a 12 mm lens and an 8.8 mm×6.6 mm CCD sensor to optimize vehicle image size and maintain a four lane coverage, 3.5 meters per lane, at the image acquisition points 22. An antiblooming and antismear sensor is included to prevent blooming or smearing of an image by vehicle lights. The infrared filter of the camera permits infrared wavelengths up to 950 nm, which allows the detection camera 6 to receive the infrared component of vehicle lights, thereby providing more image information to detect and monitor vehicles. The detection camera 6 has a +40 dB gain range, and the exposure time is fixed at the field period, 20 ms.

The exposure control of the detection camera 6 controls the intensity of light falling on the camera sensor so as to maintain consistent video signal quality and obtain a predictable representation of a vehicle. Acceptable exposure of the sensor can be maintained through the appropriate match of sensor sensitivity and control of the intensity or power of the electromagnetic wavelength falling on the sensor, as shown with reference to equation 3.

$$E \alpha (HA) T \quad (3)$$

where

E=exposure of light on sensor

H=incident e.m.r. power per $cm^2$ (irradiance)

A=area of pixel sit in $cm^2$

T=time in seconds that light or e.m.r. falls on sensor

The time T light falls on the trigger camera is held constant at the video field rate of 20 ms. This is sufficiently short to "freeze" the motion of the vehicle in the relatively large field of view 12 of a multi-lane carriageway. A shutter is not included in the detection camera 6 as electronic shutters or short duration exposure control produced adverse effects from either image smear or blooming from sunlight reflections or vehicle headlights, as exposure times were shortened. The incident light irradiance, H, required to provide sufficient exposure of a sensor pixel is dependent on the sensitivity to a particular wavelength of light. Sensor pixels also have a minimum light sensitivity to produce a satisfactory signal to noise ratio in the video signal, and a maximum light level before the sensor pixels become saturated. The range of light irradiance that can be imaged in a single exposure for the sensor is approximately 100:1. The range of light irradiance which can be presented to the camera 6 during a 24 hour period can be varied by as much as $10^5$:1. Accordingly, the exposure control system limits H sufficiently to maintain it within the dynamic range of the sensor to prevent sensor saturation from the illumination levels typically present during a 24 hour period. The exposure control is a f1.8 to f1000 auto iris lens system which is designed to provide exposure adjustment based on lens aperture and progressive neutral density filtering of light as the lens aperture decreases. The rate of change of the exposure control, or the rate that H changes, is restricted as moving vehicles are located by differencing images obtained by the camera 6 from a slowly changing background image, as described hereinafter. The rate of change is restricted to ensure changes in exposure of the sensor are not mistaken for changes in the background image, which would adversely affect detection and monitoring of vehicles. The auto iris reaction time is set to match the ratio at which background images are subtracted from the current image. The slow rate of change also prevents the iris responding too fast to transient changes in light, for example, reflected off roofs of vehicles as they pass close to the camera 6. The rate of change is restricted to 10 seconds for a halving or doubling of light irradiance H.

The exposure control system ensures that transient extremely bright reflections or headlights do not saturate the sensor pixels by limiting the exposure on the sensor to keep it below the sensor's saturation level for the peak intensity of light received in the field of view 12. The peak video level obtained from the camera 6 is monitored, as discussed hereinafter, and used as a basis for controlling the setting of the diaphragm of the iris.

The sensor sensitivity is selected in order to produce video signals which allow the subtraction of the background for vehicles not using headlights during dusk and dawn illumination levels. The sensor is also responsive to near infrared light to maximize the signal from large vehicle side and perimeter lights, yet the response must be still below a threshold where blooming may occur from vehicle headlights. The lens of the camera 6 can be controlled fully to provide sufficient exposure for the sensor for vehicles without headlights during the dawn and dusk periods. The maximum lens aperture is held at f4 for a luminance value of about 10 cd/$m^2$ reflecting from the carriageway. Once the carriageway luminance level fall below approximately 25% of this level, vehicle segmentation, as discussed hereinafter, is based on vehicle headlights. Control signals representative of the illumination levels are derived from an illumination histogram of video signal levels for the pixels, described hereinafter.

Figure 8:
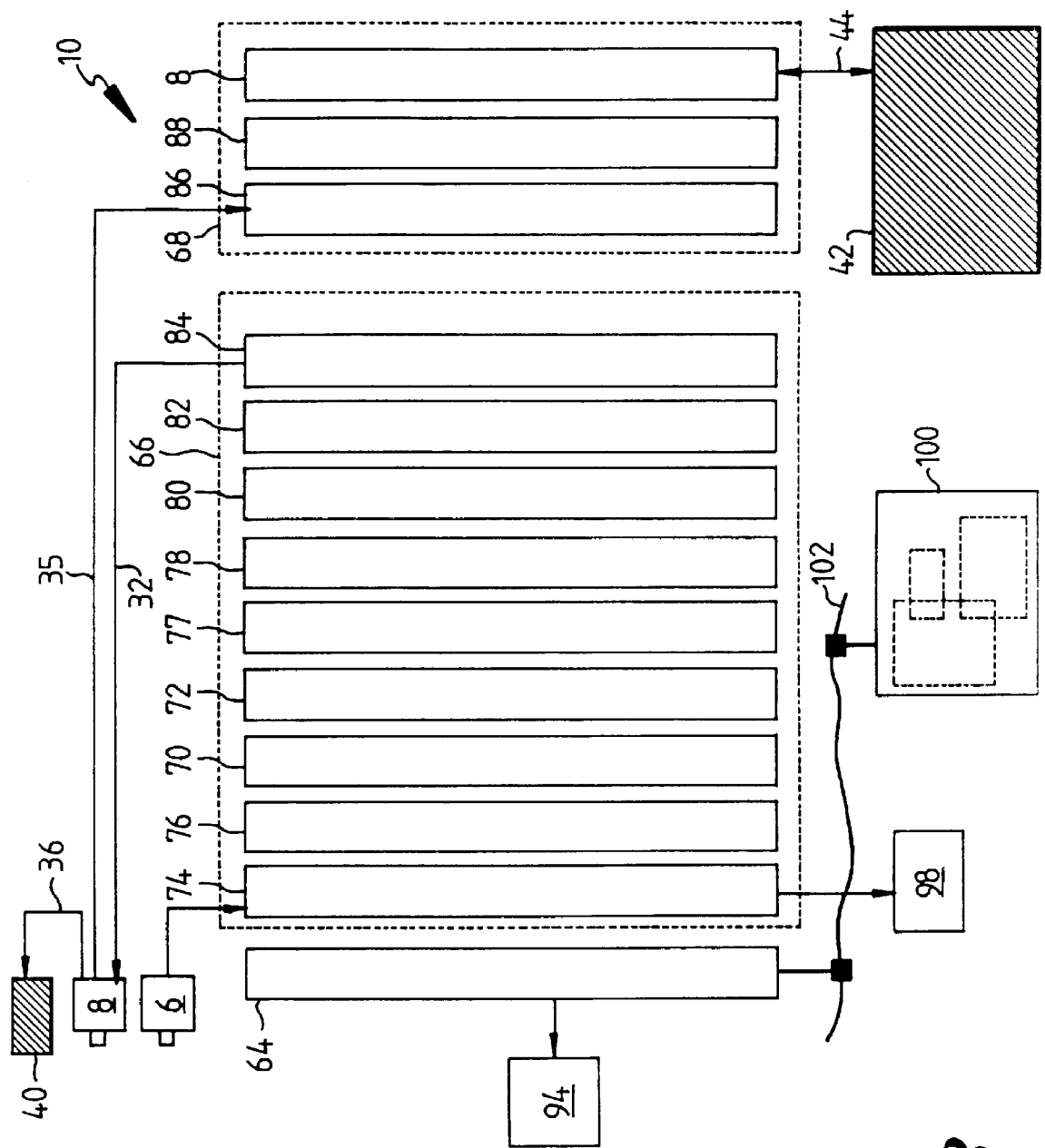
FIG. 8 is a block diagram of vehicle detection and image capture circuitry of the vehicle monitoring system.

The control unit 10 of a camera node 2, as shown in FIG. 8, includes a Motorola 68030 CPU 64 and a detection and trigger sub-system 66 connected to receive images from the detection camera 6, and an acquisition sub-system 68 connected to receive images from the acquisition camera 8. The sub-systems 66 and 68 include a number of Datacube pipelined pixel rate video processing circuit boards which are controlled by the CPU 64. The boards and the CPU 64 are mounted on and interlinked by a VME (Versa Module Europe) bus. The CPU 64 and the boards of the sub-systems 66 and 68 run a software operating system known as VxWorks, which is a real time multi-tasking system. The detection sub-system 66, the CPU 64 and controlling software form the detection circuit 30, and the acquisition sub-system 68, the CPU 64 and the controlling software form the acquisition circuit 34. The image buffer and communications controller 57 can be connected to the acquisition circuit to provide access to the ISDN 45.

The detection sub-system 66 processes the 512×512 pixel images of each video field obtained by the detection camera 6 and is designed to achieve low latency between changes in the field of view 12, by using pipelined processing of the image data with no intermediate storage. The data rate through the video data paths of the pipeline, known as MAXBUS, is 10 million pixels per second. Processing the video fields individually, as two consecutive frames of half vertical resolution, achieves a sample rate of 50 Hz and eliminates the deinterlacing latency required for full frame processing.

Figure 9:
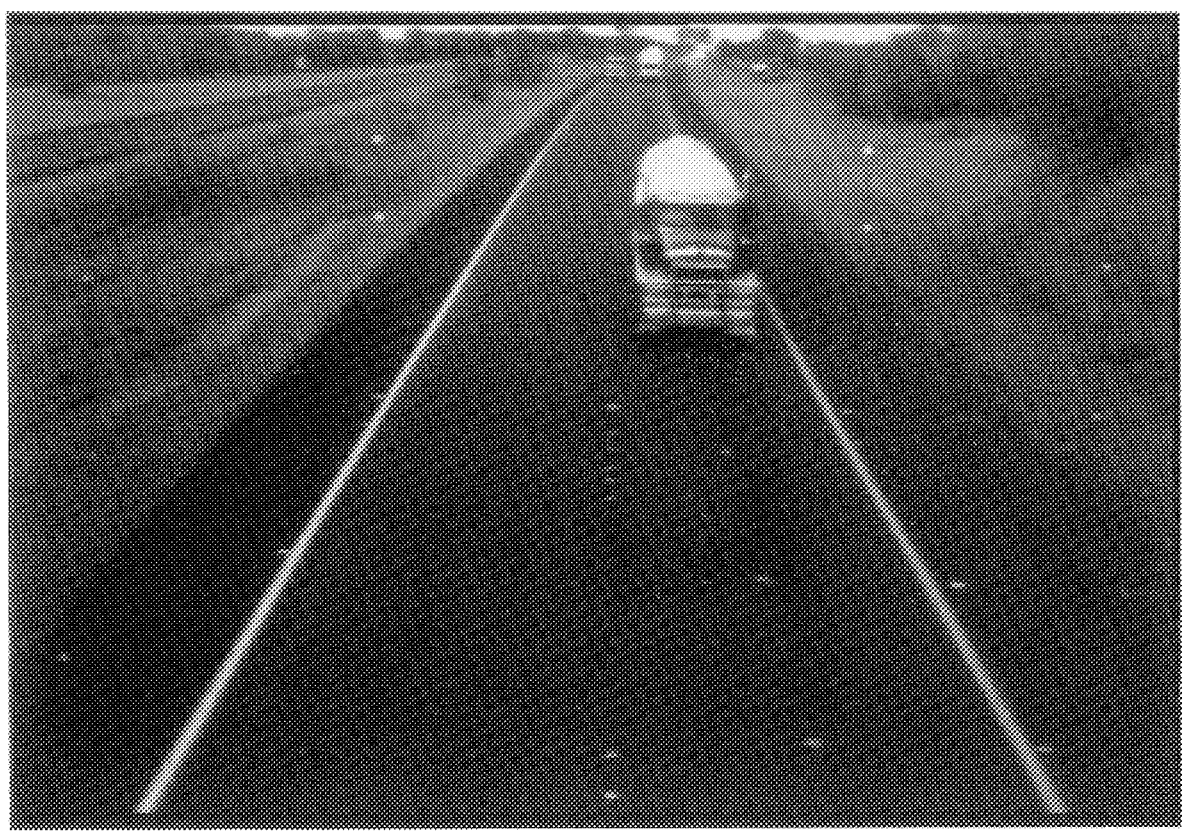
FIG. 9 is a digitized image produced by the vehicle detection circuitry from an image generated by a detection camera of the system.
Figure 10:
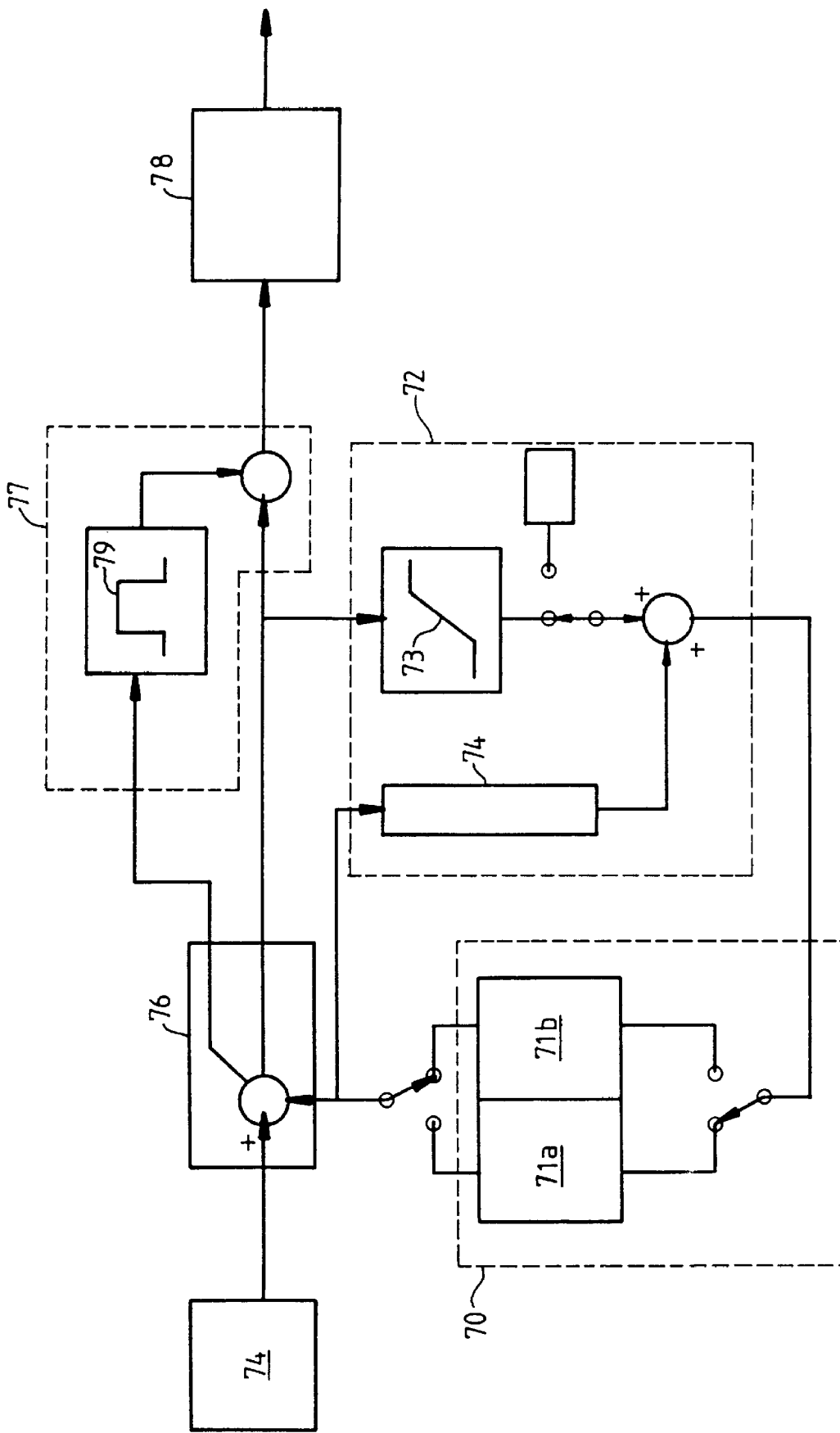
FIG. 10 is a block diagram of the control of the circuit boards of the vehicle detection circuitry to perform a segmentation process.
Figure 11:
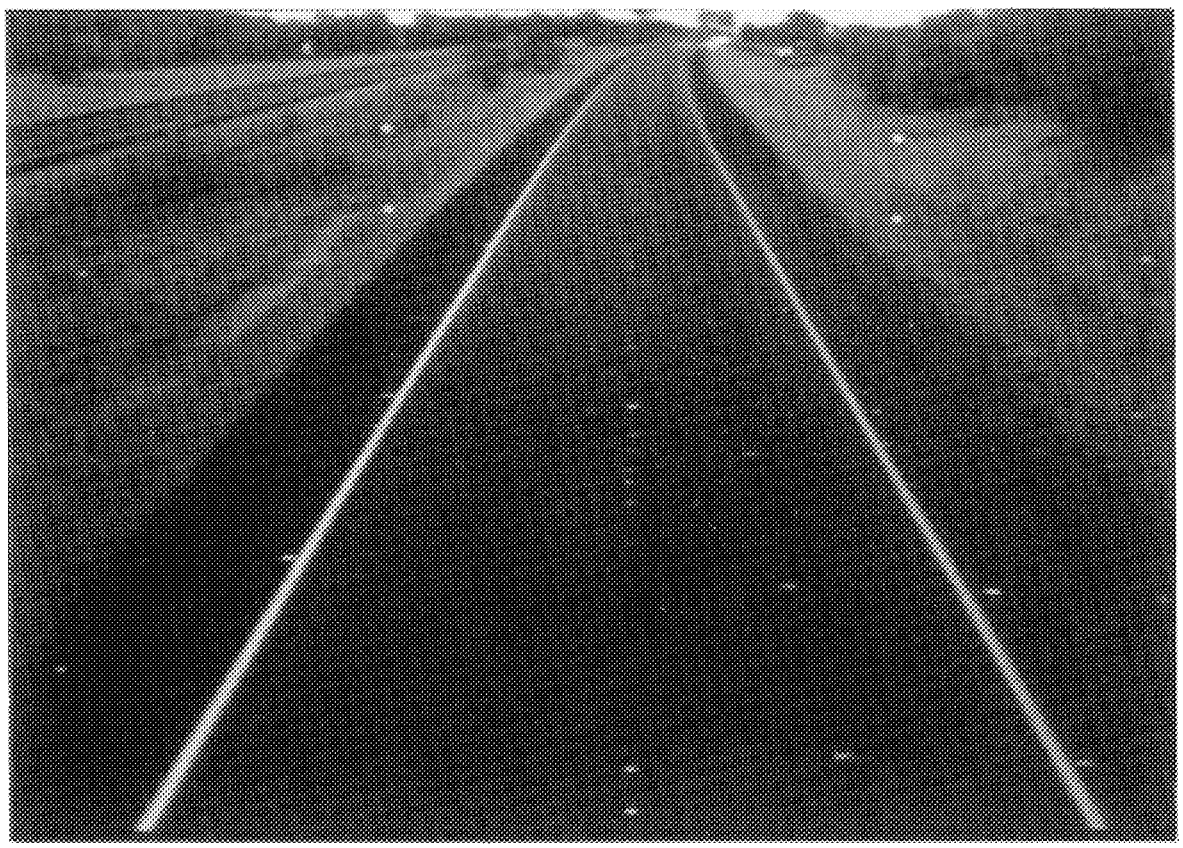
FIG. 11 is a static background image stored in the vehicle detection circuitry.

The detection sub-system 66 includes a video digitizer board 74 which receives the fields output via the detection camera 6 and converts them into the 512×512 pixel representation. The digitizer board 74 is a Datacube Digimax board and produces a greyscale image representation with each pixel having a value within the 2's complement positive range of 0 to 127, 0 representing black and 127 representing white. The 512×512 pixels are able to produce a live image display as shown in FIG. 9. The image produced by the digitizer board 74 is input to a background differencer board 76 which, as shown in FIG. 10, subtracts a background image, as shown in FIG. 11, from the current or live image to produce a preliminary difference image, shown in FIG. 12. The difference image comprises a grey level of representation of the moving objects within the field of view 12. By virtue of the image subtraction the pixel image range for the difference image extends from −128 to 127. The background differencer board 76 is a Datacube MaxSP board.

The background image represents the static background viewed by the detection camera 6 and is stored in one of two framestores 71 of a background image store board 70, being a Datacube Framestore board. The background image is continually updated by a background update board 72, which is another Datacube MaxSP board that ensures one of the framestores 71 holds an image correctly representative of the static background within the field of view 12 of the detection camera 6. The update board 72 then receives the current background image from one of the framestores 71b and is combined with a filtered form of the preliminary difference image to produce a new background image which is outputted by the update board 72 to the other framestore 71a. The controlling software then switches to the other framestore 71a for submission of the background image to the differencer board 76, and ensures the next updated image is submitted to the first framestore 71b. The background update board filters the preliminary difference image in accordance with a filter characteristic 73, as shown in FIG. 10, which is held in RAM and performs a limiting function on the grey level pixels of the preliminary difference image so as to restrict them between a programmable range, for example −2 and +2 pixel range. The limiting function restricts the correction made to the current background image when it is combined with the difference image, after having been subject to a delay 74 to allow for the time taken to apply the limiting filter function 73. The limiting function ensures the correction made to the background image per frame is only slight so that transient differences, such as those produced by moving objects, are not allowed to significantly alter the stored background image held in the image store board 70. The shape of the filter function 73 represents that grey level differences added to the background image are confined to a level t for all difference levels>[and -t for all difference levels<-t, where t is a low threshold such as 2. The state of the background update board 72 can also be changed to disable update of the background image. The rate of change in the background image is set so as to be faster than the rate of change of scenic exposure due to variation in the lens aperture of the detection camera 6. The rate change governed by the limiting function is important because if the rate is too slow lighting changes can produce incorrect difference images, and if the rate is too fast then moving objects may appear in the background image as a blur.

The preliminary difference image produced by the background differencer board 76 is outputted to a third Datacube MaxSP board, a shadow elimination board 77. The shadows produced by vehicles which appear in the difference image, shown in FIG. 12, pose a significant problem for the images processed in determining the type of vehicle. The shadows can mistakenly represent the vehicle as being larger than its actual size, and if a discrimination is being made between the large vehicles, such as trucks and buses, and small vehicles, such as cars and motorcycles, then the shadow cast by a car can lead to it being classified as a large vehicle. Therefore the shadow elimination board 77 is employed to eliminate all grey levels in the difference image which could represent shadows. This is done by defining a grey level window range 79 in RAM, as shown in FIG. 10, whereby the preliminary difference image is processed so as to set to zero all pixels having a grey level within the window 79. The result is then used to mask the preliminary difference image so that the elimination board 77 outputs a shadow filtered difference image having all of the pixels with grey levels within the window range 79 removed. FIG. 13 illustrates a live image with all of the pixels having a grey level within the range of the window 79 shown as green. The range defined by the window 79 is adjusted depending on the light conditions within the field of view 12 of the detection camera 6, as discussed hereinafter.

Figure 14:
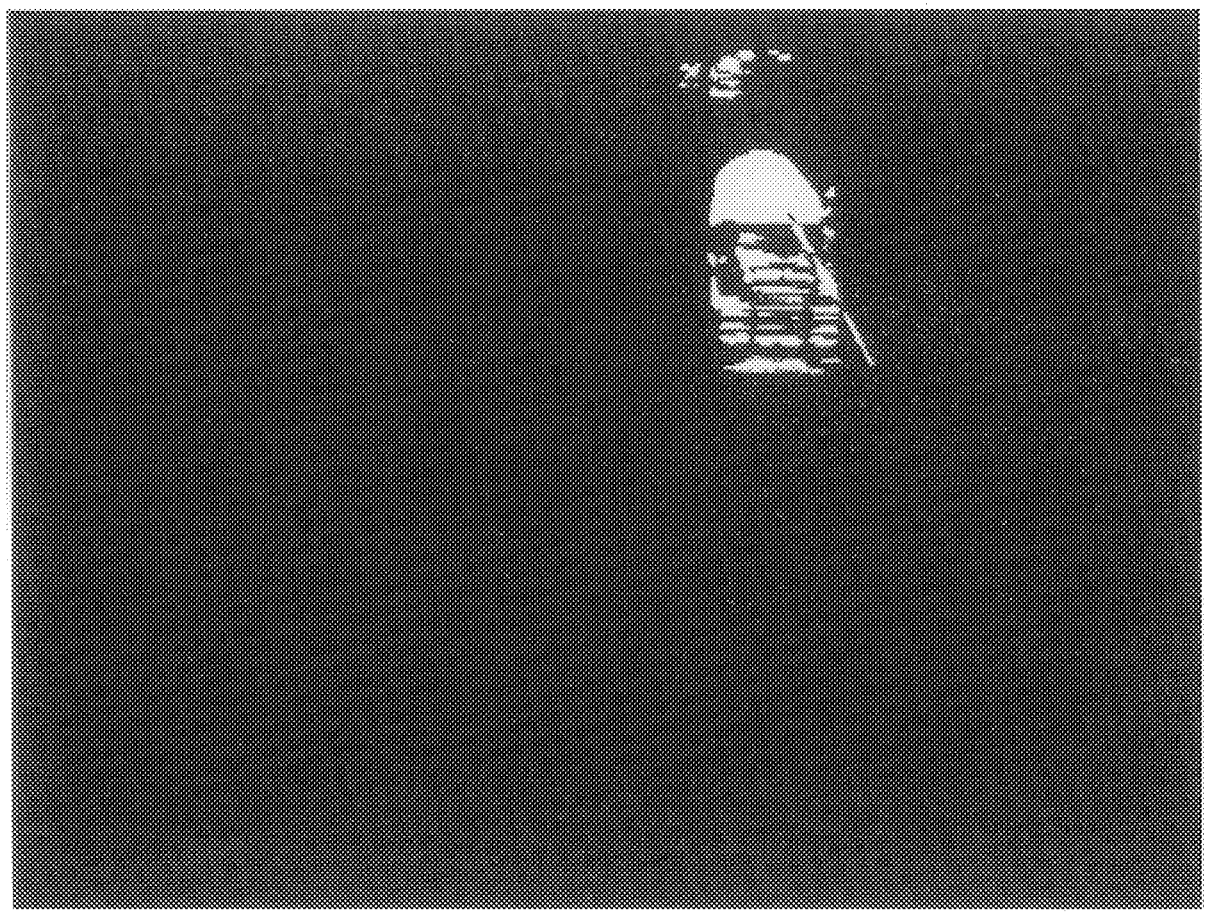
FIG. 14 is a segmented image derived by the vehicle detection circuitry.

The shadow filtered difference image is inputted to a threshold and median filter board 78, which is a Datacube Snap board. The filter board 78 performs binary image processing on the difference image so as to convert the grey level representation of the moving objects to a binary representation, which corresponds to white or black, for further processing by the detection sub-system 66. The filter board 78 uses a threshold value to convert all of the pixels, with grey level values within the range −128 to +127, to pixels having values of either 0 or 255. Accordingly, the final difference image produced by the filter board 78, when viewed by a real time display, shows the moving objects within the field of view 12 as a collection of white pixel blobs, as illustrated in FIG. 14. The blobs may correspond to parts of moving vehicles which reflect sunlight and, at night, may correspond to light produced by a vehicle's external lights. Noise regions of one or more pixels in size are eliminated by the board 78 which performs binary median filtering on 3 by 3 pixel neighbours.

The software used to control the CPU 64, the detection sub-system 66 and the acquisition sub-system 68 is provided in the accompanying microfiche appendix, and the program used to control the above image segmentation process illustrated in FIG. 8 is sec.c.

Figure 15:
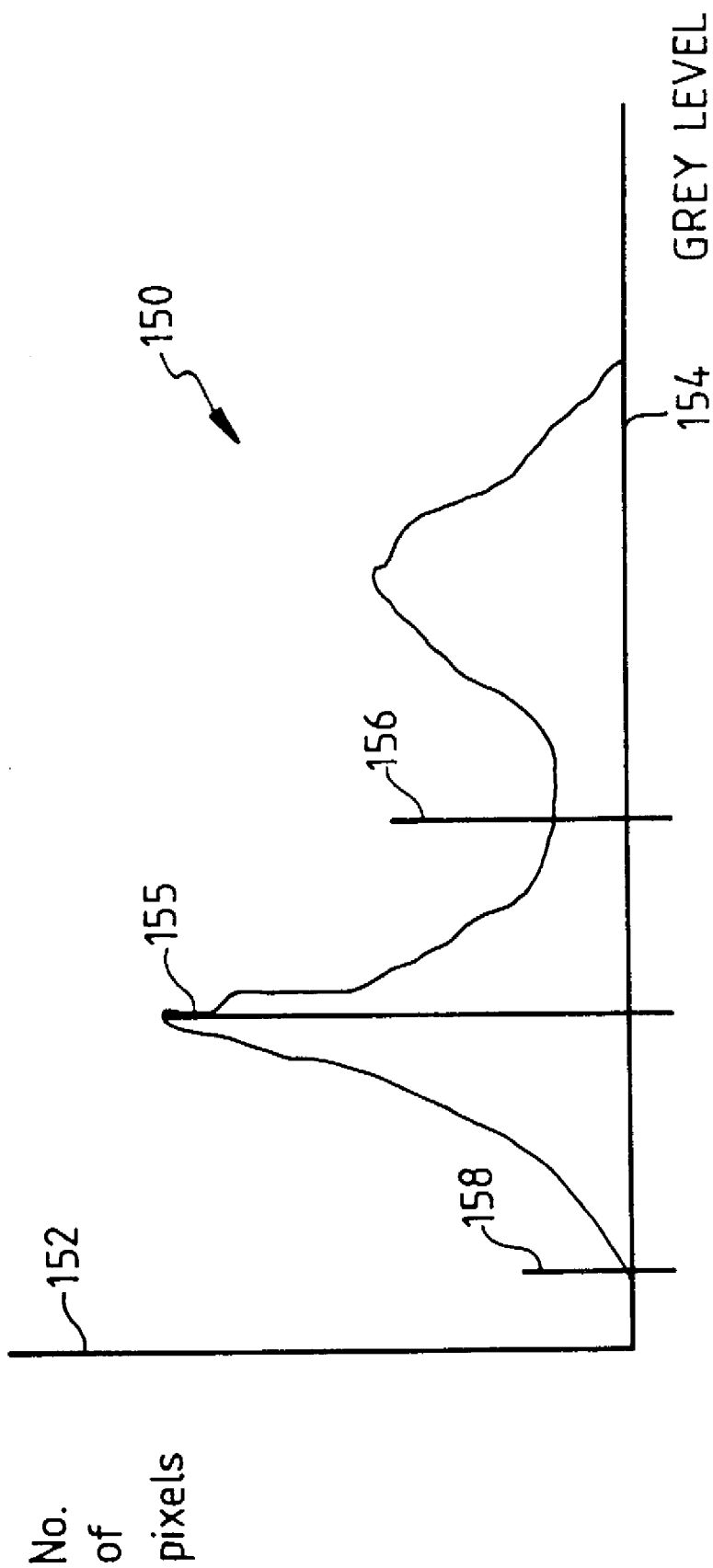
FIG. 15 is a histogram of pixel grey levels.

The light conditions within the field of view 12 of the detection camera 6 are determined with reference to a histogram 150, as shown in FIG. 15, of pixel grey levels produced by the CPU 64. The CPU 64 processes a window of the stored background image which is approximately 300×400 pixels every 10 seconds. The CPU 64 calculates the number of pixels in the window having each grey level and tabulates the results as the histogram 150, with the number of pixels on the vertical axis 152 and the grey level values on the horizontal axis 154. The histogram 150 can be displayed to provide a real time representation of the light within the field of view 12. From the grey level value which represents the position of the median 156, one of three lighting conditions, day, dusk, or night, can be instantaneously determined. Dawn is considered to be the same lighting condition as dusk. The positions of the peak 155, median 156 and the minimum 158 are used to determine the range of the window 79 used in the shadow elimination board 77. For daytime conditions, the shadow window 79 is determined as being from the values α.peak to (peak+median)/2, where α is typically 0.5. For dusk conditions, the shadow window 79 is from minimum to (peak+median)/2. Shadow pixels of course, do not need to be eliminated during night conditions. Estimation of the shadow pixel range is an approximate technique which is aided if areas of permanent shadow are in the field of view 12, such as cast by trees or an overpass bridge. The program for generation of the histogram is histo.c.

The segmented images produced by the filter board 78 are submitted to an Area Perimeter Accelerator (APA) board 80, which is an APA 512 board produced by Atlantek Microsystems, of Adelaide Australia, designed to accelerate the processing of area parameters of objects in a video scene. The board 80 operates with controlling software to perform analysis of the white pixel blobs within a 300×400 pixel window corresponding to the window on which the histogram 150 is produced. The APA board 80 and the software perform a classification and feature extraction process in real time on the blobs so as to facilitate the formation of clusters of blobs which correspond to a moving vehicle. The APA board 80 computes features of the white pixel blobs and the features are used by the clustering software to determine, on the basis of rules and classification code, whether the blobs can be combined to form a cluster. Once formed, the size of a cluster indicates whether it corresponds to a large vehicle, such as a truck or bus, or a small vehicle, such as a car. Labelling software is used to monitor movement of clusters over successive fields so as to determine which clusters are to be assigned a unique label and which clusters are to share a label, as they are considered to relate to the same vehicle.

Different considerations apply in respect to whether the carriageway 16 is being viewed by the detection camera 6 at night or during the day, and the rules and classifications used are adjusted, on the basis of the data provided by the histogram 150, to account for night conditions, rain and inclement weather, which result in a moving vehicle producing different corresponding pixel blobs. For example, the rules and classification code needs to be adjusted to account for reflection produced by vehicle lights on the road during night conditions.

Once a cluster has been formed, its movement is monitored to determine its instantaneous speed and its position with respect to a point on the edge of the road using Kalman filter techniques. Corrections are made for perspective as the cluster moves towards the cameras 6 and 8. The information obtained from monitoring the movement of the cluster is used by the CPU 64 to predict when the cluster will enter the field of view 20 of the acquisition camera 8, and in particular when a vehicle reaches a position 22 which an image of the vehicle is to acquire. The predicted time estimate is updated for every field generated by the detection camera 6, 50 times per second. The predicted time is continually corrected as the CPU 64 monitors movement of a cluster unit it is satisfied the cluster will enter the field of view within 10 to 20 ms. A CPU 64 predicts the time by specifying the number of scan lines which need to be scanned by the camera 6 before the clusters within the field of view 20.

Figure 16:
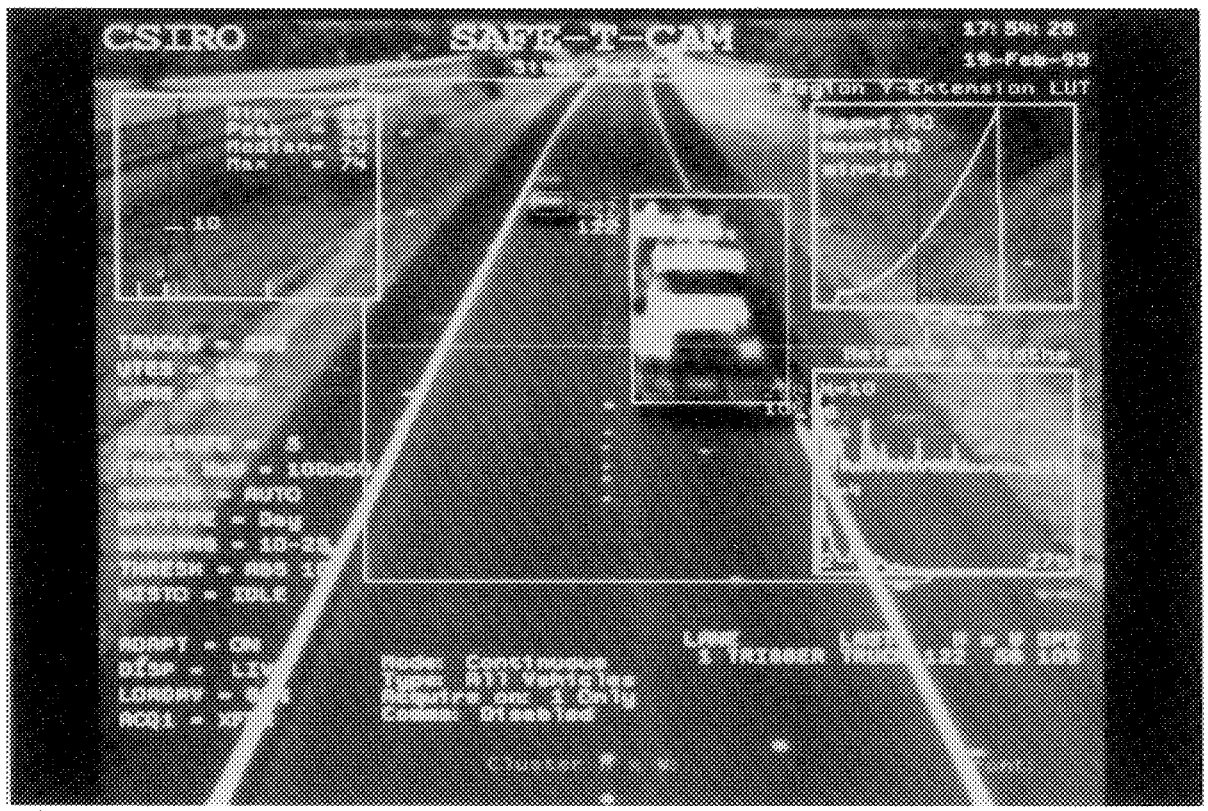
FIG. 16 is a real time status display generated by the system.

Performance of the control unit 10 can be monitored and controlled by peripheral devices, such as a printer 94 for error and event logging, a real time status display 98, and a control workstation 100, which may all be connected to the CPU 64 and the boards of the control unit 10 directly or by a local area network 102. A display of the real time status display 98 is illustrated in FIG. 16 which is the live image produced by the digitizer board 74 superimposed with cluster markings and other data. The histogram 150 is displayed at the left of the screen and the box around the vehicles are clusters which have been formed. The label number for each cluster is shown at the lower right-hand corner of each cluster, and the estimated speed of the vehicle, obtained by monitoring the cluster, is displayed directly below the label number. The large box around the vehicles represents the processing window, on which the clustering, labelling and tracking software operate, in addition to the histogram software. The line across the window is an acquisition line which corresponds to the position 22 at which high resolution images are to be acquired by the acquisition camera 8. A diagnostic graphics board 82, which is a Datacube Maxgraph board, is used to queue and configure graphic images for the real time status display 98.

The image processing performed by the CPU 64 and the APA board 80 for vehicle classification is handled by feature extraction, clustering labelling and tracking software listed in Appendix A. The operation of the software is largely controlled by parameter variables, which may be altered via an interactive shell of the software or by remote procedure calls from a graphical interactive command tool running under Xwindows on the control workstation 100.

The APA board 80 reduces the binary image pixels into a stream of feature vectors representing the blobs, or regions, in the images. Only a small sub-set of the features which can be computed by the APA are required, being the area, perimeter and bounding box for each blob, or region. A region is represented by raw data of 16 bytes and for a field of view 12 which includes 20 regions, the data rate is 16 kbytes/s which is less than 0.2% of the data rate for binary images, and is reasonable for software processing by the CPU 64.

Figure 17:
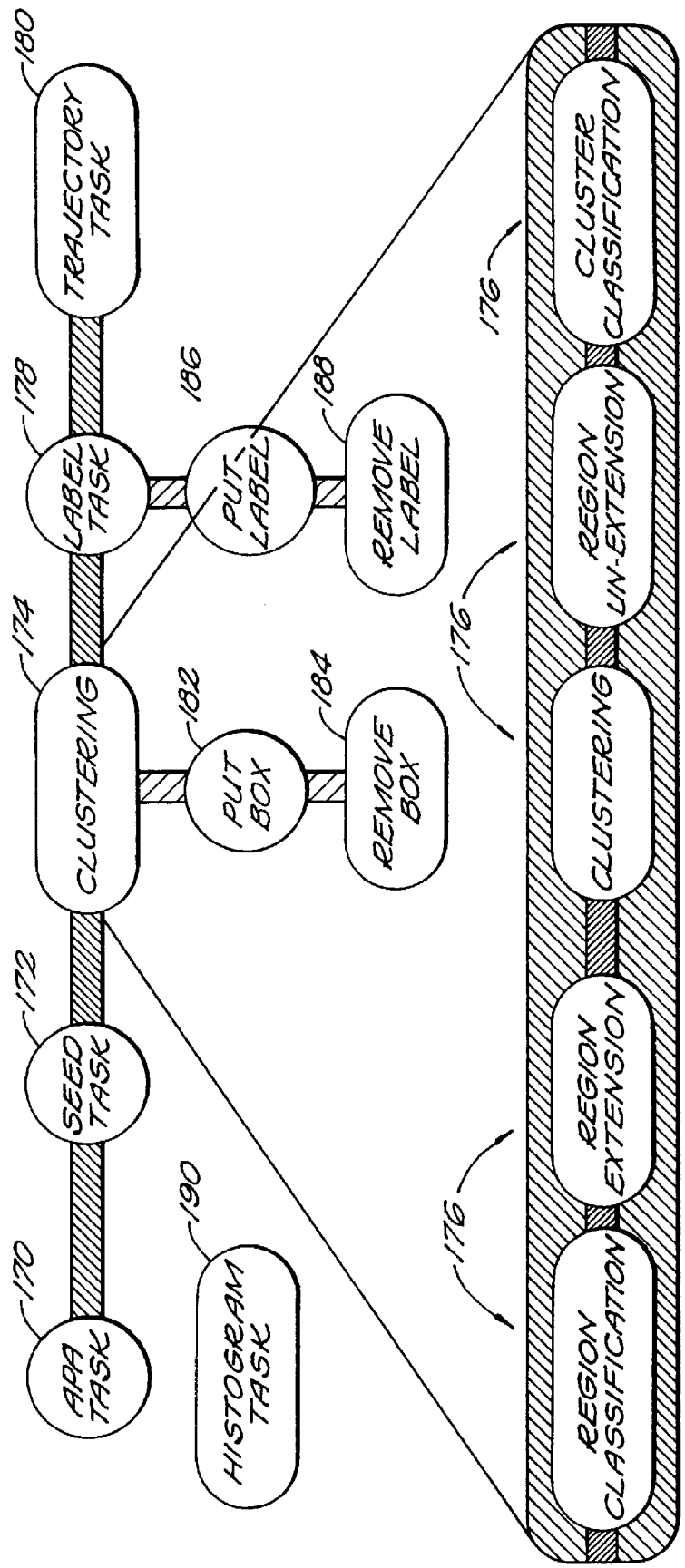
FIG. 17 is a flow diagram illustrating flow between the software tasks of the system.

The raw seed parameters are read from the APA hardware by the APATask 170, as shown in FIG. 17. A time stamp is given to each blob, and some initial screening is performed, where regions such as "black triangles" described hereinafter, are located and removed. Time stamping, inter alia, allows any latency in the system to be measured and compensated for. The files involved are ap.h, ip.h and apa.c. The seeds which correspond to white blobs within certain area constraints are passed via a VxWorks message pipe to the seedTask 172. The seedTask unpacks the raw seed parameters, or structures, and performs classification of regions based on each region's height to width ratio, "circularity", area and "coverage", as described hereinafter. Unwanted regions such as headlight and road reflections are removed and then each classified region is passed via another message pipe to the clusterTask 174. The files involved in performing the seedTask 172 are ip.h, ap.h and seed.c.

The clustering task is divided into five subsections 176, region classification, region extension, clustering, region unextension and cluster classification. The files involved are ip.h, ap.h, graf.h, trigger.h, disp.h, class.h, status.h and class.c. Once the regions have been clustered into clusters which have been classified as corresponding to separate vehicles, the coordinates of the clusters are passed onto a label task 178, once again by a message pipe. The label task monitors each cluster over a given period of time and if a cluster appears in roughly the same place as did a cluster from a previous video frame, then the label task considers them to be the same cluster. In this case, the new cluster inherits the label from the previous cluster. Otherwise if no match can be made, the new cluster is given a new label. The cluster's coordinates, along with its label, is then passed via another message pipe to a trajectory task 180. The files involved in the label task 176 are ip.h, label.h, class.h, disp.h, graf.h, trigger.h and label.c. The trajectory task 180 determines the time to trigger the acquisition camera 8 for clusters of a selected class, such as large vehicles. The put cluster box task 182, remove cluster box task 184, put label task 186, remove label task 188 and the histogram task 190 are tasks used to generate graphics overlaid on the video image, as shown in FIG. 16, for diagnostic purposes.

Figure 18:
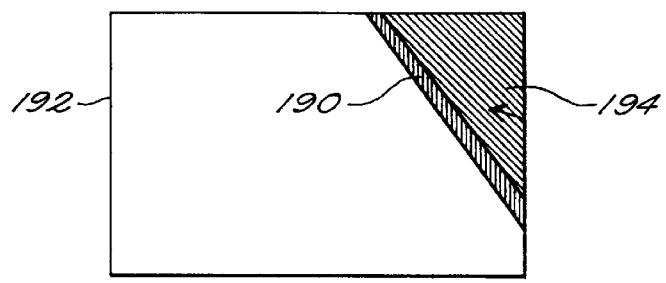
FIG. 18 is a diagram of the formation of "black triangles: in a processing window of the system.

The blob shape analysis performed by the APATask 170 and seedTask 172 is not extensive during daytime segmentation, as all blobs are considered valid. However, during dusk and night time segmentation, blobs can occur due to vehicle headlight reflection, and if these blobs are clustered in with true vehicle blobs, then the front-of-vehicle coordinates, which are taken from the bottom of the cluster box, will be incorrect. In order to correctly locate each cluster box at the front of each vehicle, blobs which are recognized as being due to headlight reflections are identified and removed before blobs are clustered. Other problem blobs are those which correspond to road lane markers. These appear when the mount for the detection camera 6 shakes. During camera shake, the incoming video image no longer precisely corresponds to the stored static background image, and therefore the result from the background image subtraction is that the road markers appear to have moved. Again, the blobs that result from camera shake are identified and filtered out before clustering commences. A further problem is "black triangles". The APA board 80 possesses a hardware fault which causes the polarity of blobs to be specified incorrectly. If a black region finishes at the right-hand side of the pixel processing window, it can be inadvertently labelled as a white region by the APA board 80. These white regions can then become candidates for clustering unless filtered out by the seedTask 172. Typically, when a lane marker 190 appears on the right side of the pixel processing window 192, as shown in FIG. 18, it produces a black triangular blob 194, a "black triangle", which is inadvertently represented by white pixels, in the top right hand corner. The triangular blob 194 is identified and removed. A convenient side effect of the polarity fault is that the road lane line-marker 190, which usually must be identified and removed by other shape characteristics, is labelled by the APA board 80 as black, and is therefore automatically filtered out.

Regions are classified into one of the following types:
(i) Headlight reflections;
(ii) Road artifacts ; such as road lane markers, which appear due to camera shake,
(iii) Lights; and
(iv) Other; during daytime segmentation most of the regions that are not classified as road artefacts are classified "other".

During day and dusk conditions, illuminated headlights do not appear segmented from other segmented parts of a moving vehicle, and so lights are not classified. At night, however, circular regions are classified as either "headlight" or "small-light", depending on the area and position within the field of view 12. Distant headlight pairs which are typically segmented from the background image as a single joined region, are classified as "joined headlights". To obtain correct initial clusters, distant joined headlights need to be distinguished from the small perimeter lights of large vehicles.

The main shape measure that is used during dusk and night time processing is "circularity". This is a measure which considers how close each blob is to the shape of the circle by comparing the blob's area to its perimeter. In the case of a circle:

$$\text{Area} = \pi r^2 \quad (4)$$

$$\text{Perimeter} = 2\pi r \quad (5)$$

The radius term can be eliminated, since it is only relevant for circles, by squaring the perimeter equation and taking the quotient of the two terms. For a circle, this produces a constant:

$$\frac{\text{Area}}{(\text{Perimeter})^2} = \frac{\pi r^2}{(2\pi r)^2} = \frac{1}{4\pi} \quad (6)$$

To make a circularity measurement equal to 1 for a circle, equation 6 is simply multiplied by the inverse of the constant. This provides a circularity measure which can be applied to blobs whereby a circular blob will have a measurement value of 1, as follows:

$$\text{Circularity} = \frac{4\pi \text{Area}}{(\text{Perimeter})^2} = 1.0 \quad (7)$$

For a square blob of unit area, Area=1, Perimeter=4, the circluarity measures is as follows:

$$\text{Circularity} = \frac{4\pi 1}{(4)^2} = \frac{\pi}{4} \approx 0.785 \quad (8)$$

For an equilateral triangle with sides of unit length, Area=$\sqrt{3/4}$, Perimeter=3, the circularity measures is as follows:

$$\text{Circularity} = 4\pi \cdot \frac{\sqrt{3}}{4} \cdot \frac{1}{(3)^2} = \frac{4\pi \sqrt{3}}{36} = 0.6 \quad (9)$$

Figure 19:
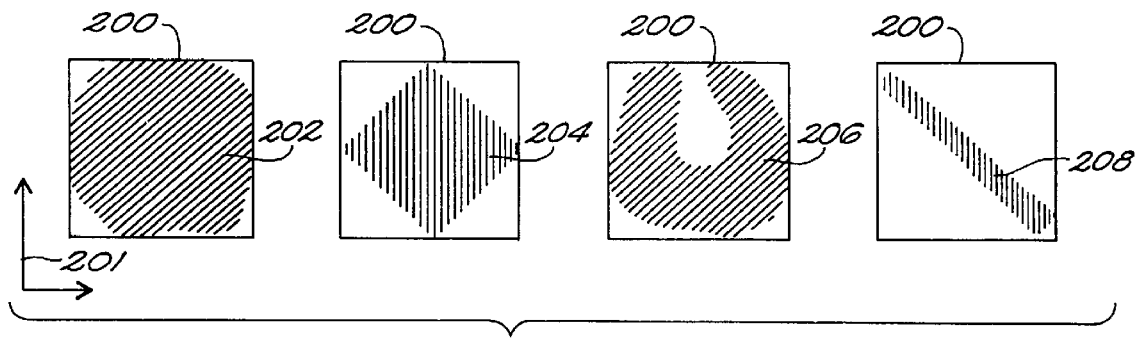
FIG. 19 is a diagram illustrating measurement of coverage of blob regions produced by the system.

A further measurement employed, that is particularly useful in detecting road land/line markings, is "coverage". Coverage is the measured ratio between the area of a blob to the area of its bounding box. The bounding box 200, as shown in FIG. 19, is aligned with the APA board coordinate axes, which are the axes of the APA processing window. The APA axes are not necessarily aligned with the major axis of the blob itself. For instance, a rectangular blob 202 which is aligned with the PAP coordinate axes would have a high coverage value, whereas a rectangular blob 204 which is not aligned with the axes may have a medium coverage value. A concave shape 206 would produce a medium coverage value, and a line 208, diagonal to the APA coordinate axis 201 would produce a lower coverage value. Road lane markings can be simply detected because they have a low coverage value. If the lane markings are not diagonal, but vertical, then the measure is insufficient and in such cases a measure of the ratio of the blob's major axis length to it's minor axis length can be used instead.

During night time segmentation the coagulated blobs of joined headlights are identified by their height to width ratio as they tend to be twice the expected area of one headlight. Joined headlights need to be detected so that a headlight count maintained for each cluster is correct.

Headlight reflections appear as large elongated blobs, and are detected initially on the basis of their size and characteristic shape. The blobs are confirmed as relating to headlight reflections by extending the blobs vertically to determine whether they extend from a headlight region.

As the vehicle monitoring system is capable of continuous automatic operation, clustering of regions takes into account different light conditions. The technique of static background subtraction, described previously, segments moving objects from the video image obtained by the detection camera 6, but the regions that result from the segmentation process depend on the ambient lighting conditions at the time of day. During daytime segmentation, large regions typically result, whereas during night time only headlights and the smaller sidelights on trucks are segmented. During dusk, lit headlights do not appear segmented from the other visible parts of moving vehicles, however, reflections upon the surface of the road caused by the headlights need to be removed, as discussed above.

Figure 12:
FIG. 12 is a difference image generated by the vehicle detection circuitry.
Figure 13:
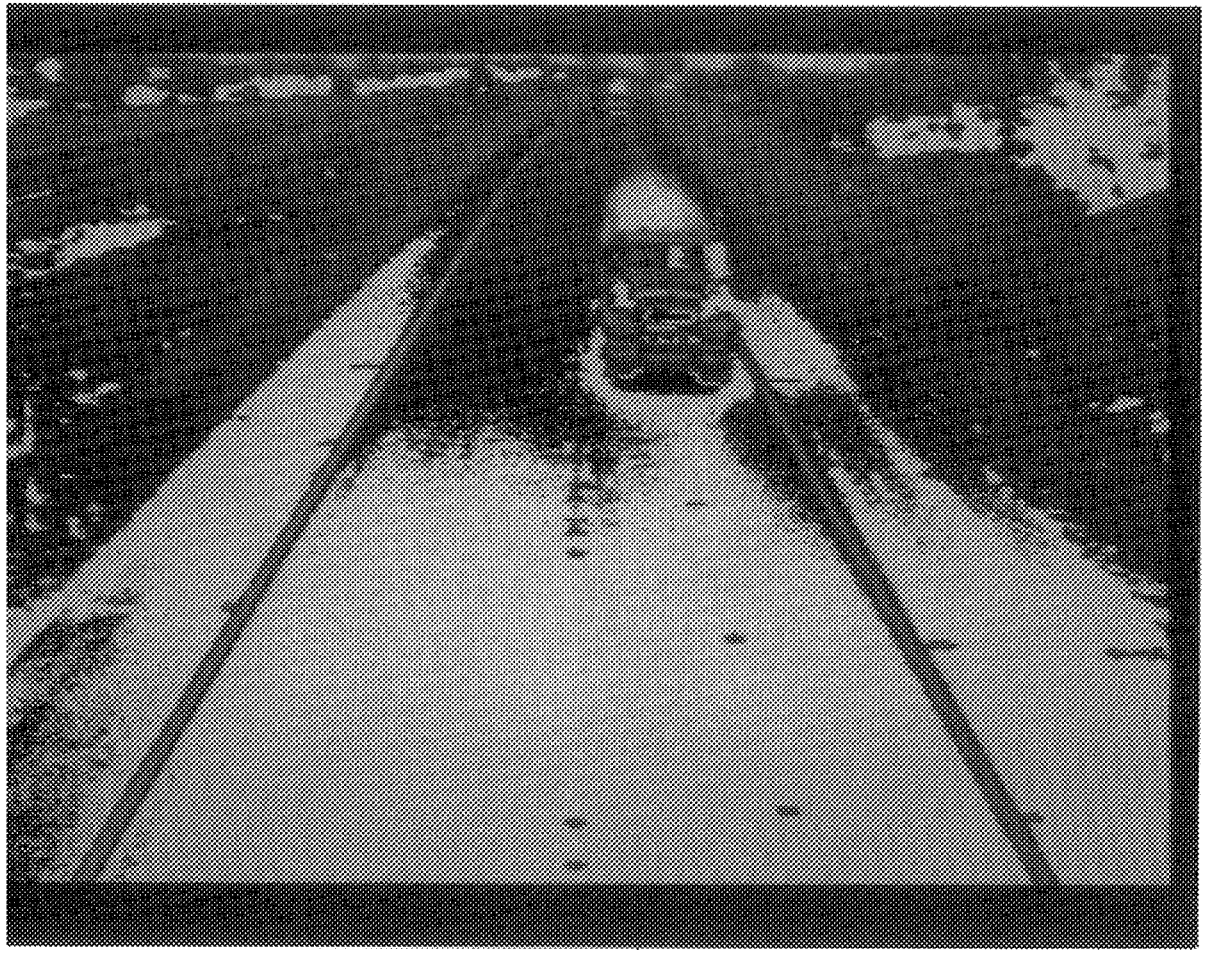
FIG. 13 is an image illustrating regions of shadow which are filtered from the image obtained by the detection camera.

The clustering process operates on the segmented regions or blobs and each vehicle is typically segmented into several separate regions, as shown in FIG. 12. For instance, a car will often appear split by its windscreen into a roof-region and a bonnet-region. Large vehicles typically segment into more regions. The cluster task groups these regions into "logical vehicles" so that they can be tracked. Distant vehicles tend to be segmented together into one region due to vehicle occlusions at the image horizon. While the segmented regions at this distance can be tracked, they cannot be reliably clustered into separate vehicles. Emphasis is placed on correctly clustering lower regions that are closer to the acquisition line 22, and consequently the clustering process scans from lower regions to higher regions in each image.

If two vehicles are segmented into the same region, then they will be clustered together. The cluster task does not separate vehicles that have been segmented together into a single region. The coordinates of each cluster are sent to the label task 178 which matches and separates clusters over consecutive video fields. The cluster task and the label task classify clusters on the basis of the classification data held in class.h. The coordinates passed to the trajectory task 180 correspond to an estimation as to the front of the vehicle, as the road surface level. Cluster information on all vehicles is provided to the trajectory task, which tracks the clusters and selects for which vehicles images are to be acquired. For example, the software listed in Appendix A has been developed to concentrate on acquiring images of large vehicles, such as trucks and buses.

Optimal clustering is achieved as a middle point between "over clustering" and "under clustering". At the over clustering extreme, all regions are clustered into one single cluster and then only the lowest vehicle in the cluster is tracked. This is because the lowest point of each cluster is passed by the label task to the trajectory task. The classification of the cluster, which is based on its height and width will be incorrect. At the under clustering extreme, if no regions are clustered together, that is each region obtains its own unique cluster and label, then the trajectory task is over-burdened in an attempt to track every region, vehicle classification will fail in a number of instances, and images will be inadvertently acquired and missed. For the purposes of vehicle image acquisition, it is better to mistake a vehicle-roof for a vehicle-front and begin to track it then it is to mistake a vehicle-front for vehicle-roof and so, by adding it to the back of another cluster, not track the vehicle-front. Therefore the cluster task has been written to use an optimal middle point which lies on the side of under clustering rather than over clustering.

The cluster task performs clustering essentially be extending the boundary of each segmented region by a certain amount, and then joining any regions that overlap. Regions that overlap are "clustered". The cluster task, however, determines correctly the amount of extension which should be applied to each region. During daytime segmentation, very little region extension is required, yet during night time, the segmentation process produces small sparse regions that require large amounts of extension in order to achieve overlap.

An important aspect in the construction of a cluster is that the bottom region of each cluster should be the front of a vehicle. Invalid regions, such as regions due to headlight reflections, must not be clustered, and are thus not extended. After every valid vehicle region in the image is extended by a certain amount, the clustering process begins with the lowest region in the image. The lowest is considered first which is the region most likely to cause triggering of the acquisition camera 8.

The coordinates of the lowest region are used to initialize a cluster structure. Then all extended regions above the initial region are tested for overlap. If any region does not overlap with the coordinates of the cluster, then the cluster coordinates are updated to include the region and the region is marked as clustered. Whenever a new region is added to a cluster, all remaining unclustered regions become possible cluster candidates again. Thus the list of regions is traversed again from the bottom of the image. Although the regions in the list which have already been marked as clustered can be skipped, this is considered sub-optimal. Once the entire list of regions have been traversed without any overlap detected, the next cluster is begun with the lowest remaining region. The clustering process continues in this manner until no regions are left unclustered. The list of clusters are then unextended and passed to the label task.

Figure 20:
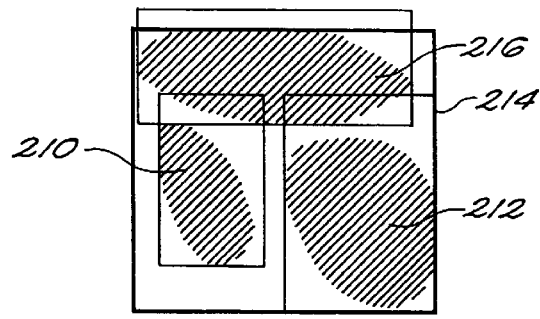
FIG. 20 is a diagram illustrating vertical extension of blob regions to perform clusters.

In performing region extension, regions are extended by a variable amount in the vertical direction, but extended by a standard amount in the horizontal direction, with reference to the APA coordinate axis. Horizontal extension is unnecessary during daytime segmentation, as vehicle blobs tend to be connected across the full width of the vehicle. It is in the vertical direction that blobs due to the same vehicle appear disconnected. For example, two blobs that typically represent a car might be due to its bonnet and its roof. These two blobs will stretch over the full width of the vehicle, and appear one above the other. Furthermore, so long as one blob for each vehicle stretches the full width, the cluster coordinates will be wide enough to incorporate any blobs that might otherwise need horizontal extension to be clustered together. The full width blob provides the extension. With reference to the example illustrated in FIG. 20, the region 210 becomes added to the region 212 on the right, from which the cluster 214 is begun, only because the full width region 216 above was added to the region 212 to form the cluster 214. If the region list was not researched from the beginning of the list continuously, the overlap of the previously tested region 210 would not have been found. It is for this reason that the clustering task, as discussed above, reconsiders all unclustered regions after adding a region.

Figure 21:
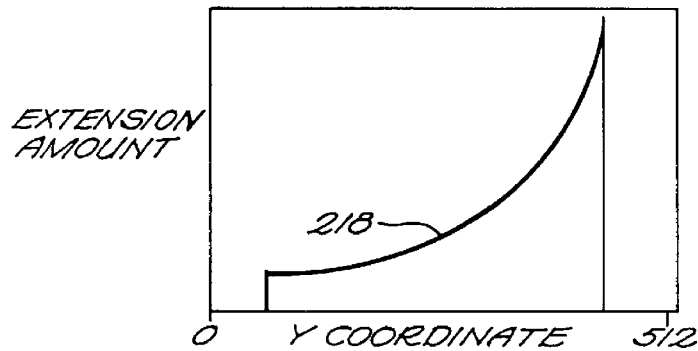
FIG. 21 is a graph of extension amounts which are stored in a look-up table of the system.
Figure 22:
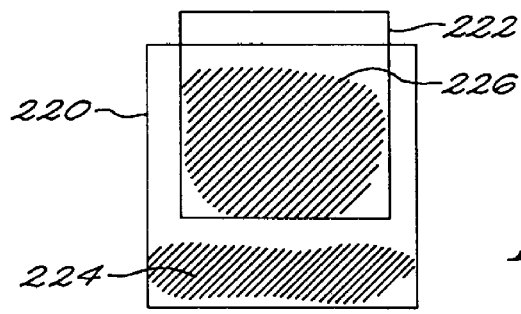
FIG. 22 is a diagram illustrating extension based on blob region width.

The cluster task is able to perform one of two extension methods. The first method takes the vertical or Y coordinate of the region as an input to a look-up table that specifies the amount of extension to be applied. The amount of the extension, and hence the degree of clustering, is then modified according to lighting conditions. As the outside light level decreases, and regions reduce in size, the amount of extension applied to regions can be gradually increased. Furthermore, the perspective in the image can be compensated for by adjusting the values stored in the look-up table accordingly, i.e. distant regions high in the camera image can be extended less than near regions which are low in the image. An example of the extension values stored in the look-up table is illustrated by the graph 218 shown in FIG. 21 of extension amount v. Y coordinates. All extension amounts are provided in pixel numbers. The second extension method extends each region by an amount proportional to its width. The method is largely based on an observation of the shapes of regions obtained during daytime segmentation. Small regions, which are typically far away, are minimally extended, large vehicle body regions, which are typically close, square and occur one per vehicle, are minimally extended, and wide short regions, which are often vehicle fronts, are greatly extended. Essentially, as illustrated in FIG. 22, this results in every region boundary 220 and 222 being approximately square. In FIG. 22, the boundaries 220 and 222 of both regions 224 and 226 have been extended vertically to equal at least their width. Therefore the wide short region 224 has been extended a great deal more than the large square region 226. Region 224 would be a vehicle front portion disposed under the vehicle body region 226. Therefore, the two regions 224 and 226 can be matched without too much extension. If the large region 226 is over extended, then it may overlap with a succeeding vehicle front. In the preferred embodiment, this method is only employed during daytime segmentation as night time processing requires a large amount of region extension, although it is envisaged the extension factor used in the extension calculation can be enlarged for night time use.

During night time clustering all of the regions to be clustered are essentially small circles, and a truck cluster, for example, is constructed by considering the possibility of whether each light could feasibly fit into a stored truck template in class.h. For the first region in a cluster, to fit within the template, there is a maximum distance of light separation which cannot be exceeded.

Figure 23:
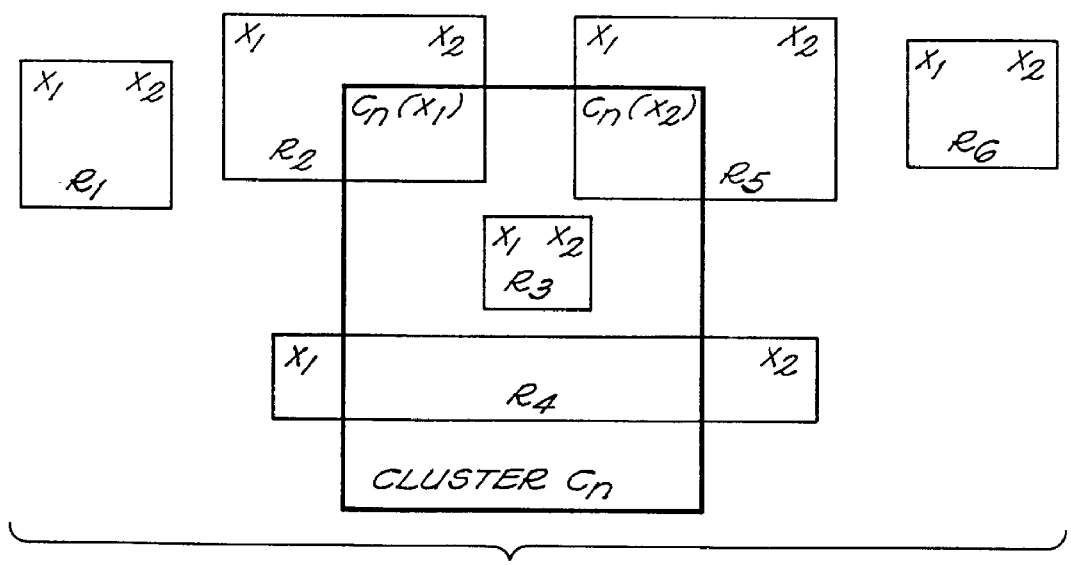
FIG. 23 is a diagram of overlap detection for clusters produced by the system.

Overlap of regions is detected by comparing the coordinates of regions and clusters, wherein the top-left $(x_1,y_1)$ and bottom-right $(x_2,y_2)$ coordinates for both regions and clusters are known. For the image plane coordinates, x increases from left to right and y increased from top to bottom. Considering first the horizontal, x coordinate, overlap for the regions $R_1$, $R_2$, $R_3$, $R_4$ and $R_6$ illustrated in FIG. 23 the test for overlap with the cluster $C_n$ is:

$$R_n(x_1)<C_n(x_2) \tag{10}$$

$$C_n(x_1)<R_n(x_2) \tag{11}$$

If both the two equations are true, then there is overlap in the horizontal direction. Therefore, horizontal overlap is true for $R_2$, $R_3$, $R_4$ and $R_5$ but region $R_1$ fails the test as equation 10 is not true and region $R_6$ fails the test as equation 8 is not true. A similar test is performed in the vertical direction as follows:

$$R_n(y_2)>C_n(y_1) \tag{12}$$

There is no need to perform the complimentary test for $R_n(y_1)$ because the regions are outputted from the APA board 80 in order from top to bottom and as the cluster task processes all regions in a list from the bottom up, the complimentary test, $C_n(y_2)>R_n(y_1)$, is unnecessary as it will always be true.

Clustering during day lighting conditions is based on the overlap test discussed above, yet during dusk and night conditions clustering involves consideration of additional rules, primarily due to the increased ambiguity and greater separation between regions of the same vehicle. Certain regions should also never be clustered, such as headlight reflections and noise from background image areas due to vibration of the detection camera 6 discussed previously. Clustering therefore also involves consideration of a series of rules based on the various region classifications discussed previously. The rules included:

(i) An extended region must spatially overlap a cluster to be added to that cluster.

(ii) If a region overlaps more than one cluster, then it is added to the lowest cluster.

(iii) A region to be clustered cannot already have been added to the cluster.

(iv) A "joined headlights" region cannot be added to an existing cluster. Regions of this type can only initiate a cluster.

(v) Only a predetermined number of "headlight" regions can be added to a cluster, the predetermined number being a system parameter which can be adjusted from the user interface.

(vi) As many "other" and "small light" regions as is spatially allowed can be added to a cluster.

(vii) A region which touches or includes part of the top of the processing window can initiate a cluster but cannot be added to a cluster.

(viii) A further "headlight" region to be added to a cluster must be horizontally aligned with another "headlight" region in that cluster, which is determined on the basis of the difference between the regions lower Y coordinates.

(ix) "Reflection" and "road artifact" regions are not added to any cluster.

For monitoring a roadway, clusters are classified into one of three classes: car, ute (a small flat-bed utility truck) or truck. Cluster classification is based on the height and width of each cluster box, and the number of lights within the cluster during night conditions. The height and width data for each classification is modified via procedure calls to the histogram task 190 as the lighting conditions change from day to dusk and to night, etc. The cluster width is as important as the cluster height because, for example, a large four wheel drive vehicle towing a trailer might produce a cluster which exceeds the truck height threshold but is unlikely to be as wide as a truck or bus. A histogram of cluster heights and widths of motor vehicles includes distinct peaks which correspond to various vehicle classes, and is used to set the stored classification thresholds automatically. The height and width histogram is shown in the display of FIG. 16. For example, a cluster is classified as a truck if one of the following conditions is true:

(i) The cluster height and width exceed the truck threshold.

(ii) The lighting condition is night and the cluster exceeds the truck width threshold.

(iii) The lighting condition is night and the number of small lights in the cluster exceeds the small light truck threshold.

(iv) The cluster height is within a predetermined range of the truck height threshold and the number of small light regions in the cluster exceeds the truck small light threshold.

As ambient lighting drops, the size of the truck clusters are reduced, and consequently the height an width thresholds decrease, depending on the lighting conditions, as determined by the histogram task 190. The classification for each cluster is stored in the clustered data structure, together with the cluster's coordinates and time step. The clustered data is then passed to the label task 178.

The label task 178 assigns a label to each unique cluster and tracks clusters over time by matching an array of previously seen clusters to each subsequent video field of clusters. If a cluster appears in roughly the same place as a cluster from a previous field, then the label task 178 considers them to be the same cluster. Where a match can be made, the new cluster inherits the unique label of the previously seen cluster. If a cluster cannot be matched, then a new label is created for that cluster. Clusters may disappear for a few fields, and it is an objective of the label task 178 to determine whether a cluster is indeed new or whether it has just appeared again after a period of absence.

The matching of clusters is based on location. Cluster size can be used as an extra match parameter but the current location heuristic has been found sufficient. It can be assumed the clusters will not move very far from their position in the previous field, and if a cluster moves so far that its boundary coordinates in the present frame not overlap with its boundary coordinates from the previous frame, then the previous label will not be transferred. Clusters can split and join, both vertically and horizontally, as they are tracked from field to field. Two labelling methods have been developed, with the second being the preferred method which is presently used.

The first labelling method involves two reciprocal tests which are used to determine whether a new cluster should inherit an old cluster's label. The first test is to determine whether the centre of a new cluster 230 lies within the boundary of any clusters 232 and 234, as shown in FIG. 24, on a list of previously seen clusters; called the label list. For the cluster 230, the test fails, but for the new clusters 236 and 238 their centres fall within the older cluster 240 so the lowest new cluster 238 inherits the label of the old cluster 240, and the upper new cluster 236 is assigned a new label. The second test, which is executed when the first test fails, determines whether the centres of any of the clusters on the label list lie within the boundarys of the clusters from the current video field. Therefore as the centres of the old clusters 232 and 234 fall within the boundaries of the new cluster 230, a match is detected, and the new cluster 230 inherits the label of the lower old cluster 234. Applying the second test to the new clusters 236 and 238 results in failure as the centre of the old cluster 240 does not lie within any of the new clusters 236 and 238, and therefore applying this test to these clusters would result in the new clusters 236 and 238 both being assigned new labels.

The second labelling method is based on the clustering overlap technique described previously. Essentially, the bounding box of each cluster from the current field is tested for an overlap with clusters in the cluster list. The cluster list is search from bottom to top, in a similar manner to the search method described for detecting overlapping regions. In this way, if two clusters merge into a single cluster, then the first overlap found will be an overlap with the lower cluster. Once a match is found, the new search is terminated, and the label which is transferred is marked as applied to a new cluster. Therefore a label cannot be transferred twice within one search of a new video frame. The second method is preferred as it requires half the number of tests as the first method, and a cluster can move further between successive frames yet still inherit its label. In the first method, where centres are matched to the boundaries, the maximum displacement allowed between fields is half the width (or height) of the clusters, whereas in the second method, where boundaries are checked for overlap, the maximum displacement is the entire width (or height) of the cluster. Therefore the second method allows a cluster to move twice the distance of the first method.

As clusters travel successive fields in time, they tend to split or join, and if a cluster splits, then the label is transferred to the lower of the two clusters, and the upper cluster, which would typically be another vehicle behind the lower cluster, is provided with a new label. Alternatively, if two clusters join, then the old lower cluster's label is transferred to the new combined cluster, and the other cluster's label is allowed to expire. The label of the lower of two clusters is transferred after a split or join because the lowest cluster is most likely to include the front of a vehicle, and is therefore given priority with regard to maintaining cluster labels.

A record of the bounding box coordinates is maintained for each cluster in the cluster list, together with its label, the labels age, and when the cluster was last seen. Whenever a label is inherited, its age increases, and its last scene value is reset. If a label is not transferred in the course of one field, its last scene value is incremented. A label is removed from the cluster list if its last scene value exceeds a label tenure threshold. Cluster labels, coordinates and classifications are passed to the trajectory task 180.

Figure 25:
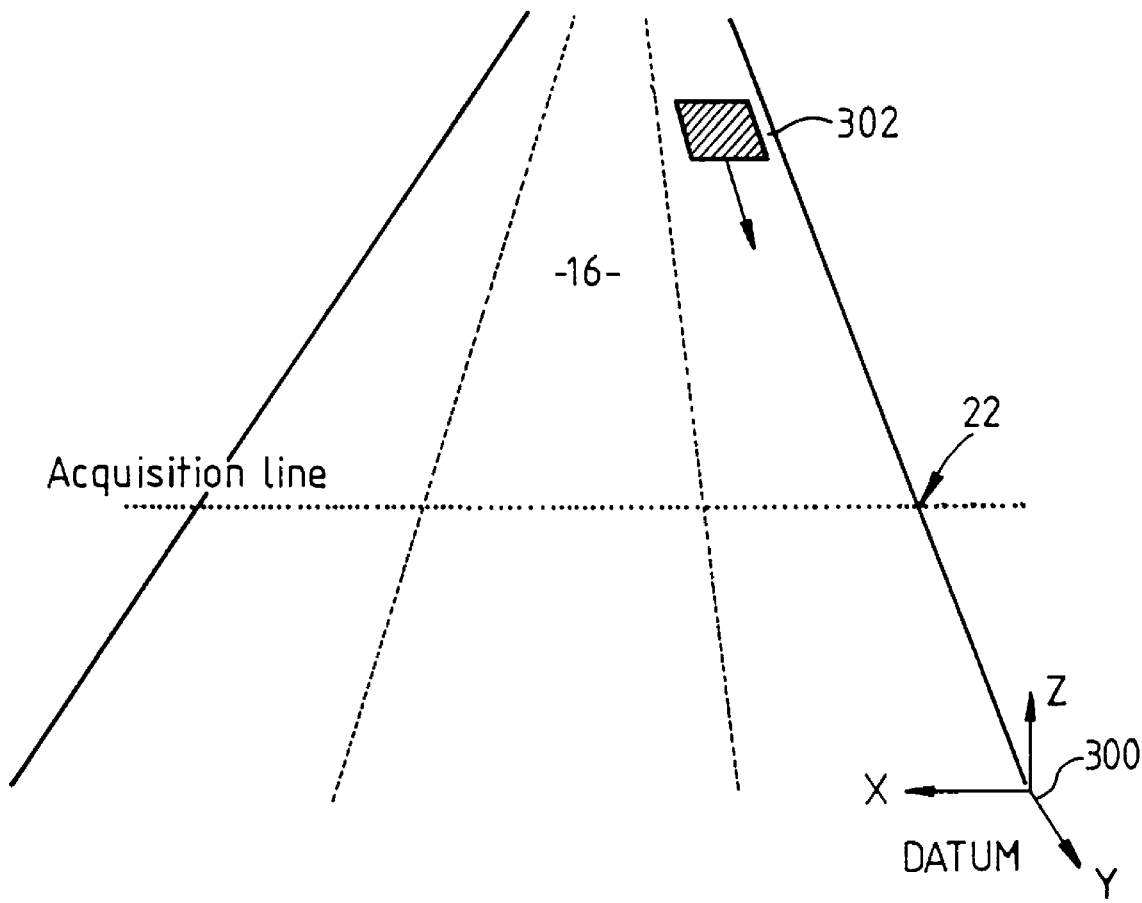
FIG. 25 is a diagram of the roadway coordinates used by the system.
Figure 26:
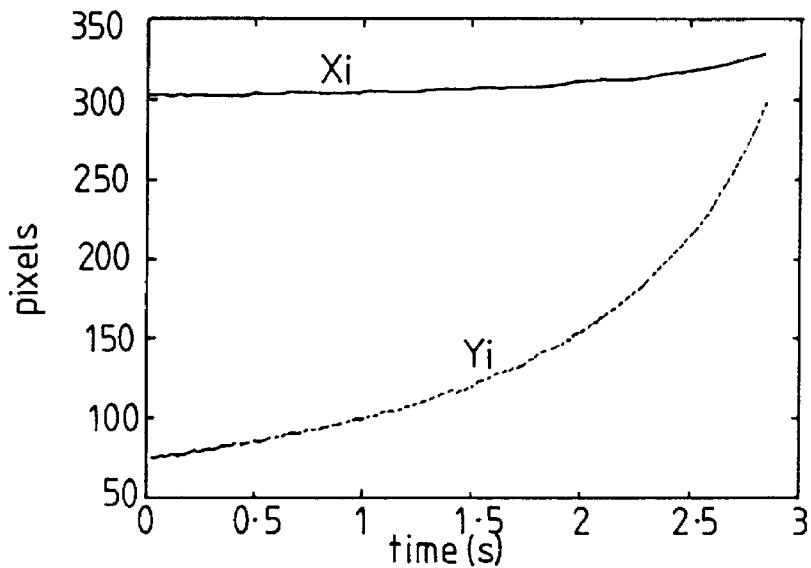
FIG. 26 is a graph of the trajectory of clusters.

The trajectory task 180 uses the received cluster data to track the clusters over successive video fields. The program file which controls the operation is traj.c. The coordinates used for tracking a cluster box are the coordinates of the centre of the base of the box, and the coordinate system for the roadway 16 which is adopted is illustrated in FIG. 25. The datum 300 of the roadway coordinate system is an arbitrary point on the roadway, which has been chosen as the centre of the left hand fog line underneath the edge of an overpass bridge holding the cameras 6 and 8. Vehicles 302 travel in positive Y axis direction on the roadway 16, starting at a negative value in the distance. The trajectory of a cluster box in image plane coordinates $(x_i, y_i)$ as shown in the graph of FIG. 26 is not linear with time due to the effect of perspective. Therefore a camera transformation is applied so as to convert image plane coordinates to real world 3-D coordinates. In matrix form, the overall camera transformation is as follows:

$$\begin{bmatrix} x^i \\ y^i \\ z^i \end{bmatrix} = \begin{bmatrix} a_x & 0 & X_0 & 0 \\ 0 & a_y & Y_0 & 0 \\ 0 & 0 & 1 & 0 \end{bmatrix} \begin{bmatrix} 1 & 0 & 0 & 0 \\ 0 & 1 & 0 & 0 \\ 0 & 0 & -1/f & 1 \\ 0 & 0 & 0 & 1 \end{bmatrix} {}^{0}T_{CAM}^{-1} \begin{bmatrix} x \\ y \\ z \\ 1 \end{bmatrix} \quad (13)$$

where

| | |
|---|---|
| $a_x$ | X-axis scaling factor in pixels/mm (intrinsic) |
| $a_y$ | Y-axis scaling factor in pixels/mm (intrinsic) |
| $X_0$ | image plane offset in pixels (intrinsic) |
| $Y_0$ | image plane offset in pixels (intrinsic) |
| $f$ | focal length (intrinsic) |
| ${}^{0}T_{CAM}$ | detection camera 6 position in world coordinates (extrinsic) |

The intrinsic parameters are innate characteristics of the camera and sensor, while the extrinsic parameters are characteristics only of the position and orientation of the camera. The principle point of the image plane is the intersection of the optical axis and that plane, at coordinates $(X_0, Y_0)$. Equation 13 can be written as:

$$\begin{bmatrix} x^1 \\ y^1 \\ z^1 \end{bmatrix} = C \begin{bmatrix} x \\ y \\ z \\ 1 \end{bmatrix} \quad (14)$$

where C is the camera calibration matrix, a 3×4 homogeneous transform which performs scaling, translation and perspective correction. The image plane coordinates are then expressed in terms of homogeneous coordinates as:

$$X^i = \frac{x^i}{z^i} \quad (15)$$

$$Y^i = \frac{y^i}{z^i} \quad (16)$$

Figure 27:
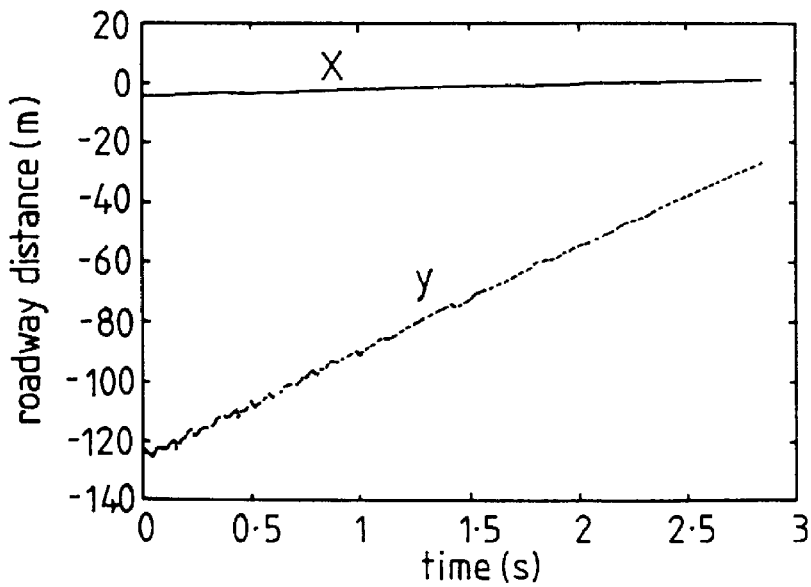
FIG. 27 is a graph of the trajectory of clusters transformed to the roadway coordinates.
Figure 28A:
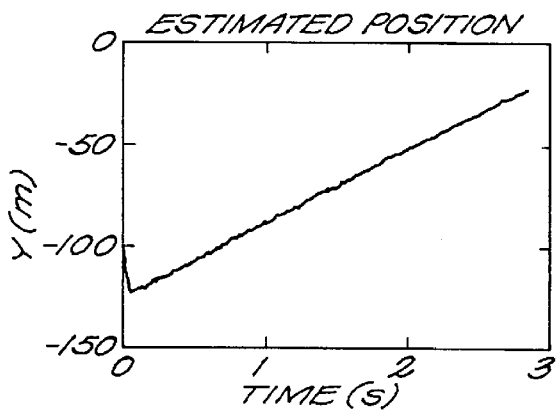
FIG. 28 is a diagram of data values obtained by trajectory software of the system.
Figure 28B:
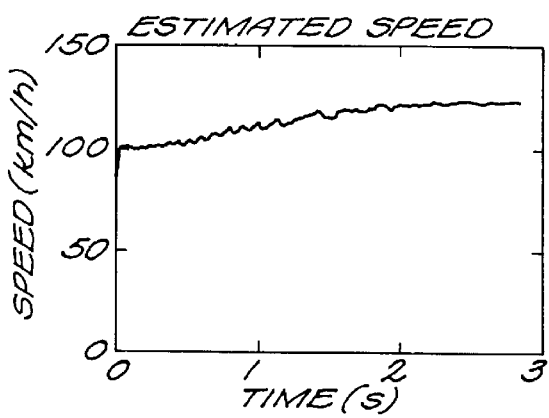
Figure 28C:
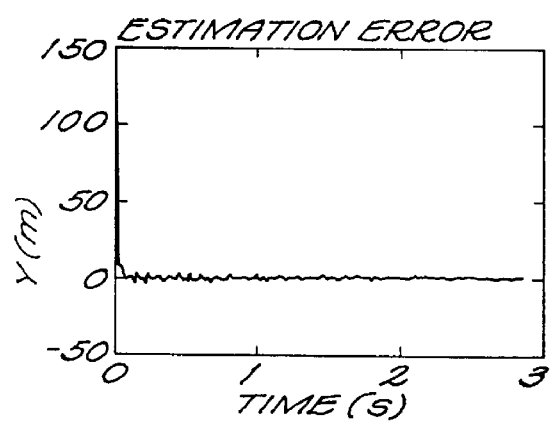
Figure 28D:
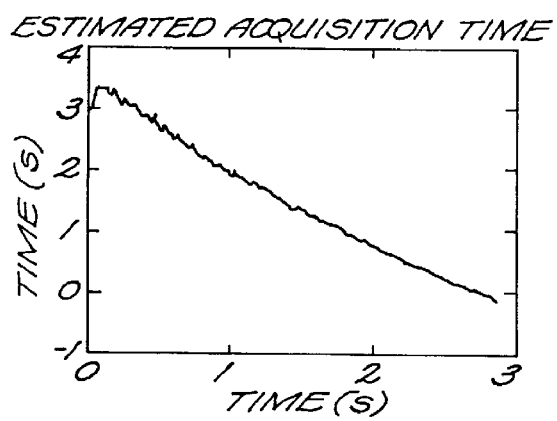

The general perspective transform maps a ray in three dimensional space to a point on the image plane. For vehicle coordinates in the image plane as seen by the detection camera 6, a unique three dimensional location of the vehicle cannot be determined so the bottom of a cluster box received from the label task is considered to be on the roadway, i.e. z=0, and therefore the box can be tracked with reference to the roadway x and y coordinates. The equation 14, 15 and 16, given the image plane coordinates and z, can be solved simultaneously for the roadway coordinates x and y to specify the position of a vehicle. The equations have been solved using the computer algebra package MAPLE, and the solution, in C notation, is as follows:

$den = (-Xi*C31*C22 + Xi*C32*C21 +$ $\qquad (Yi*C21 - C21)*C12 + (-Yi*C32 + C22)*C11);$ $y = -(-Xi*C31*C24 + Xi*C34*C21 + (Yi*C21 - C21)*C14 +$ $\qquad (Xi*C33*C21 - Xi*C31*C23)*z + (Yi*C31 - C21*z*C13 +$ $\qquad (-yI*C34 + C24 + (-Yi*C33 + C23)*C11)/den;$ $x = (-C24*Xi*C32 + C22*Xi*C34 + (Yi*C32 - C22)*C14 +$ $\qquad (C22*Xi*C33 - C23*Xi*C32)*z + (Yi*C32 - C22)*z*C13 +$ $\qquad (-Yi*C34 + C24 + (-Yi*C33 + C23)*z)*C12)/den;$ The solution explicitly includes height above the roadway, z, which can be set at zero for daytime operation or some marginal distance above the roadway, whereas at night, the bottom of the cluster box generally corresponds to the height of the headlights above the road, and therefore z is set to a national headlight height. FIG. 27 illustrates a graph of the same vehicle trajectory as in FIG. 26, after the trajectory has been mapped to the roadway coordinates x and y. The trajectory illustrates the vehicle is moving at a constant speed, and in the left hand lane.

The time at which the vehicle 302 will reach the acquisition line 22, and the future location of the vehicle 302, need to be predicted, due to latency in the system. Considerable latency exists between a trigger request and image acquisition via the acquisition camera 8, and additional latency is caused by pixel transfer, image processing pipeline delay and software processing delay. The information obtained on the basis of the images required by the detection camera 6 provide a delayed representation of the actual vehicle position, and therefore it is necessary to estimate the future position and speed of the vehicle 302.

The position estimates of a vehicle obtained by the inverse perspective discussed above are quite noisy due to quantisiation effects, particularly when vehicles are in the distance, therefore simple differencing cannot be used to estimate velocity of a vehicle and therefore the software uses a Kalman filter to reconstruct the vehicle's lateral and longitudinal position and velocity states, based on the noisy observations of the vehicle position. The vehicle state for each of the longitudinal and lateral axes comprises position $\Omega$ and speed $\dot{\Omega}$ of the vehicle, represented as follows:

$$X = [\Omega \dot{\Omega}]^T \quad (17)$$

In space state form, assuming constant velocity motion, the vehicle dynamics are $$\underline{\dot{X}} = \Phi \underline{X} \quad (18)$$

$$\underline{Y} = C X \quad (19)$$

where $\underline{Y}$ is the observable output of the system, being the vehicle's lateral or longitudinal position, $\Phi$ is the state-transition matrix, and C is the observation matrix. For constant velocity motion the matrices are as follows:

$$\Phi = \begin{bmatrix} 1 & T \\ 0 & 1 \end{bmatrix} \quad (20)$$

$$C = [1 \ 0] \quad (21)$$

where T is the sampling interval, being equal to the video field interval which is 20 ms. The Kalman filter equations for one axis are $$K = \Phi P C^T (C P C^T + R_2)^{-1} \quad (22)$$

$$\hat{X} = \Phi \underline{X} + K(y - C\underline{X}) \quad (23)$$

$$P = \Phi P \Phi^T + R_1 I_2 - K C P \Phi^T \quad (24)$$

The filter is predictive, and $\hat{X}$ is the predictive value of the vehicle state for the next sample interval. K is a gain, P is the error co-variance matrix, and $I_2$ is a 2×2 identity matrix. $R_1$ and $R_2$ are input and output co-variance estimates, and are used to adjust the dynamics of the filter.

The Kalman filter equations 22, 23 and 24 are complex and time consuming to execute in matrix form, and the computer algebra package MAPLE was used to reduce the equations to scalar form, as follows, in C notation:

```
/*compute the filter gain*/
den = kp->p11 + *R2;
k1 = (kp->P11 + T*kp->p12)/den
k2 = kp->p12/den;

/*update the state vector*/
x1 = kp->x1 + T*kp->x2+k1*(*y-kp->x1);
x2 = kp->x2 + k2*(*y-kp->x1);

kp->x1 = x1;
kp->x2 = x2;

/*update the covar matrix (symmetric so keep only 3 elements)*/
P11 = *R1+kp->p11+2.0*T*kp->p12+T*T*kp-p22-
      k1*kp->P11-k1*kp-p12*T;
P12 = kp->p12+T*kp->p22-k1*kp->p12;
p22 = *R1+kp->p22-k2*kp->p12;

kp->p11 = P11;
kp->p12 = p12;
kp->p22 = p22;
```

The estimated values for the state of the vehicle and error covariance for the filter are calculated using the equations and are stored in a data structure *kp. Optimal values for $R_1$ and $R_2$ are determined empirically. FIG. 28 illustrates graphs which can be plotted from the estimated values for one axis, being the estimated position and the estimated speed of the vehicle, and the estimated error associated with the camera filter calculations, as each video field is received. The estimated acquisition time is calculated by using the estimated vehicle state data. As the position 22 at which acquisition to occur is known, the estimated acquisition time is calculated by taking the difference between the estimated position and the acquisition position, and dividing the result by the estimated velocity of the vehicle. When the estimated acquisition time falls below a value which indicates acquisition is to occur within the time falls below a value which indicates acquisition is to occur within the time of the next video field then the estimated time information is provided to a trigger board 84. The estimated vehicle state coordinate for the x direction indicates which camera 8 of a multi-lane carriageway is to be triggered.

The scaling matrix C of equation 14 may be calibrated using road markers or preferably telescopic stakes which are placed at a predetermined positions along the roadway 16. The stakes are surveyed with respect to the roadway datum 300 to obtain the x, y and z coordinates for different positions on the stakes, and then removed. Equation 14 can be expanded as follows:

$$C_{11}x + C_{12}y + C_{13}z + C_{14} - C_{31}X'x - C_{32}X'y - C_{33}X'z - C_{34}X' = 0 \quad (25)$$

$$C_{21}x + C_{22}y + C_{23}z - C_{24} - C_{31}Y'x - C_{32}Y'y - C_{33}Y'z - C_{34}Y' = 0 \quad (26)$$

which relate an image plane coordinate (X',Y') to a real world coordinate (x,y,z). For n observations this can be expressed in matrix form as follows:

$$\begin{bmatrix} x_1 & y_1 & z_1 & 1 & 0 & 0 & 0 & 0 & -X'1x_1 & -X'1y_1 & -X'1z_1 \\ 0 & 0 & 0 & 0 & x_1 & y_1 & z_1 & 1 & -Y'1x_1 & -Y'1y_1 & -Y'1z_1 \\ . & . & . & . & . & . & . & . & . & . & . \\ . & . & . & . & . & . & . & . & . & . & . \\ . & . & . & . & . & . & . & . & . & . & . \\ x_n & y_n & z_n & n & 0 & 0 & 0 & 0 & -X'nx_n & -X'ny_n & -X'nz_n \\ 0 & 0 & 0 & 0 & x_n & y_n & z_n & n & -Y'nx_n & -Y'ny_n & -Y'nz_n \end{bmatrix} \begin{bmatrix} C_{11} \\ C_{12} \\ . \\ . \\ C_{33} \end{bmatrix} = \begin{bmatrix} X'_1 \\ Y'_1 \\ . \\ . \\ . \\ X'_n \\ Y'_n \end{bmatrix} \quad (27)$$

The equation are homogeneous and therefore the overall scaling of the C matrix is simply chosen so that $C_{34}=1$, and this parameter is not identified. Equation 27 has 11 unknowns and for a solution requires at least 5.5 observations, being pairs of (X', Y') and (x,y,z). The system of equations is generally over determined, and at least square solution is obtained using a singular value decomposition technique. For solution the calibration points x,y,z must not lie in a common plane. The real world coordinates are obtained form the survey results, and the image plane coordinates (X',Y') are obtained from a display of the detection camera image of the survey stakes using a cursor plotting software package xtool listed in Appendix A.

To achieve correct triggering of the acquisition camera 8, the timing of the system needs to take into account the following:

(i) The system timing: the system must have sufficient temporal resolution to facilitate accurate image capture, i.e. the system must have a sufficient vehicle acquisition rate, such as two vehicles per second, to avoid omission of vehicles on the roadway.

(ii) Prediction: determining the time of which an image of a vehicle is to be acquired, and thus initiate image acquisition.

(iii) Acquisition data flow: timing to perform the physical interfacing between the acquisition camera and the acquisition sub-system 68 responsible for each image capture and storage.

Figure 29:
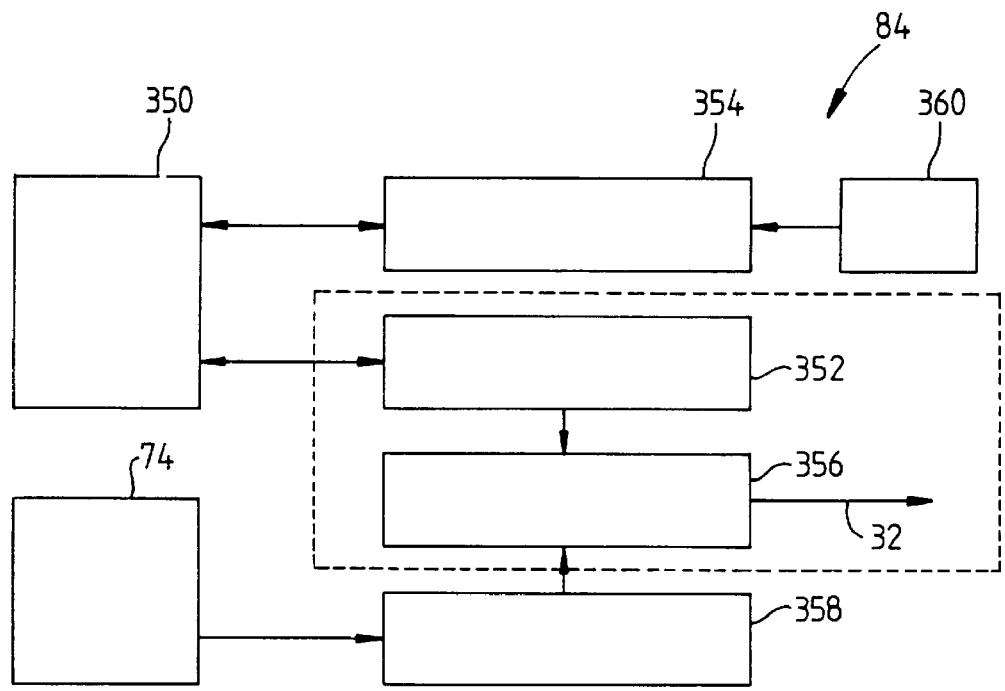
FIG. 29 is a block diagram of a timing control board of the system.

The system timing is resolved at two levels, a coarse level considered to start from periods greater than 24 hours, and a high resolution, fine level. The coarse level timing is maintained by real time master clock 354 of the trigger board 84, as shown in FIG. 29. The geometry of the acquisition camera 8 is chosen to limit the effects of perspective, limit image blur and take into account other constraints imposed by limitations in the depth of field available, and for an overpass bridge mounting, the image acquisition point 22 is between 17 and 20 meters from the camera 8, and the camera is at an angle greater than 15° and approximately 24° to the roadway. A target vehicle traverses the acquisition point 22 within the field of view 20 approximately 40 ms, being the acquisition window, at a nominal vehicle speed of 100 km/h. The real time clock 354 provides timing down to 20 ms intervals. Due to the uncertainties in the position of target vehicle accumulated during the segmentation, clustering and trajectory tasks, one or more timing events during the acquisition window are not sufficient to allow reliable image capture, therefore the high resolution is resolved to horizontal video line scan times, being approximately 64 $\mu$s.

The CPU, as described above, is able to classify vehicles during the region analysis and clustering procedures and, in particular, is able to distinguish large vehicles and small vehicles on the basis of the size of a cluster. If the CPU 64 determines that a cluster represents a vehicle for which an image is to be acquired, the final estimated acquisition time determined by the trajectory task is supplied to the trigger board 84, as shown in FIG. 27 via the VME bus interface 350. The CPU 64 supplies the estimated time as a 31 bit value, which represents the number of the horizontal scan line during the next field, which when reached indicates the acquisition camera 8 is to be triggered. The VME bus can be used to write the number of the scanning line at which acquisition is to occur into an acquisition line register 352 of the board 84. For a multi-lane carriageway, the CPU 64 also provides data to indicate the correct acquisition camera 8 to be activated, as determined by the horizontal position data of the vehicle. In addition to the acquisition line register 352, and the master clock 354, the trigger board 84 includes a comparator 356, and a scanning line counter 38 which also includes a count register to store the value of the line count. The master clock has a battery back-up 360 and is synchronised to the horizontal sync of the detection camera 6 so as to accurately keep track of video fields, reset the line counter 38 at the end of each field and be used as a basis on which time stamp information can be generated for allocation to the raw seed parameters processed by the APA board 80. After the number of the acquisition line has been read into the acquisition line register 352, the line counter 358 counts the horizontal scan lines on the basis of pulses provided from the digitizer board 74. The line count of the counter 358 and the number held in acquisition line register 352 are compared by the comparator and when the two numbers are the same, the comparator issues an acquisition pulse on the line 32 for the acquisition camera 8. Providing the trigger board 84 to trigger the acquisition camera 8 is also more accurate than relying on software control at the CPU 64 is open to interrupts and therefore cannot be relied on to accurately control the signals of real time events.

The image acquisition camera 8 has been developed to acquire detailed electronic stills or images of vehicles travelling head-on towards the camera 8 at speeds up to 160 km/h. The frame rate is at least two pictures per second using a non-interlaced scanning mode. Standard camera architectures suffered limitations of insufficient resolution, image smear and unwanted effects caused by blooming of the image sensor when vehicle driving lights or sun reflections shone into the camera 8. Blooming is considered an unacceptable image anomaly, particularly if it appears in the license plate region of an image which can severely restrict the automatic or even manual reading of the license plate characters. Another unacceptable image anomaly is image smear, which tended to occur for standard camera architectures in areas of high contrast, which may include the license plate region as most large vehicles have headlights mounted in the vicinity of the license plate. The effect of image smear tended to increase as sensor exposure decreases, and for standard camera architectures, image smear was unacceptably detrimental at exposure times of 1 ms.

The image acquisition camera 8 is a high resolution, front-illuminated full-frame camera architecture having a 1280×1024 pixel NMOS monochromatic silicon charge coupled device (CCD) sensor. To prevent smearing or blooming across an image, the camera 8 includes a lateral overflow drain sensor architecture which provides 1000× antiblooming characteristics. The architecture provides a site to drain excess electrons for each pixel, and Eastman Kodak Co. has developed one such sensor incorporating this architecture. This combined with extended infrared sensitivity to 1.1 micrometers, enable smear infrared imaging of vehicles and reduces blooming to an acceptable image without degrading the clarity of the vehicle license plate in the images.

The pixels of the camera 8 and 16 micrometers square with a 70% fill factor and have a quantum efficiency of 0.25 e-/photon at the image exposure wavelength of 800–900 nm. This makes the camera suitable to operation at exposure times of 1 ms, which is required to freeze the moving vehicles. The sensor has low light imaging capability at 1 millisecond exposure time, but in practice the infrared flash 40 is required to provided fill-in illumination as during most operating conditions extreme lighting ratios were experienced. This occurs, for example, when shadows impinge on the vehicle or when imaging is preformed at night. Asynchronous shuttering of the CCD sensor is achieved with a mechanical shutter, a camera shutter made by Robot, Germany, which is electronically triggered for 1 millisecond. The shutter also provides a basis for synchronization of the electronic flash 40, as described below.

The analogue output from the image sensor is directly converted to digital data by the camera 8, and the digital image data is capable of being outputted in either an 8 bit grey level format or in a compressed format, using standard JPEG image compression.

The flash 40 has a flash head which includes an air-cooled Xenon short-duration (≈500µs) flash tube mounted behind a mirror reflector. The mirror reflector produces a narrow beam width for the illumination of one lane 35. The power pack for the flash consists of an air-cooled 100 to 1500 Joule variable output power capacitor pack which has a cycle time of two flashes per second. The flash 40 has a wavelength range of 695 nm to 1500 nm. An infrared band pass filter is placed on the front of the flash tube which transmits electromagnetic wavelengths primarily outside the human visible range, thereby preventing "flash dazzle" of oncoming drivers and practically eliminating delectability of the flash 40.

Figure 30:
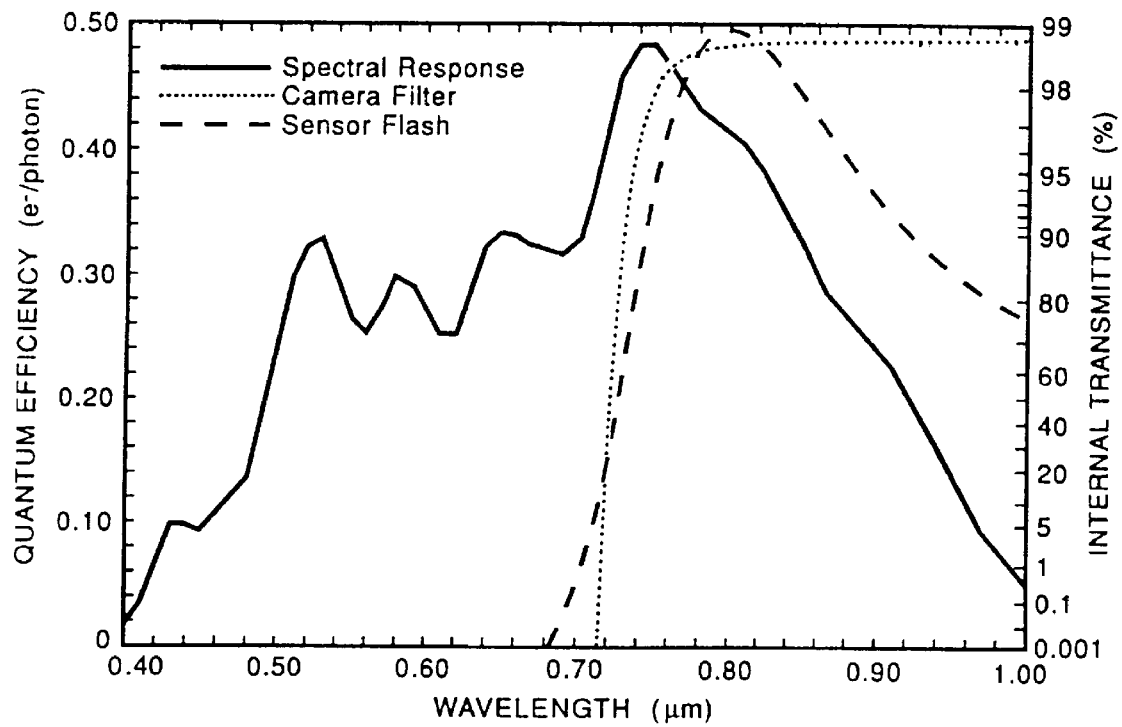
FIG. 30 is a graph of the operating characteristics of the acquisition camera and infrared flash of the vehicle monitoring system.

The wavelength at which the filter allows transmission is selected so as to balance climination of driver "flash dazzle" and still obtain an acceptable contrast range for retro-reflective licence plates. Licence plates with both the characters and background having retro-reflective properties are relatively difficult to image, and the selected balance between the CCD sensor spectral sensitivity, the flash band pass filter and the lens filter for the camera 8 is illustrated in the graph of FIG. 30. An exposure control circuit is connected to the Robot shutter and the iris aperture mechanism of the lens of the camera 8. The circuit controls the aperture position in accordance with the level of ambient light sensed by the circuit. The circuit provides a feedback signal on line 36 to control the power and triggering of the infrared flash 40. As the acquisition camera 8 aperture closes with increased ambient illumination, the flash power is increased to maintain an optimum balance between ambient light and flash "fill-in" illumination. The circuit also includes a delay element to maintain the average flash power during large transient fluctuation of light received that can be caused when white trucks pass or sunlight is directly reflected from vehicle windscreens onto the camera 8. The circuit is based on standard exposure control circuits, and, in addition to the delay element, includes an infrared sensor to measure the ambient light. The flash power is controlled by adjusting the capacitance of the power pack for the flash 40.

Figure 31:
FIGS. 31 and 32 are images acquired by the system.
Figure 32:

The infrared flash 40 is mounted at an angle of 9.5° with respect to the optical axis of the acquisition camera 8, and at an angle of greater than 15° to the roadway 16. The field of view 39 of the flash 40 is similar to the field of view 20 of the acquisition camera 8. The geometry of the flash 40 is important so as to reduce any retro-reflective effect from the exposed vehicle, in particular its licence plate. The retro-reflective properties of the paint used on licence plates is such that the maximum reflected light is back along the axis of the flash illuminating beam. The angle of illumination and the illumination energy is selected to take into account the diverse range of retro-reflective and non-retroreflective paint colours and formulations used on licence plates. Examples of the images which can be obtained by the acquisition camera 8 of the vehicle monitoring system are illustrated in FIGS. 31 and 32.

Figure 33:
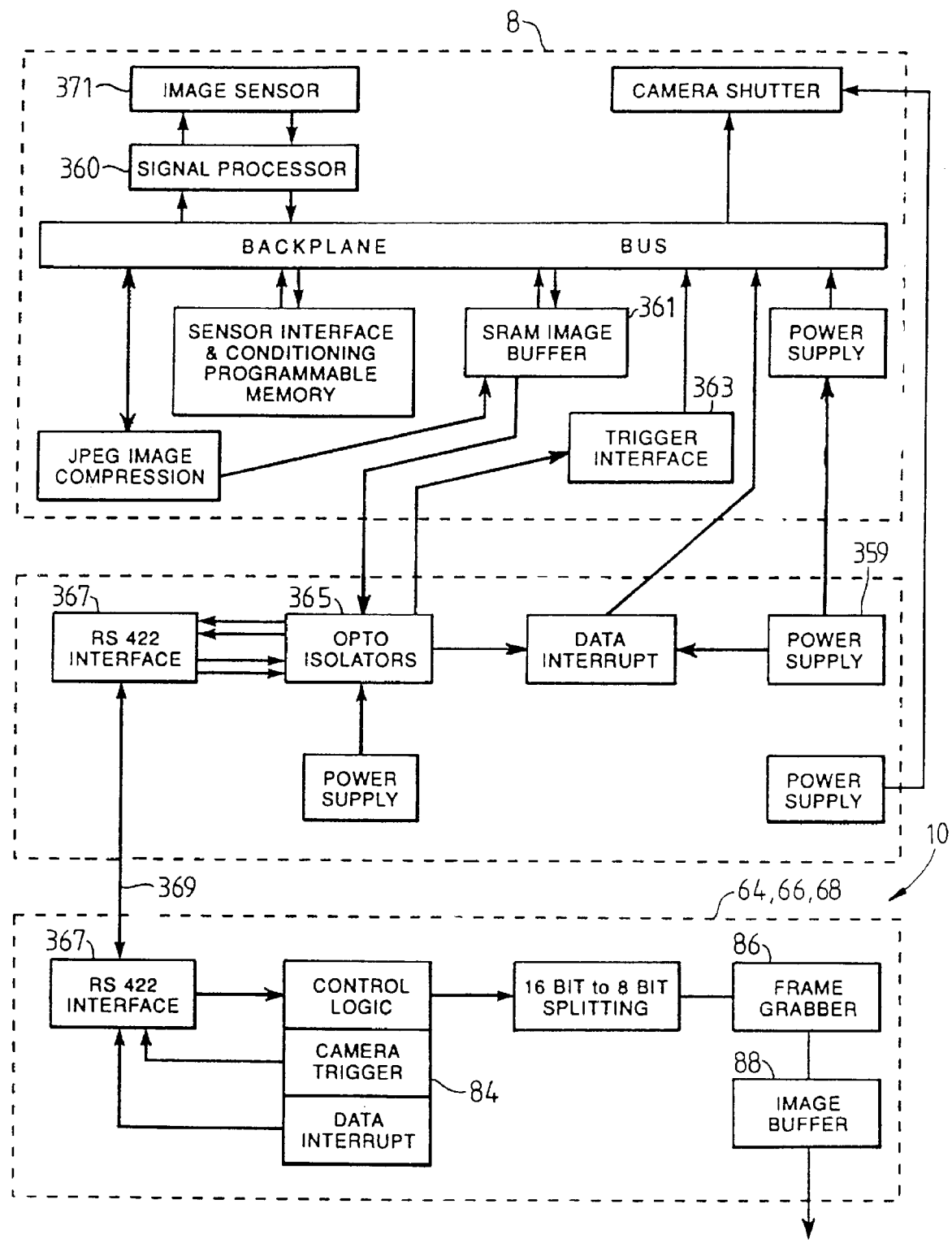
FIG. 33 is a block diagram of components of the acquisition camera, and interface components for the camera of the image capture circuitry.

The acquisition camera 8 is connected to the d etectio n sub-system 66 and acquisition sub-system 68 by an interface board 359, as shown in FIG. 33. The interface board 359 provides power to the camera 8, can issue data interrupts for the processor 360 of the camera 8, and is connected to an image buffer 361 and trigger interfaces 363 of the camera 8 by optical isolators 365. The interface board 359 provides communications to the control unit 10 via differential RS422 communications interfaces 367 which are connected by communications cables 369. The trigger signal is provided form the trigger board 84 to the trigger interface 363 of the camera 8 by the RS422 interconnect. Image data produced by the CCD sensor 371 is available in the image buffer 361 of the camera 8 approximately 300 ms after the camera 8 receives the trigger signal. At that time a data interrupt signal is sent form the control unit 10 to request transfer of the image data from the camera 8. The image data is read form the image buffer 361 as 16 bit words at a rate of 1 Mword/s, where each word represents two 8 bit pixel values. A strobe clock edge is also included in each 16 bit word for timing purposes. The 16 bit data stream is converted to 8 bit data at standard logic levels by the CPU 64, and the asynchronous image data is then processed by a frame grabber 86 of the acquisition sub-system 68, which is a Datacube Maxscan board. The image data is then clocked into an acquisition image buffer board 88 where it is held until transferred by a bus repeater 89 to the image buffer and communications controller 57 or licence plate recognition system 51, as shown in FIG. 6.

The images captured by the acquisition camera 8 possess the following characteristics:

(i) A full lane width of 3.5 meters is imaged.

(ii) The pixel resolutions of each license plate character, for character sets of 40×80 mm, were at least 10×20 pixels for W, Z, and O, and a minimum of four pixels for a character stroke, such as the letters I, L etc. Pixel resolutions of up to 15×30 were achieved on characters for a full lane field of view 20.

(iii) The average grey level of a character stroke is at least 20 grey levels higher than the background of the grey level of the license plate.

(iv) Both the license plate region and the vehicle body work are imaged adequately to enable identification and verification of vehicle type.

(v) The quality of the license plate image is relatively constant throughout a 24 hour period for all vehicle and license plate types.

Figure 34:
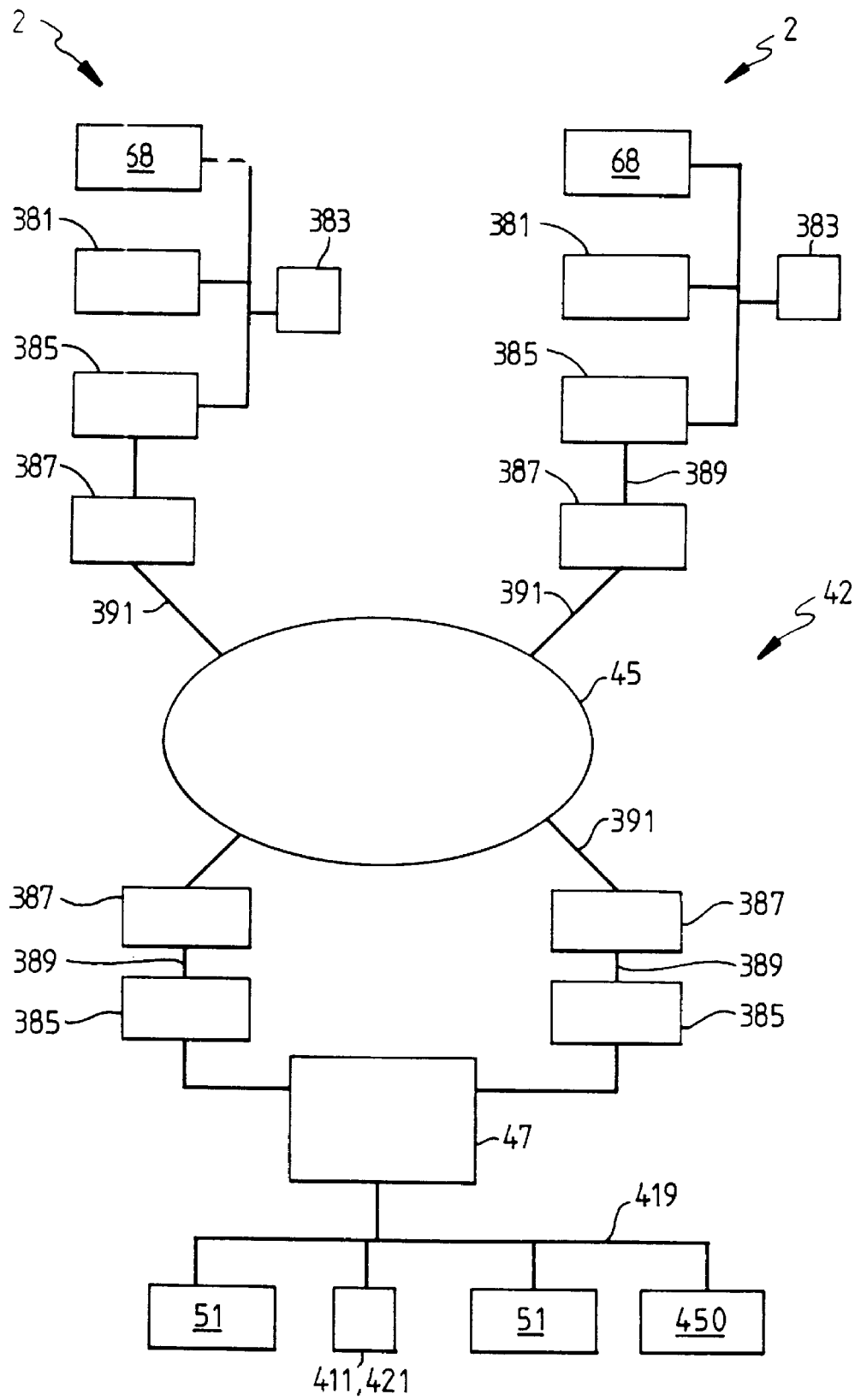
FIG. 34 is a block diagram of communications components of nodes of the system, and the components of an acquisition image processing system of the system connected over the digital telecommunications network.

The image buffer and communications controllers 57 include a Silicon Graphics Personal IRIS 4D/355 machine as a buffer box 381 for handling intermediate storage of images on disk 383, a CISCO Internet Protocol (IP) router 385 and a Summit Technologies S2000 ISDN bandwidth manager 387, as shown in FIG. 34. The remaining description relates to image transfer between the repeater 89 and the buffer box 381, but the description also applies to image transfer between the repeater 89 and a license plate recognition system 51 located at the node 2, as shown in FIG. 6.

Figure 35:
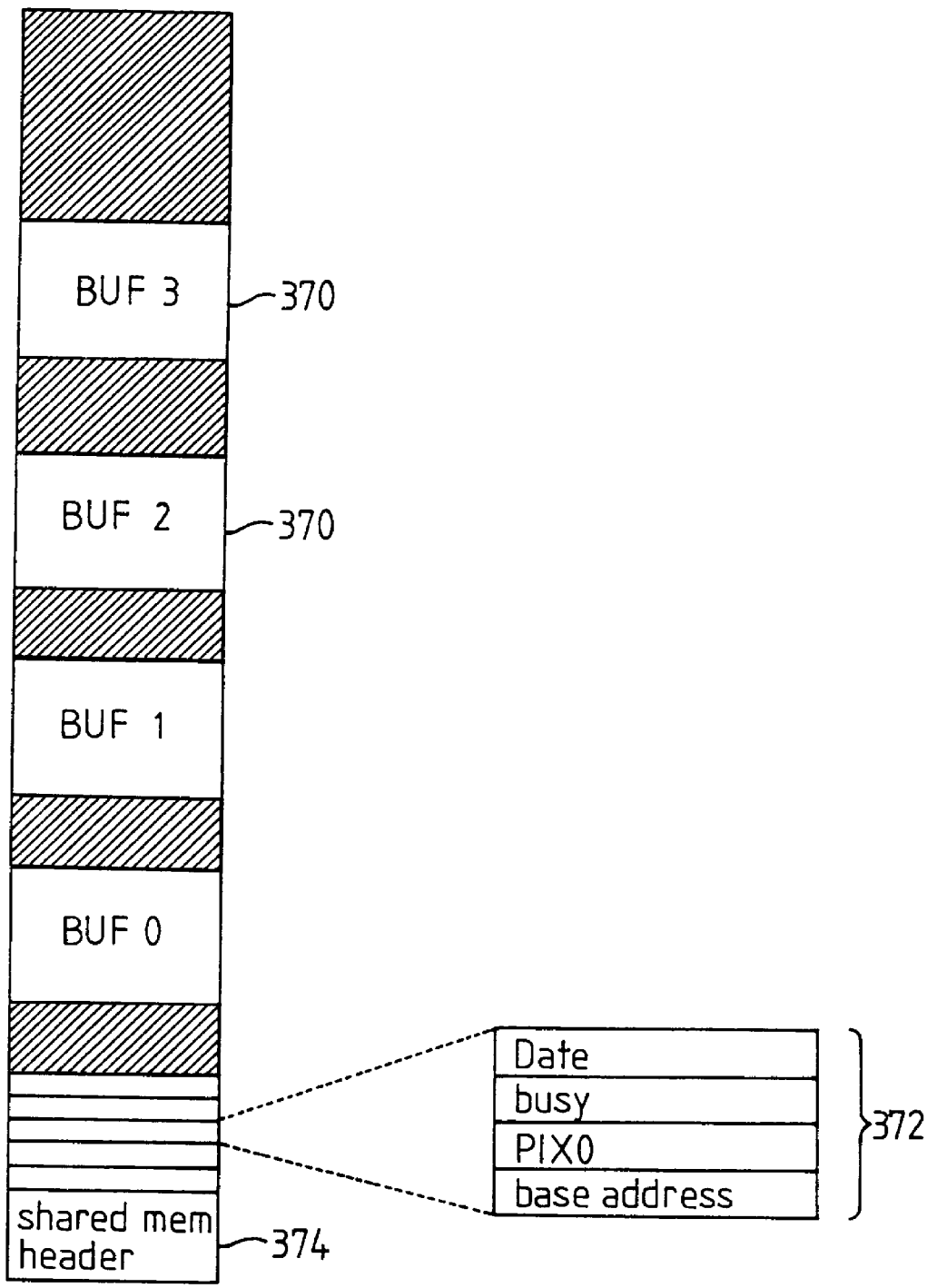
FIG. 35 is a diagram of the memory layout for a buffer board of the image capture circuitry.

The data transfer by the bus repeater 89 to the buffer box 381 is made by a 3 MB/s digital line. The repeater 89, which is a BIT3 Model 413 VME-bus repeater, with DMA capability, enables the buffer box 381 to copy data directly from the buffer 88 in the acquisition sub-system 68. To coordinate image transfer between the buffer box 381 and the system 68, an image header structure is established for storage of the images in the buffer 88, and messages are allowed to be passed back and forth between the buffer box 381 and the system 68 via interrupts in a mail box location. The memory layout for the image buffer 88 is shown in FIG. 35 and the higher memory locations are used to store acquired images in buffer segments 370 with a header 372 for each image buffer being stored in the lower memory locations. The image header 372 includes date of image acquisition, a base address for the image in the buffer 88, a busy flag to indicate whether the image is presently being read, and information on the size of the image. A memory header 374 at the lowest location in the buffer is shared with the buffer box 381, and includes the following fields:

1. ha-hostintr: used by the buffer box 381 to specify which type of interrupts they are sending.
2. ha-imagenum: used to tell the buffer box 381 which image to read after an image available interrupt is sent.
3. ha-numbufs: the number of image buffers allocated in the buffer 88.
4. ha-height, ha-width: the organisation of the image within the buffer 88.
5. ha-bufsize: the size of the buffer, which is a multiple of 256 bytes.

Control of the acquisition sub-system 68 is performed by the files acq.h, buf.h, acqconf.h, acq.c, ccir.c, ccir.-hires.c, and ccir.-kodak.c. Communications between the two system 68 and the buffer box 381 is controlled within the control unit 10 by the files comms.h, shmem.h, bit3.h and comms.c.

Figure 36:
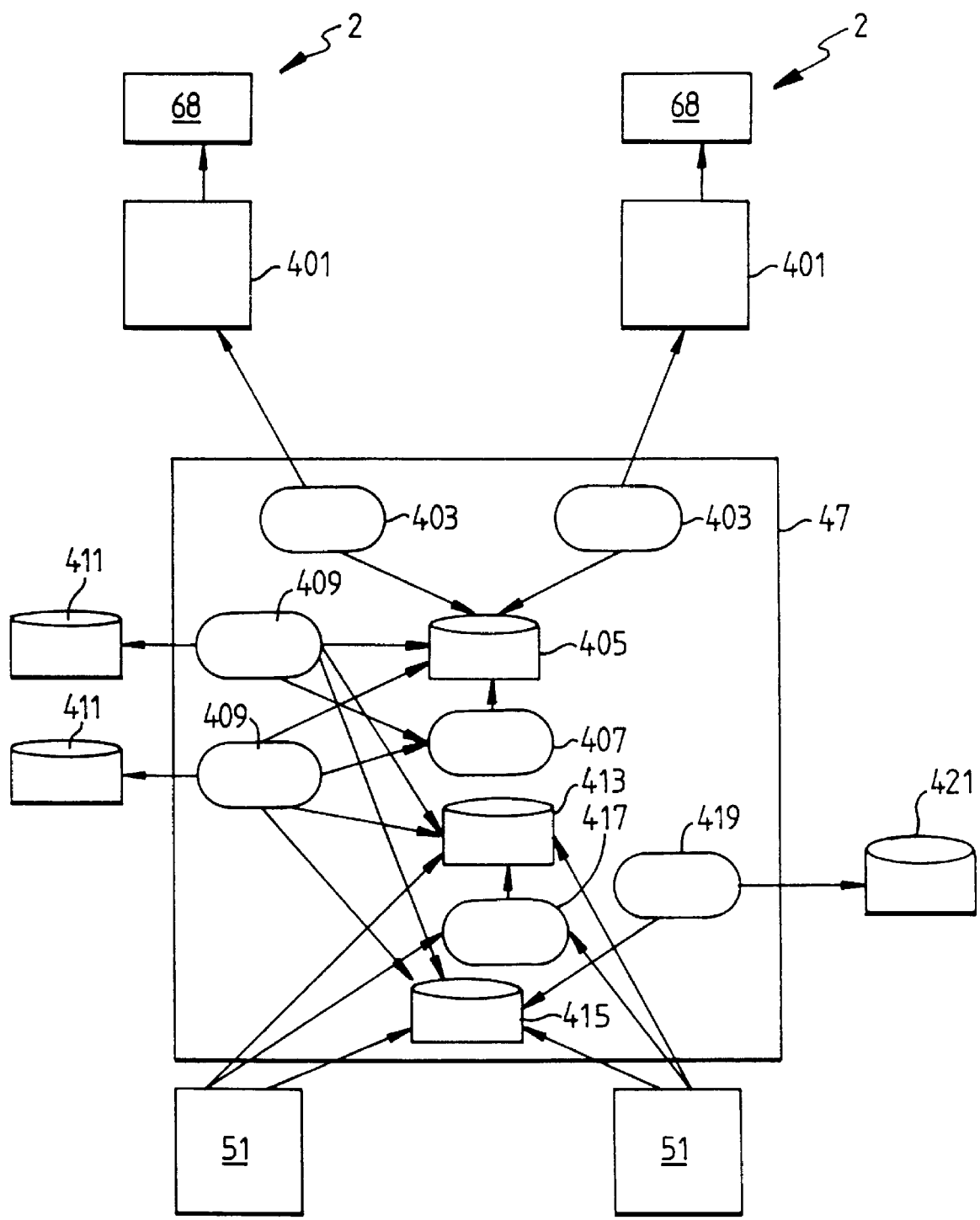
FIG. 36 is a flow diagram illustrating software modules of the acquisition image processing system and communications modules of the nodes.

The architecture of the software modules used by the buffer box and the acquisition image processing system 42 is illustrated in FIG. 36. The buffer box runs a capture module 401 which is responsible for communication between the acquisition sub-system 68 via the BIT3 interface board 489. The module poles the acquisition sub-system 68 for images, stores them in a memory buffer, and then stores them in a directory CaptureQ as a file with a unique name. The name is made up of the first five characters of the name of the buffer box 381 and a ten digit number. A CRC error checking value is generated and image data is stored in a header of the file, including the name of the remote site or node 2, the time the image was captured by the camera 8, the image header length, the CRC value and the image width and height. The CaptureQ is able to store 500 images, the data of which each occupy approximately 1.5 Mbytes. If the CaptureQ overflows, the images are discarded, and the file names of the lost image is recorded in an error file together with the time the images are discarded. Overflow of the CaptureQ may occur if the acquisition sub-system 68 acquires images at a high rate for a long period of time, or the link through the ISDN 45 to the central server 47 is out of service for an extended period of time. The communications link to the central server 47 from each remote site 2 is provided by the router 385 connected to the buffer box 381, and a X21 protocol link 389 between the router 385 and the bandwidth manager 387, which provides a Macrolink™ 391 to the ISDN 45. The central server 47 in turn is also connected to the ISDN 45 for each remote site 2 by a CISCO IP router 385, a Summit Technologies S2000 bandwidth manager 387, and X21 link 389 between the manager 387 and the router 385, and a Macrolink 391 to the ISDN 45. The bandwidth manager 387 and the router 385 form the communications controller 42 of the acquisition image processing system 42. The X21 links 389 are standard B-ISDN communications link governed by CCITT standards. The Macrolinks 391 are Primary Rate Access links provided by the second applicant and are based on the CCITT standards for Primary Rate Access in the B-ISDN. The X21 links operate at 768 KB/s and the Macrolinks provide two virtual links operating at 384 KB/s. The bandwidth manager 381 is essentially a multiplexer which uses a data aggregation protocol and provides access to the ISDN 45.

The remote sites 2 are each represented at the central server 47, which is a Silicon Graphics Crimson machine, by a retrieve module 403, as shown in FIG. 36, which makes a socket connection to the respective remote site 2 and polls for an image from the remote site 2. The FTP protocol, which is a Unix file transfer protocol, is used to retrieve images, including their associated data, from the remote site 2 and when received the image is checked for integrity of the image data on the basis of the CRC value, and stored on a RetrievalQ directory 405 of the server 47 which has a capacity of 720 images. The images are stored on the RetrievalQ 405 with the time when the image was first requested and the time when the image was finally received. An SDistributor module 407 is responsible for distributing the image file names to store modules 409 of the central server 47. The store modules 409 retrieve images from the RetrievalQ 405 and archive them in respective images stores 411 which have the capacity to store images acquired over a week from each side 2. The image stores 411 are Exabyte 101 tape storage systems which can each hold up to ten tapes that each have a capacity set at 3000 images. The store module 409 communicates with a tape driver for each store 411 which based on a tape driver developed by Gene Dronek of Vulcan Laboratories, U.S. The driver controls loading and unloading of a tape from a store 411 by a robot arm. The driver on initialisation determines the number of tapes in the store 411, and for a cold start formats each tape and loads the first tape. For a warm start the driver simply selects the tape last used. When a tape reaches its 3000 image capacity it is returned to its storage bay and the next tape is selected.

The SDistributor module 407 has a list of the names of the files in the RetrievalQ 405 called store list and another list of the names of files which are in the process of being stored on an image store 411 called InProgress list. When a store module 409 requests a file name, the SDistributor module 407 returns a file name from the store list and moves that name to the InProgress list. If a file name is not available, the module 407 accesses names from the RetrievalQ, adds them to the store list and then returns file names. When the module 407 receives a storage acknowledgment from the store module 409, then the file name is removed from the InProgress list. The store module 409 poles the SDistributor module 407 for a file name, and on receiving the file name retrieves the corresponding file from the RetrievalQ and copies it onto the image store. The same file is also copied onto a directory of the server 47, IPQ 413 which can hold 750 images. If IPQ 413 is full, the file is discarded and the header of the file is copied onto a further directory DatabaseQ. An acknowledgment message is then sent to the SDistributor module 407. A time stamp is placed on all files indicating when the file is archived.

An IPDistributor module 407 distributes images to a license plate recognition system 51 connected to the Ethernet LAN 419 of the central server 47. The module 417 maintains a list of file names, called Image list, which represents the files held in IPQ 413. When the license plate recognition system 51 poles for a file name, the module 417 returns a file name from image list and moves that file name to another list, IPProgress list. When the system 51 acknowledges that it has received the corresponding file, then the file name is deleted form the IPProgress list, together with the file from IPQ 413. If file names are not available in Image list, the names are obtained from IPQ by the module 417, and added to the list. The module 417 communicates with the system 51 via a socket connection. License plate details extracted by the recognition system 51 are stored on a DatabaseQ 415 of the server 47 together with other image data details, such as image acquisition time, and instantaneous speed of vehicle which have already been provided with the image from the remote sites 2. A database module 419 poles for files placed on DatabaseQ 415, and then stores the files on in image database 421.

Figure 37:
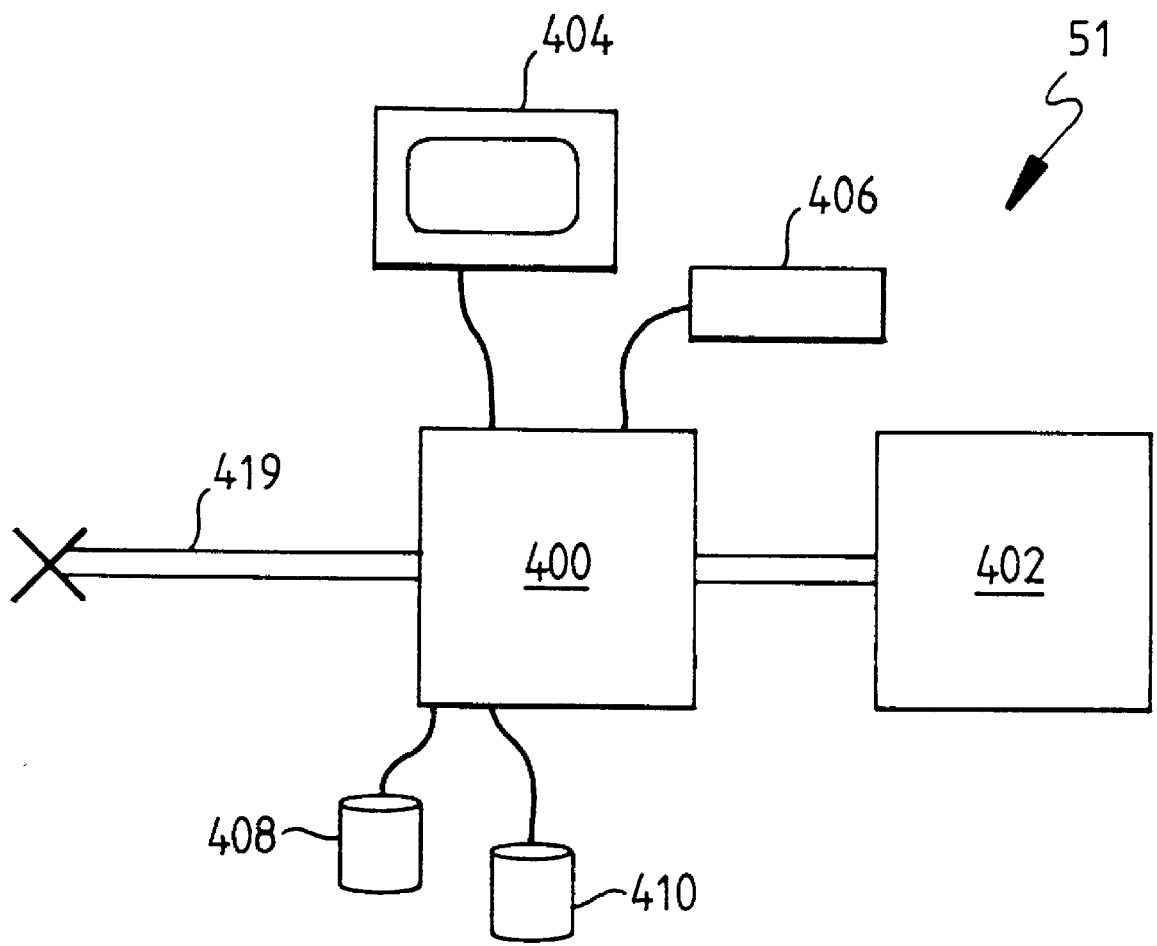
FIG. 37 is a block diagram of a licence plate recognition system of the vehicle monitoring system.
Figure 38:
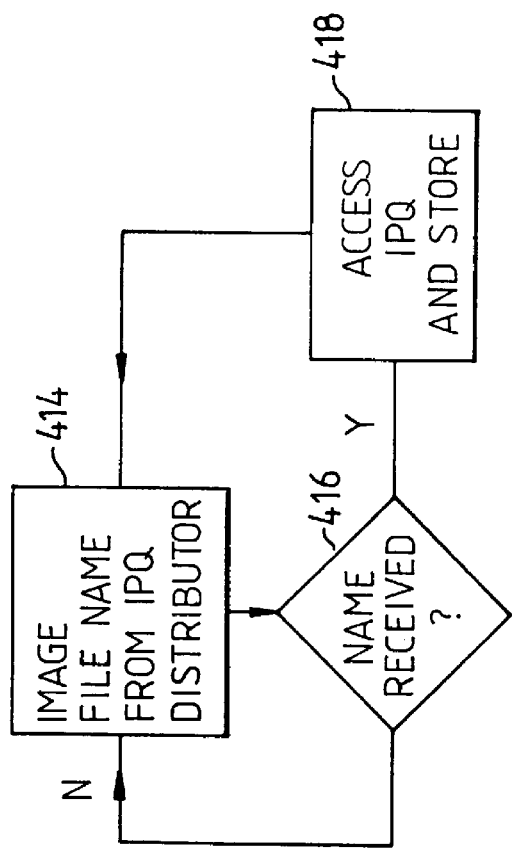
FIG. 38 is a flow diagram of an image acquisition procedure of the licence plate recognition system.

The license plate recognition system 51 has been implemented using a Silicon Graphics workstation 400 which is connected to the LAN 419, as shown in FIG. 37, but can also be connected directly to the repeater board 89 at a remote site 2. A Pixar II image computer 402 is connected to the workstation 400 and acts as an image co-processor. The system 51 also includes a monitor 404, a keyboard 406, disc storage of 600 MB 408 and optical disk storage of 1.2 GB 410 connected to the workstation 400. The workstation 400 uses, inter alia, VIVID (Vehicle Identification by Video Image Detection) software owned by the State of Victoria which is able to locate a numberplate in a vehicle image, and then perform optical character recognition (OCR) on the located numberplate to extract the license plate characters. The parameter settings of the VIVID software have been adjusted to handle the images provided by the acquisition sub-system 68, according to the size and contrast of the images. To accept the images at a peak rate of 2 per second, a real time image handling procedure 412, as shown in FIG. 38 is used. The procedure begins at step 414 by requesting an image file name from the IP distributor model 417. If a name is not received at step 416, the IP distributor module 417 is polled again, otherwise the received name is used to access the IPQ 414 and store the image file on the disk 408, at step 418.

Figure 39:
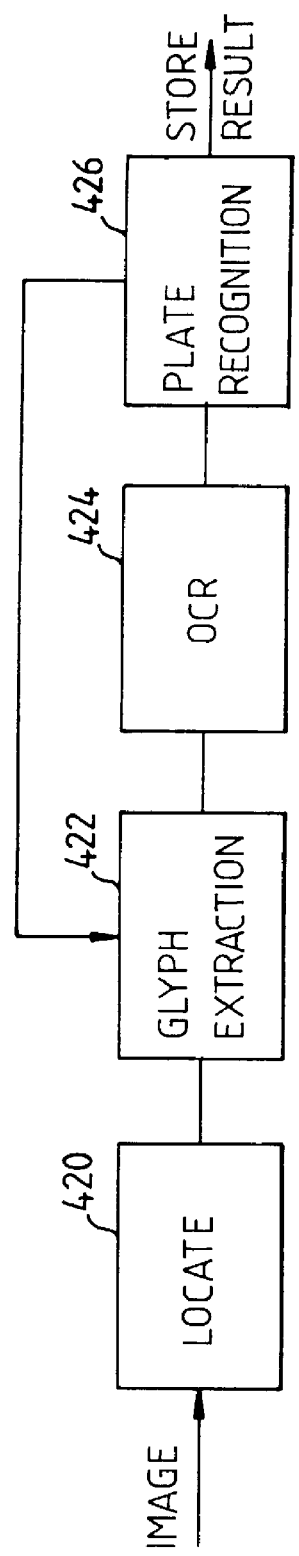
FIG. 39 is a flow diagram of the software modules of the licence plate recognition system.
Figure 41:
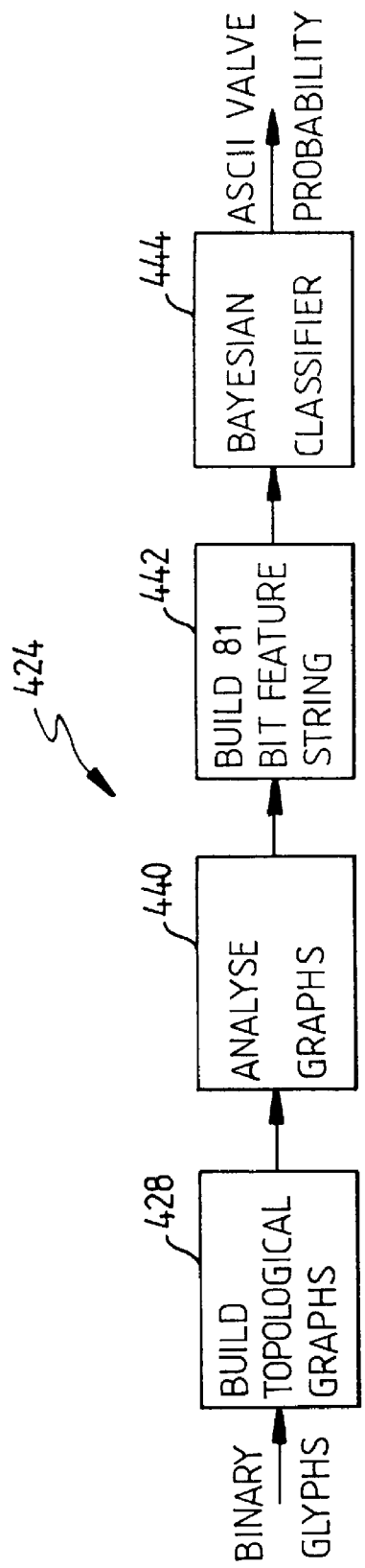
FIG. 41 is a flow diagram of an optical character recognition module of the licence plate recognition system.

Images are accessed from the disk 408 and processed by four separate software modules of the workstation 400, a locate plate module 420, a glyph extraction module 422, and OCR module 424 and a plate recognition 426, as shown in FIG. 39. The locate plate module 420, as shown inimage for proces at step 430 by preparing the 1280×1024 pixel image for processing as a number of pixel windows for the Pixar co-processor 402. At step 432, the system 51 attempts to detect an edge of a character size object, and when detected the object's location is determined at step 434. An object assembler is used at step 436 to group adjacent objects together, and the groups are processed by a plate classifier 438 to determine whether the object groups could constitute a license plate. If an object group is classed as a plate according to a plate template, a bounding box is formed, and its coordinates returned to the glyph extraction module 422. The glyph extraction module 422 processes each bounding box to binarise and extract individual characters in a bounding box and then pass the "glyphs", i.e. license plate letters and numbers, to the OCR module 424. The OCR module 424, as shown in FIG. 41 begins at step 428 by building a typological graphical representation of a glyph from the glyph bitmap provided by the glyph extraction module 422 for each glyph. The graphical representation is analysed at step 440 so as to detect any characteristic features, such as holes, arcs and vertical horizontal lines. From the results of step 440 an 81 bit string representing the characteristic features of the glyph is created at step 442. A bayesian statistical analysis is then performed at step 444 on the feature string to try and match the features against a set of previously determined features characteristics of known ASCII characters. The ASCII value of the match with the highest probably of being correct is returned to the plate recognition module 426.

The plate recognition module 426 determines whether the glyphs in a bounding box constitute a valid license plate. The module 426 effectively controls the other image processing modules as it has the ability to override the results of the OCR module 424 or to force the glyph extraction module 422 to use a bounding box other than that found by the locate module 420. The majority of vehicle plates in Australia have six characters and fall into one of two classes, Federal plates or non-Federal plates. Federal plates comprise two alphabetic characters, two digits and two alphabetic characters, whereas non-Federal plates comprise three alphabetic characters and are followed by three digits. The plate recognition module 426 is able to determine whether a valid license plate has been found on the basis of this information, and other information, such as the spacing of characters and the specific characteristic alphanumeric sequences used by the non-Federal plates. The OCR module, for example, may not be able to distinguish between capital B and 8, and for many plate fonts, there is not difference between a 0 and O or a 1 and an I. Therefore the plate recognition module 426 may need to override the results obtained by the OCR module 424. The plate recognition module 426 is also able to instruct the glyph extraction module 424 to process an altered bounding box if the module 426 determines that there may be additional glyphs to the left or right of an original bounding box returned by the locate module 420. The license plate details obtained by the plate recognition module 426 are stored on DatabaseQ 415 of the server 47, and archived on the optical disk 410. The optical disk 410 also archives image files which the system 51 is unable to process when received.

The database on the optical disk 410 stores for each processed image as does DatabaseQ 415, data concerning the position, size and characters of the numberplate located in the image, and other details such as time and data of acquisition. It is also structured with data pointers which facilitate access to the stored data by the workstation 400. The workstation 400 includes graphical user interface software which enables an operator to review the results of the procedures 412 and 414, and perform further optical character recognition on numberplate regions, as selected. Any further OCR processing performed on a plate region selected by the operator of the workstation 400 is normally used to analyse the performance of the procedures 412 and 414 and not to alter the integrity of the data held in the optical disk 410.

The image data stored on database 421 is processed by matching software which looks for matches amongst the license plate details fields of the image data so as to locate occurences of detection of the same license plate at different remote sites or nodes 2. Once a match has been located, the acquisition time fields can be used to determine whether speed or time violations have occurred in travel between remote sites 2, as distance between the sites 2 is known. The matching software is run on a Sun Microsystems workstation 450 connected to the LAN 419, or alternatively, the matching software is run on a system of a road traffic authority, with the image data being sent by the central server 47 over the ISDN 45 to the road traffic authority. The road traffic authority is able to communicate with the central server 47 via the ISDN 45 to obtain archived images, as required.

To avoid sending all images to the central server 47, a large number of which may not be of interest, images can be archived at the nodes 2, and license plate details extracted at the remote nodes 2 by respective license plate recognition systems 51 connected directly to the BIT3 repeater cards 89 of a node's acquisition sub-system 68. The server 47 then only receives the extracted license plate details, and other data on the image, such as acquisition time, the remote site, and instantaneous speed, and not the image itself. Images archived at the remote sites 2 can be retrieved by the central server 47 when required.

Control of the remote nodes 2 is performed by the remote site user interface 53 which runs on the Sun workstation 450 connected to the LAN 419 of the central server 47. The interface 53 includes a user tool which communicates with a super task of each remote site 2 using a Sun Microsystems Remote Procedure Call (RPC) communications protocol. The super task provides a set of procedural functions which can be called by the user tool using the RPC protocol, regardless of the location of the workstation 450. The RPC protocol handles data type conversions and alignment. The procedures provided by the super task perform various actions which together allow complete control of the software of a node 2. For example, a parameter file maintains a list of all variables used by the software of the nodes 2, together with their initial values. The form of the values indicates the variable type, which may be a decimal integer, a hexadecimal integer, a floating point value, a character string or a boolean value. The variables can be altered by adjusting the parameter file, and location of the variables listed in the parameter file is done via VxWorks systems table which contains all global symbols. The user tool, in addition to changing system parameters, can access the super task to obtain status and configuration information on each node 2. The user tool and the super task are provided by super.c and new_user_tool.c listed in the microfiche appendix.

The super task accepts RPC transactions via both the Transmission Control Protocol (TCP) and the User Datagram Protocol (UDP), both of which use the Internet protocol (IP) for transmission of datagrams between computer systems. UDP is connectionless protocol which primarily involves multiplexing of datagrams, whereas TCP is a connection oriented protocol which seeks to ensure data integrity is maintained. The user tool presently uses TCP/IP which, together with the RPC protocol, is provided with Sun Microsystem's SunOs operation system and the VxWorks real time operating system. To protect against different central stations accessing a remote node and making conflicting changes to system parameters, the user tool provides information on the current state of the node software before any alteration can be made.

The master clocks 354 of the remote sites 2 are synchronized to the clock of the central server 47, and the systems 51 and 450 connected to the LAN 491 using a network time protocol (NTP), which is a standard UNIX utility normally used to synchronize the clocks of stations on a LAN. The NTP polls the remote sites 2 and on the basis of information received from the sites 2 concerning communications between the sites and the server 47, the NTP applies offsets to the remote sites 2 so as to synchronize the sites 2 and account for network propagation delays, including transient network problems such as link congestion.

The vehicle monitoring system is particularly advantageous as it is able to detect and discriminate moving vehicles from other objects, and acquire an image of selected vehicles from which they can be identified, using only electronic cameras and processing circuitry and software housed at a remote site 2. The system enables automatic extraction of license plate details and does not require road based equipment or markings, the emission of electromagnetic signals or the replacement of film at the node 2.

The system is able to simultaneously track a number of vehicles on multi-lane carriageways and classify them by vehicle type. A high resolution image of a vehicle can be obtained over a full traffic lane, the resolution and clarity of the invention being sufficient to enable extraction of the license plate details. The system can operate continuously in all conditions where visibility is greater than 100 meters, using infrared imaging techniques. The high resolution camera incorporates antiblooming technology to prevent pixel saturation due to vehicle headlights, and the infrared flash used is configured so as to be substantially undetectable and inhibit flash dazzle.

The system can also be controlled and initialised from a remote central station, with images and data being transmitted over a digital communications network.

The system can further be used for a number of purposes, such as monitoring tailgating offences, road toll collection, and transmit lane monitoring. It can also be adapted for red light intersection monitoring.

The system can also be adapted to monitor and acquire images of other moving objects, such as the movement of shipping containers within transport depots, and the movement of objects on an assembly line.

We claim:

1. An object monitoring system comprising
   camera means for generating images of an area and for acquiring an image of a predetermined object, and
   image processing means including:
   means for subtracting a background image of said area from said images of said area to generate difference images representative of moving objects in said area;
   segmentation means for processing said difference images to generate region images representative of regions corresponding to parts of said moving objects in said area;
   classification means for processing and classifying said region images, said classification means including
   means for analyzing the shape of said regions and, on the basis of the analysis, determining valid regions and invalid regions,
   clustering means for rejecting said invalid regions and generating, on the basis of the geometry of said valid regions, clusters corresponding to respective ones of said moving objects, and
   means for classifying said clusters by comparing at least one characteristic of said clusters to classification data of said system to determine if one of said clusters corresponds to said predetermined object; and
   tracking means for tracking said one of said clusters corresponding to said predetermined object to determine an image acquisition time for acquiring said image of said predetermined object.

2. An object monitoring system as claimed in claim 1, wherein said image processing means filters said difference images to disregard pixels within a predetermined intensity range.

3. An object monitoring system as claimed in claim 2, wherein said parts of moving objects correspond to at least a predetermined light level received at said camera means.

4. An object monitoring system as claimed in claim 3, wherein said classification means extends said valid regions to determine if said valid regions have to be combined to form said clusters.

5. An object monitoring system as claimed in claim 4, wherein said classification means includes labeling means for assigning labels to clusters, respectively, for each one of said images of said area to identify said clusters, and for matching clusters over consecutive ones of said images of said area to determine if labels are to be inherited or new labels assigned.

6. An object monitoring system as claimed in claim 5, including means for maintaining a histogram of said at least one characteristic of said clusters, and adjusting said classification data on the basis of said histogram.

7. An object monitoring system as claimed in claim 6, including light intensity means for determining a lighting level of said area, and wherein said predetermined intensity range, said analysis of said regions, extension applied to said valid regions by said classification means, and said classification data are adjusted depending on said lighting level.

8. An object monitoring system as claimed in claim 7, wherein said tracking means includes transformation means for transforming coordinates of said one of said clusters to compensate for a perspective view of said camera means, and means for predicting the speed and position of said one of said clusters for each succeeding image of said images of said area.

9. An object monitoring system as claimed in claim 7, wherein said tracking means determines said acquisition time on the basis of an image capture position and the position of said one of said clusters.

10. An object monitoring system as claimed in claim 9, wherein said camera means includes video camera means for monitoring said moving objects and image capture camera means to acquire said image of said predetermined object at said acquisition time, said image being a high resolution image of said predetermined object.

11. An object monitoring system as claimed in claim 10, wherein said video camera means has a wide field view relative to said image capture camera means, which has a limited field of view.

12. An object monitoring system as claimed in claim 11, including an infrared flash which is synchronized with said image capture camera means, the energy level of said flash being dependent on said lighting level.

13. An object monitoring system as claimed in claim 12, wherein said image capture camera means includes image sensor means and exposure control means for inhibiting saturation of said image sensor means in response to said lighting level.

14. An object monitoring system as claimed in claim 13, wherein said flash includes means for attenuating the emission of visible light therefrom.

15. An object monitoring system as claimed in claim 14, wherein said extension applied by said valid regions is increased when said lighting level corresponds to a night condition.

16. An object monitoring system as claimed in claim 15, wherein said exersion is less for valid regions corresponding to said moving objects distant from said camera means.

17. An object monitoring system as claimed in claim 16, wherein said labeling means performs said matching on the basis of comparing boundaries of said clusters for said consecutive ones of said images of said area.

18. An object monitoring system as claimed in claim 17, wherein said difference images are filtered and used to update said background image.

19. An object monitoring system as claimed in claim 18, including means for triggering said image capture camera means at said acquisition time, comprising means for receiving and storing a number of scan lines corresponding to said acquisition time from said tracking means, means for counting scan lines of said images of said area, and means for generating a trigger signal for said image capture camera means when said count reaches said number.

20. An object monitoring system as claimed in claim 18, wherein said light intensity means generates a histogram of pixel grey levels for said images generated by said video camera means, and determines a day, night or twilight light condition on the basis of the median of said histogram.

21. An object monitoring system as claimed in claim 20, wherein said predetermined intensity range is determined on the basis of the minimum, median and peak of said histogram.

22. An object monitoring system as claimed in claim 21, wherein said analysis includes determining circularity and coverage of said valid and invalid regions.

23. An object monitoring system as claimed in claim 16, wherein said labeling means performs said matching on the basis of comparing centres of said clusters for said consecutive one of said images of said area.

24. An object monitoring system as claimed in claim 7, wherein said camera means includes exposure control means for adjusting camera exposure on the basis of said lighting level.

25. An object monitoring system as claimed in claim 1, including recognition means for processing said image of said predetermined object to obtain information identifying said predetermined object.

26. An object monitoring system as claimed in claim 25, including a plurality of said camera means and image processing means for monitoring a plurality of areas, respectively, and being adapted to communicate with one another so as to transfer information on said predetermined object, said areas being remote with respect to one another.

27. An object monitoring system as claimed in claim 25, including a plurality of said camera means and image processing means for monitoring a plurality of areas, respectively, and being adapted to communicate with a central station so as to transfer information on said predetermined object, said areas being remote with respect to one another.

28. An object monitoring system as claimed in claim 27, wherein said information on said predetermined object is acquired by at least two of said camera means and image processing means and said information can be used to determine the time which said predetermined object took to travel between at least two of said areas.

29. An object monitoring system as claimed in claim 28, wherein said central station includes remote control means for controlling said plurality of said camera means and image processing means from said central station.

30. An object monitoring system as claimed in claim 29, wherein said central station and said plurality of camera means and image processing means include respective telecommunications controllers and communicate using a digital telecommunications network.

31. An object monitoring system as claimed in claim 30, including means for archiving said information and allowing subsequent access thereto.

32. An object monitoring system as claimed in claim 31, wherein said information includes acquired images of said predetermined object and the times of acquisition, and said central station includes said recognition means.

33. An object monitoring system as claimed in claim 32, wherein said recognition means is adapted to process said image of said predetermined object to locate pixels representative of characteristic pixels identifying said object.

34. An object monitoring system as claimed in claim 31, wherein said information includes said identifying information and the times of acquisition of acquired images of said predetermined object, and a plurality of said recognition means are connected to said plurality of camera means and said image processing means, respectively, at the sites of said plurality of camera means and image processing means.

35. An object monitoring system as claimed in claim 28, wherein the objects are vehicles.

36. An object monitoring system as claimed in claim 35, wherein said recognition means comprises means for locating a licence plate in said image of said predetermined object and means for determining the characters of said licence plate, said characters comprising said identifying information.

37. An object monitoring system as claimed in claim 36, wherein said predetermined intensity range covers pixel intensities produced by shadows of said vehicles.

38. An object monitoring system as claimed in claim 37, wherein said invalid regions correspond to headlight reflections produced by said vehicles.

39. An object monitoring system as claimed in claim 38, wherein said predetermined object is a large vehicle, such as a bus or truck.

40. An object monitoring system as claimed in claim 39, wherein said central station includes remote control means for controlling said plurality of camera means and image processing means from said central station.

41. An object monitoring system as claimed in claim 40, wherein said central station and said plurality of camera means and image processing means include respective telecommunications controllers and communicate using a digital telecommunications network.

42. An object monitoring system as claimed in claim 41, including means for archiving said information and allowing subsequent access thereto.

43. An object monitoring system as claimed in claim 42, wherein said information includes said high resolution image and the time of acquisition, and said central station includes said recognition means.

44. An object monitoring system as claimed in claim 42, wherein said information includes said identifying information and the time of acquisition of said high resolution image, and a plurality of said recognition means are connected to said plurality of camera means and image processing means, respectively, at the sites of said plurality of camera means and image processing means.

45. An object monitoring system as claimed in claim 43, wherein said recognition means is adapted to process said high resolution image to locate pixels representative of characteristic pixels identifying said predetermined object.

46. An object monitoring system as claimed in claim 37, wherein said invalid regions correspond to road lane markings within said area.

47. An object monitoring system as claimed in claim 1, wherein said classification means generates and operates on the basis of region feature vectors representative of said regions and cluster feature vectors representative of said clusters.

48. An object monitoring system comprising:
camera means for generating images of an area and for acquiring an image of a predetermined object;
image processing means including:
means for subtracting a background image of said area from said images of said area to generate difference images representative of moving objects in said area,
segmentation means for processing said difference images to generate region images representative of regions corresponding to parts of said moving objects in said area,
classification means for processing said region images, said classification means including
means for analyzing the shape of said regions and, on the basis of the analysis, determining valid regions and invalid regions,
clustering means for rejecting said invalid regions and generating, on the basis of the geometry of said valid regions, clusters corresponding to respective ones of said moving objects, and
means for classifying said clusters by comparing at least one characteristic of said clusters to classification data of said system to determine if one of said clusters corresponds to said predetermined object, and
tracking means for tracking said one of said clusters corresponding to said predetermined object to determine an image acquisition time for acquiring said image of said predetermined object; and
extraction means for processing said image of said predetermined object to extract information identifying said predetermined object.

49. An object monitoring system as claimed in claim 48, including means for transmitting said image of said predetermined object over a digital telecommunications network.

50. An object monitoring system as claimed in claim 48, including a plurality of said camera means and image processing means for monitoring a plurality of areas, respectively, said areas being remote with respect to one another, and means for comparing said information respectively obtained at said areas.

51. An object monitoring system as claimed in claim 48, wherein the objects are vehicles.

52. An object monitoring system as claimed in claim 48, wherein said classification means generates and operates on the basis of region feature vectors representative of said regions and cluster feature vectors representative of said clusters.

53. A vehicle monitoring system comprising:
   camera means for generating images of a carriageway and for acquiring images of predetermined vehicles, and image processing means including:
      means for subtracting a background image of said carriageway from said images of said carriageway to generate difference images representative of moving vehicles on said carriageway;
      segmentation means for processing said difference images to generate region images representative of regions corresponding to parts of said moving vehicles on said carriageway;
      classification means for processing said region images, said classification means including
         means for analyzing the shape of said regions and, on the basis of the analysis, determining valid regions and invalid regions,
         clustering means for rejecting said invalid regions and generating, on the basis of the geometry of said valid regions, clusters corresponding to respective ones of said moving vehicles, and
         means for classifying said clusters by comparing at least one characteristic of said clusters to classification data of said system to determine if said clusters correspond to said predetermined vehicles; and
      tracking means for tracking said clusters corresponding to said predetermined vehicles to determine image acquisition times for acquiring said images of said predetermined vehicles.

54. A vehicle monitoring system as claimed in claim 53, wherein said camera means includes video camera means for monitoring said carriageway and a plurality of image capture camera means for acquiring said images of said predetermined vehicle for respective lanes of said carriageway.

55. A vehicle monitoring system as claimed in claim 54, wherein said images of said predetermined vehicles are high resolution images covering the width of a lane of said carriageway and enable optical character recognition means to extract licence plate characters of said predetermined vehicles.

56. A vehicle monitoring system as claimed in claim 53, including optical character recognition means for processing said images of said predetermined vehicles to extract licence plate characters identifying said predetermined vehicles.

57. A vehicle monitoring system as claimed in claim 53, wherein said classification means generates and operates on the basis of region feature vectors representative of said regions and cluster feature vectors representative of said clusters.

58. A vehicle monitoring system as claimed in claim 53, wherein said images of said predetermined vehicles are high resolution images covering the width of a lane of said carriageway and enable optical character recognition means to extract licence plate characters of said predetermined vehicles.

59. A vehicle monitoring system comprising:
   a plurality of camera means for generating images of respective areas and for acquiring images of predetermined vehicles, said areas being remote with respect to one another; and
   a plurality of image processing means including:
      means for subtracting background images of said areas from said images of said areas to generate difference images representative of moving vehicles in said areas;
      segmentation means for processing said difference images to generate region images representative of regions corresponding to parts of said moving vehicles in said area;
      classification means for processing said region images, said classification means including means for analyzing the shape of said regions and, on the basis of the analysis, determining valid regions and invalid regions, clustering means for rejecting said invalid regions and generating, on the basis of the geometry of said valid regions, clusters corresponding to respective ones of said moving vehicles, and means for classifying said clusters by comparing at least one characteristic of said clusters to classification data of said system to determine if said clusters corresponds to said predetermined vehicles;
      tracking means for tracking said clusters corresponding to said predetermined vehicles to determine image acquisition times for acquiring said images of said predetermined vehicles; and
      recognition means for processing said images of said predetermined vehicles to obtain information identifying said predetermined vehicles.

60. A vehicle monitoring system as claimed in claim 59, including means for comparing said information obtained to determine the average speed between at least two of said areas of at least one of said predetermined vehicles.

61. A vehicle monitoring system as claimed in claim 59, wherein said classification means generates and operates on the basis of region feature vectors representative of said regions and cluster feature vectors representative of said clusters.

62. A vehicle monitoring system comprising:
   camera means for generating images of an area and for acquiring an image of a vehicle associated with a law infringement, and image processing means including:
      means for subtracting a background image of said area from said images of said area to generate difference images representative of moving vehicles in said area;
      segmentation means for processing said difference images to generate region images representative of regions corresponding to parts of said moving vehicles in said area;
      classification means for processing said region images, said classification means including
         means for analyzing the shape of said regions and, on the basis of the analysis, determining valid regions and invalid regions,
         clustering means for rejecting said invalid regions and generating, on the basis of the geometry of said valid regions, clusters corresponding to respective ones of said moving vehicles, and means for detecting said law infringement by comparing at least one characteristic of said clusters to classification data of said system to determine if one of said clusters corresponds to said vehicle; and tracking means for tracking said one of said clusters corresponding to said vehicle to determine an image acquisition time for acquiring said image of said vehicle.

63. A vehicle monitoring system as claimed in claim 62, including recognition means for processing said image of said vehicle to obtain information identifying said vehicle.

64. A vehicle monitoring system as claimed in claim 62, wherein said classification means generates and operates on the basis of region feature vectors representative of said regions and cluster feature vectors representative of said clusters.

65. A vehicle monitoring system comprising camera means for generating images of a carriageway and for acquiring high resolution images of large vehicles, such as trucks and buses, and image processing means including:

means for subtracting a background image of said carriageway from said images of said carriageway to generate difference images representative of moving vehicles of said carriageway;

segmentation means for processing said difference images to generate region images representative of regions corresponding to parts of said moving vehicles on said carriageway;

classification means for processing said region images, said classification means including means for analyzing the shape of said regions and, on the basis of the analysis, determining valid regions and invalid regions, clustering means for rejecting said invalid regions and generating, on the basis of the geometry of said valid regions, clusters corresponding to respective ones of said moving vehicles, and means for classifying said clusters by comparing of at least one characteristic of said clusters to classification data of said system to determine if said clusters correspond to said large vehicles; and tracking means for tracking said clusters corresponding to said large vehicles to determine an image acquisition time for acquiring said high resolution images of said large vehicles.

66. A vehicle monitoring system as claimed in claim 65, including recognition means for automatically extracting information on said large vehicles, such as licence plate characters, from said high resolution images.

67. A vehicle monitoring system as claimed in claim 65, wherein said classification means generates and operates on the basis of region feature vectors representative of said regions and cluster feature vectors representative of said clusters.

68. An object monitoring system comprising:

video camera means for generating images of an area to monitor moving objects in said area;

image capture camera means for acquiring a high resolution image of a predetermined object; and image processing means including means for subtracting a background image of said area from said images of said area to generate difference images representative of said moving objects in said area;

segmentation means for processing said difference images to generate region images representative of regions corresponding to parts of said moving objects in said area;

classification means for processing said region images, said classification means including means for analyzing the shape of said regions and, on the basis of the analysis, determining valid regions and invalid regions, clustering means for rejecting said invalid regions and generating, on the basis of the geometry of said valid regions, clusters corresponding to respective ones of said moving objects, and means for classifying said clusters by comparing at least one characteristic of said clusters to classification data of said system to determine if one of said clusters corresponds to said predetermined object; and tracking means for tracking said one of said clusters corresponding to said predetermined object to determine an image acquisition time for said image capture means to acquire said high resolution image of said predetermined object.

69. The object monitoring system of claim 68 further including a plurality of said video camera means and image processing means for monitoring a plurality of said areas, respectively, said areas being remote with respect to one another, and means for comparing said information respectively obtained at said areas.

70. The object monitoring system of claim 68, wherein the predetermined object is a vehicle and said area is a carriageway.

71. The object monitoring system of claim 70 further including a plurality of image capture camera means for acquiring said image of said vehicle in respective lanes of said carriageway.

72. The object monitoring system of claim 68 further including recognition means for processing said image of said predetermined object to obtain information identifying said object.

73. An object monitoring system comprising:

video camera means for generating images of an area to monitor moving objects in said area;

image capture camera means for acquiring a high resolution image of a predetermined object; and image processing means including means for subtracting a background image of said area from said images of said area to generate difference images representative of said moving objects in said area;

segmentation means for processing said difference images to generate region images representative of regions corresponding to parts of said moving objects in said area;

classification means for processing said region images, said classification means including means for analyzing the shape of said regions and, on the basis of the analysis, determining valid regions and invalid regions, clustering means for rejecting said invalid regions and generating, on the basis of the geometry of said valid regions, clusters corresponding to respective ones of said moving objects, and means for classifying said clusters by comparing at least one characteristic of said clusters to classification data of said system to determine if one of said clusters corresponds to said predetermined object;

tracking means for tracking said one of said clusters corresponding to said predetermined object to determine an image acquisition time for said image capture camera means to acquire said high resolution image of said predetermined object; and extraction means for processing said image of said predetermined object to extract information identifying said predetermined object.

74. The object monitoring system of claim 73, including a plurality of said video camera means and image processing means for monitoring a plurality of areas, respectively, said areas being remote with respect to one another, and means for comparing said information respectively obtained at said areas.

75. The object monitoring system of claim 73, wherein the predetermined object is a vehicle and said area is a carriageway.

76. The object monitoring system of claim 75 further including a plurality of image capture camera means for acquiring said image of said vehicle in respective lanes of said carriageway.

77. The object monitoring system of claim 73 further including recognition means for processing said image of said predetermined object to obtain information identifying said object.

78. A vehicle monitoring system comprising:
video camera means for generating images of a carriageway to monitor moving vehicles in said carriageway;
image capture camera means for acquiring a high resolution image of a predetermined vehicle; and
image processing means including
means for subtracting a background image of said carriageway from said images of said carriageway to generate difference images representative of said moving vehicles on said carriageway;
segmentation means for processing said difference images to generate region images representative of regions corresponding to parts of said moving vehicles on said carriageway;
classification means for processing said region images, said classification means including
means for analyzing the shape of said regions and, on the basis of the analysis, determining valid regions and invalid regions,
clustering means for rejecting said invalid regions and generating, on the basis of the geometry of said valid regions, clusters corresponding to respective ones of said moving vehicles, and
means for classifying said clusters by comparing at least one characteristic of said clusters to classification data of said system to determine if said clusters correspond to said predetermined vehicle; and
tracking means for tracking said clusters corresponding to said predetermined vehicle to determine an image acquisition time for said image capture camera means to acquire said high resolution image of said predetermined vehicle.

79. The vehicle monitoring system of claim 78, including a plurality of said video camera means and image processing means for monitoring a plurality of carriageways, respectively, said carriageways being remote with respect to one another, and means for comparing said information respectively obtained at said carriageways.

80. The vehicle monitoring system of claim 78 further including a plurality of image capture camera means for acquiring said image of said predetermined vehicle in respective lanes of said carriageway.

81. The vehicle monitoring system of claim 78 further including recognition means for processing said image of said predetermined vehicle to obtain information identifying said vehicle.

82. A vehicle monitoring system comprising:
a plurality of video camera means for generating images of respective areas to monitor moving vehicles in said area, said areas being remote with respect to one another;
a plurality of image capture camera means for acquiring a high resolution image of one or more predetermined vehicles; and
a plurality of image processing means including
means for subtracting background images of said areas from said images of said areas to generate difference images representative of said moving vehicles in said areas;
segmentation means for processing said difference images to generate region images representative of regions corresponding to parts of said moving vehicles in said areas;
classification means for processing said region images, said classification means including
means for analyzing the shape of said regions and, on the basis of the analysis, determining valid regions and invalid regions,
clustering means for rejecting said invalid regions and generating, on the basis of the geometry of said valid regions, clusters corresponding to respective ones of said moving vehicles, and
means for classifying said clusters by comparing at least one characteristic of said clusters to classification data of said system to determine if said clusters correspond to said predetermined vehicle;
tracking means for tracking said clusters corresponding to said predetermined vehicle to determine image acquisition times for acquiring said image of said predetermined vehicle; and
recognition means for processing said images of said predetermined vehicle to obtain information identifying said predetermined vehicle.

83. The vehicle monitoring system of claim 82, wherein said area is a carriageway, and said image capture camera means acquire said images of said predetermined vehicle in respective lanes of said carriageway.

84. A vehicle monitoring system comprising:
video camera means for generating images of an area to monitor moving vehicles in said area;
image capture camera means for acquiring a high resolution image of a vehicle associated with a law infringement; and
image processing means including
means for subtracting a background image of said area from said images of said area to generate difference images representative of said moving vehicles in said area;
segmentation means for processing said difference images to generate region images representative of regions corresponding to parts of said moving vehicles in said area;
classification means for processing said region images, said classification means including
means for analyzing the shape of said regions and, on the basis of the analysis, determining valid regions and invalid regions,
clustering means for rejecting said invalid regions and generating, on the basis of the geometry of said valid regions, clusters corresponding to respective ones of said moving vehicles, and means for detecting said law infringement by comparing at least one characteristic of said clusters to classification data of said system to determine if one of said clusters corresponds to said vehicle; and tracking means for tracking said one of said clusters corresponding to said vehicle to determine an image acquisition time for said image capture camera means to acquire said high resolution image of said vehicle.

85. The vehicle monitoring system of claim 84, including a plurality of said video camera means and image processing means for monitoring a plurality of areas, respectively, said areas being remote with respect to one another, and means for comparing said information respectively obtained at said areas.

86. The vehicle monitoring system of claim 84 further including a plurality of image capture camera means for acquiring said image of said vehicle in respective lanes of said carriageway.

87. The vehicle monitoring system of claim 84 further including recognition means for processing said image of said vehicle associated with said law infringement to obtain information identifying said vehicle.

88. A vehicle monitoring system comprising:

video camera means for generating images of a carriageway to monitor moving vehicles in said area;

image capture camera means for acquiring a high resolution image of a large vehicle, such as a truck and a bus; and image processing means including means for subtracting a background image of said carriageway from said images of said carriageway to generate difference images representative of said moving vehicles on said carriageway;

segmentation means for processing said difference images to generate region images representative of regions corresponding to parts of said moving vehicles on said carriageway;

classification means for processing said region images, said classification means including means for analyzing the shape of said regions and, on the basis of the analysis, determining valid regions and invalid regions, clustering means for rejecting said invalid regions and generating, on the basis of the geometry of said valid regions, clusters corresponding to respective ones of said moving vehicles, and means for classifying said clusters by comparing at least one characteristic of said clusters to classification data of said system to determine if said clusters correspond to said large vehicle; and tracking means for tracking said clusters corresponding to said large vehicle to determine an image acquisition time for said image capture camera means to acquire said high resolution image of said large vehicle.

89. The vehicle monitoring system of claim 88, including a plurality of said video camera means and image processing means for monitoring a plurality of carriageways, respectively, said carriageways being remote with respect to one another, and means for comparing said information respectively obtained at said carriageways.

90. The vehicle monitoring system of claim 88 further including a plurality of image capture camera means for acquiring said image of said large vehicle in respective lanes of said carriageway.

91. The vehicle monitoring system of claim 88 further including recognition means for processing said image of said large vehicle to obtain information identifying said vehicle.

* * * * *

UNITED STATES PATENT AND TRADEMARK OFFICE
CERTIFICATE OF CORRECTION

PATENT NO. : 5,809,161
DATED : September 15, 1998
INVENTOR(S) : Glen William Auty et al.

Figure 40:
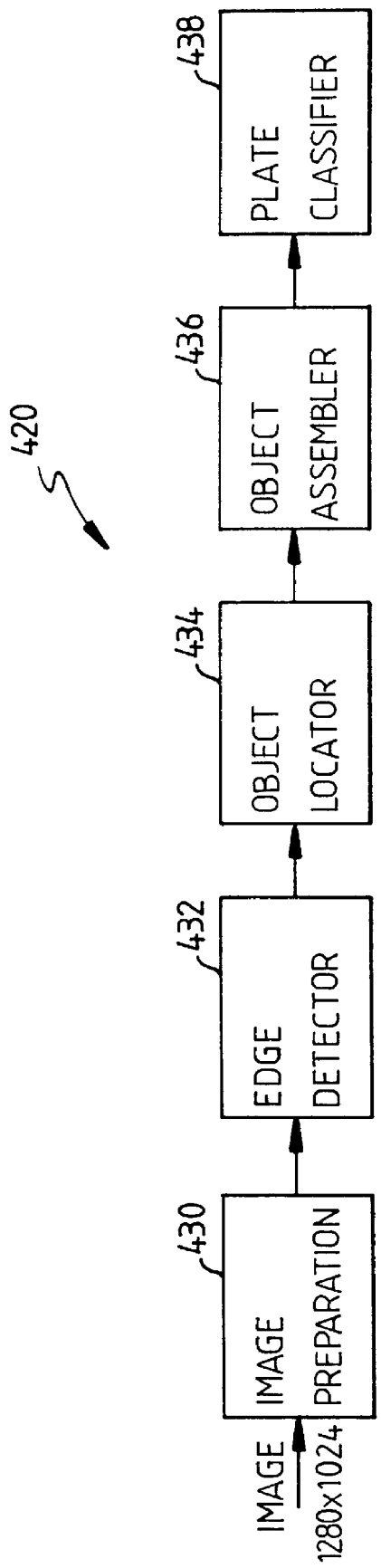
FIG. 40 is a flow diagram of a locate plate module of the licence plate recognition system.

It is certified that error appears in the above-identified patent and that said Letters Patent is hereby corrected as shown below:

At column 19, line 37, replace "previously seen clusters; called" with --previously seen clusters, called--;

At column 26, line 48, replace "to the d etectis n" with -- to the detection --;

At column 30, line 17, replace "as shown inimage for process at step 430" with --as shown in Figure 40, begins at step 430--;

At column 34, line 24, replace "attenuating" with --inhibiting--;

At column 34, line 31, replace "extersion" with --extension--; and

At column 37, line 51, replace "vehicle" with --vehicles--.

Signed and Sealed this

Twenty-eighth Day of November, 2000

Attest:

Q. TODD DICKINSON

*Attesting Officer*     *Director of Patents and Trademarks*